US012461889B2

(12) United States Patent
Goel et al.

(10) Patent No.: US 12,461,889 B2
(45) Date of Patent: Nov. 4, 2025

(54) INTELLIGENT GRAPH EXECUTION AND ORCHESTRATION ENGINE FOR A RECONFIGURABLE DATA PROCESSOR

(71) Applicant: SambaNova Systems, Inc., Palo Alto, CA (US)

(72) Inventors: Arnav Goel, San Jose, CA (US); Ravinder Kumar, Fremont, CA (US); Arjun Sabnis, San Francisco, CA (US); Qi Zheng, Fremont, CA (US); Neal Sanghvi, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 68 days.

(21) Appl. No.: 18/243,994

(22) Filed: Sep. 8, 2023

(65) Prior Publication Data

US 2024/0338340 A1 Oct. 10, 2024

Related U.S. Application Data

(60) Provisional application No. 63/458,315, filed on Apr. 10, 2023.

(51) Int. Cl.
*G06F 15/80* (2006.01)
*G06F 15/82* (2006.01)

(52) U.S. Cl.
CPC ............ *G06F 15/80* (2013.01); *G06F 15/825* (2013.01)

(58) Field of Classification Search
None
See application file for complete search history.

(56) References Cited

U.S. PATENT DOCUMENTS 7,895,586 B2* 2/2011 Ozone ................. G06F 15/7867
712/201
7,953,956 B2* 5/2011 Okada ............... H03K 19/17736
712/10

(Continued)

FOREIGN PATENT DOCUMENTS

WO 2010142987 A1 12/2010

OTHER PUBLICATIONS

Yin, C et al., A Rescheduable Dataflow-SIMD Execution for Increased Utilization in CGRA Cross-Domain Acceleration, Jun. 2022, IEEE pp. 874-886. (Year: 2022).*

(Continued)

*Primary Examiner* — Eric Coleman
(74) *Attorney, Agent, or Firm* — Flagship Patents; Sikander M. Khan; Rutawari Sharma

(57) ABSTRACT

A data processing system including an array of reconfigurable units and a compiler configured to generate to execute a dataflow graph of a user application is disclosed. The dataflow graph includes a sequence of temporal partitions, each temporal partition including a sequence of graph control operations. Also disclosed is an intelligent graph orchestration and execution engine (IGOEE) configured to receive an optimization objective from the complier. The optimization objective can be for minimizing execution time of the reconfigurable processor or maximizing computing resource utilization of the reconfigurable processor. The IGOEE can reorganize the sequence of temporal partitions and the sequence of graph control operations within each temporal partition to satisfy the optimization objective; and execute the reorganized dataflow graph on the reconfigurable processor. A corresponding method is also disclosed herein.

20 Claims, 36 Drawing Sheets

(56) References Cited

U.S. PATENT DOCUMENTS

| | | | |
|---|---|---|---|
| 10,007,746 B1* | 6/2018 | Wolfovitz | G06F 30/3323 |
| 10,025,566 B1* | 7/2018 | Ahmed | G06F 8/4452 |
| 10,698,853 B1 | 6/2020 | Grohoski et al. | |
| 10,831,507 B2 | 11/2020 | Shah et al. | |
| 11,003,429 B1* | 5/2021 | Zejda | G06F 8/445 |
| 11,386,038 B2 | 7/2022 | Prabhakar et al. | |
| 11,593,112 B2* | 2/2023 | Shah | G06F 9/4494 |
| 11,709,664 B2 | 7/2023 | Chen et al. | |
| 11,809,908 B2 | 11/2023 | Kumar et al. | |
| 2017/0039048 A1* | 2/2017 | Gschwind | G06F 8/452 |
| 2017/0068764 A1* | 3/2017 | Takashina | G06F 30/34 |
| 2022/0345535 A1* | 10/2022 | Enrici | G06F 16/9027 |

OTHER PUBLICATIONS

Wijerathne, D et al., HiMap: Fast and Scalable High Quality Mapping on CGRA via Hierarchical Abstraction, Dec. 2021, IEEE, pp. 3290-3303. (Year: 2021).*

Sankaralingam, K et al., The Mozart Resue Exposed Dataflow Processor for AI and Beyond, 2022, ACM, pp. 978-992 (Year: 2022).*

Zhang, Y, et al., SARA: Scaling a Reconfigurable Dataflow Accelerator, 2021, IEEE, pp. 1041-1054. (Year: 2021).*

Zhao, Z et al., Towards Higher Performance and Robust Compilation for CGRA Modulo Scheduling, 2020, IEEE, pp. 2201-2219. (Year: 2020).*

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner 700, 710

User Program Statements

Linear = torch.nn.linear(K,N)
Relu – torch.nn.relu
Softmax = torch.nn.Softmax(dim=3)
X1 = torch.randn(N, C, M, K)
X2 =%1.to("RDP")
X3 = Linear(X2)
X4 = Relu(X3)
X5 = Softmax(X4)
X6 = X5.to("CPU")

750

User Program Computation Graph

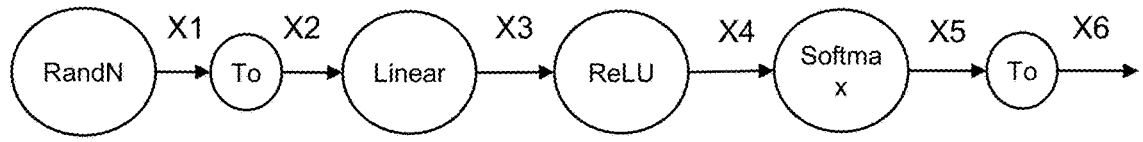

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | ⎤ |
| %5 = air.Sum(%4, dim: 3): | NxCxMx1 bf16 | ⎬ Softmax Lowering |
| %6 = air.Div(%4, %5): | NxCxMxN bf16 | ⎦ |
| %7 = air.Output(%6) | | |

850

Air/Tensor Computation Graph

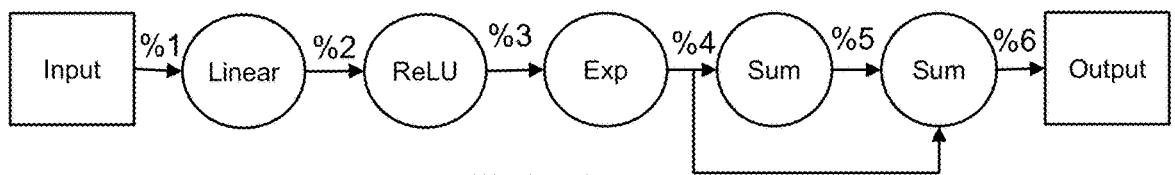

FIG. 8

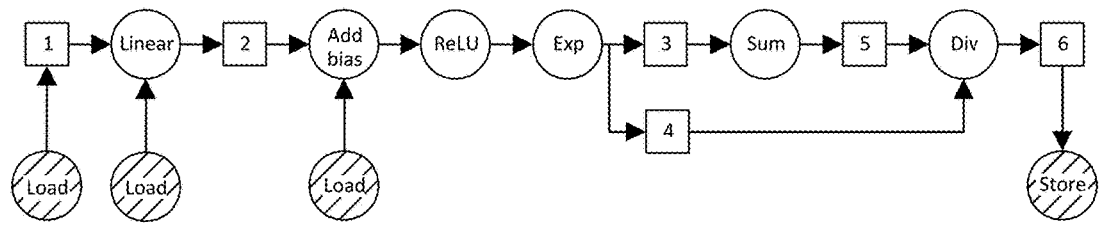
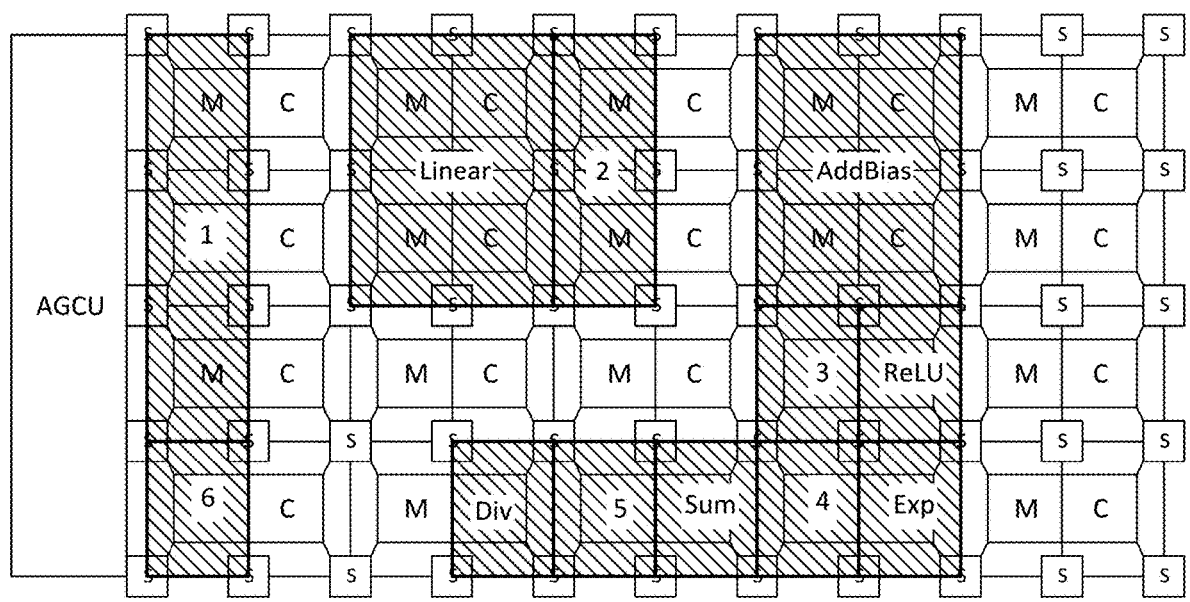
FIG. 11

Temporal Orchestration

INTELLIGENT GRAPH EXECUTION AND ORCHESTRATION ENGINE FOR A RECONFIGURABLE DATA PROCESSOR

CROSS-REFERENCE TO RELATED APPLICATIONS

This application claims the benefit of U.S. Provisional Patent Application No. 63/458,315 entitled "INTELLIGENT GRAPH EXECUTION AND ORCHESTRATION ENGINE FOR A RECONFIGURABLE DATA PROCESSOR," filed Apr. 10, 2023, which is hereby incorporated by reference for all purposes.

RELATED APPLICATION(S) AND DOCUMENTS

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, filed Jan. 3, 2019, now U.S. Pat. No. 10,698,853, entitled "VIRTUALIZATION OF A RECONFIGURABLE DATA PROCESSOR;"
- U.S. Nonprovisional patent application Ser. No. 16/197,826, filed Nov. 21, 2018, now U.S. Pat. No. 10,831,507, entitled "CONFIGURATION LOAD OF A RECONFIGURABLE DATA PROCESSOR;"
- U.S. Nonprovisional patent application Ser. No. 16/407,675, filed May 9, 2019, now U.S. Pat. No. 11,386,038, entitled "CONTROL FLOW BARRIER AND RECONFIGURABLE DATA PROCESSOR;"
- U.S. Nonprovisional patent application Ser. No. 16/890,841, filed Jun. 2, 2020, entitled "ANTI-CONGESTION FLOW CONTROL FOR RECONFIGURABLE PROCESSORS;"
- U.S. Nonprovisional patent application Ser. No. 16/922,975, filed Jul. 7, 2020, entitled "RUNTIME VIRTUALIZATION OF RECONFIGURABLE DATA FLOW RESOURCES;"
- U.S. Provisional Patent Application No. 63/236,218, filed Aug. 23, 2021, entitled "SWITCH FOR A RECONFIGURABLE DATAFLOW PROCESSOR."

All of the related application(s) and documents listed above are hereby incorporated by reference herein for all purposes.

TECHNICAL FIELD

The present subject matter relates to debugging for pipeline optimization during execution of a dataflow graph in a reconfigurable data processor.

BACKGROUND

The technology disclosed relates to a debugging framework for pipeline optimization during execution of a dataflow graph.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Systems with reconfigurable processors which execute dataflow graphs include a compiler which translates and synthesizes a machine learning model of the dataflow graphs onto arrays of reconfigurable units. During this process the compiler may generate many control flows for actual execution of the dataflow graphs. Efficient management of such control flows is required for increasing overall performance of such systems.

SUMMARY

Disclosed herein is a system, comprising: a processor comprising an array of reconfigurable units, configured to execute a dataflow graph of a user application from a compiler, wherein the dataflow graph includes a sequence of temporal partitions, and wherein each temporal partition includes a sequence of graph control operations; an intelligent graph orchestration and execution engine (IGOEE) configured to: receive at least one optimization objective from the complier, wherein the at least one optimization objective specifies at least one of: minimizing an execution time of the reconfigurable processor and maximizing a computing resource utilization of the reconfigurable processor; reorganize the sequence of temporal partitions and the sequence of graph control operations within each temporal partition to satisfy the at least one optimization objective; and execute the reorganized dataflow graph on the reconfigurable processor.

Disclosed herein is a method of managing executing a dataflow graph of a user application on a reconfigurable processor, comprising: receiving a dataflow graph of a user application from a complier, wherein the dataflow graph includes a sequence of temporal partitions, and wherein each temporal partition includes a sequence of graph control operations; receiving at least one optimization objective from the complier, wherein the at least one optimization objective specifies at least one of: minimizing an execution time of the reconfigurable processor and maximizing a computing resource utilization of the reconfigurable processor; reorganizing the sequence of temporal partitions and the sequence of graph control operations within each temporal partition to satisfy the at least one optimization objective; and executing the reorganized dataflow graph on the reconfigurable processor.

Particular aspects of the technology disclosed are described in the claims, specification and drawings.

BRIEF DESCRIPTION OF THE DRAWINGS

The technology will be described with reference to the drawings, in which:

FIG. 7 shows an example implementation of an example user program in a first stage of a compiler stack.

FIG. 8 shows an example implementation of the example user program in a second stage of a compiler stack.

FIG. 11 shows the logical computation graph and an example physical layout of the example user program.

FIG. 16C is an example of a temporal orchestration for an IGOEE-generated profile including a double-buffered control operation, according to an embodiment of the present disclosure.

FIG. 17A is an example of IGOEE-generated multiple profiles for a temporal orchestration, according to an embodiment of the present disclosure.

Figure 1:
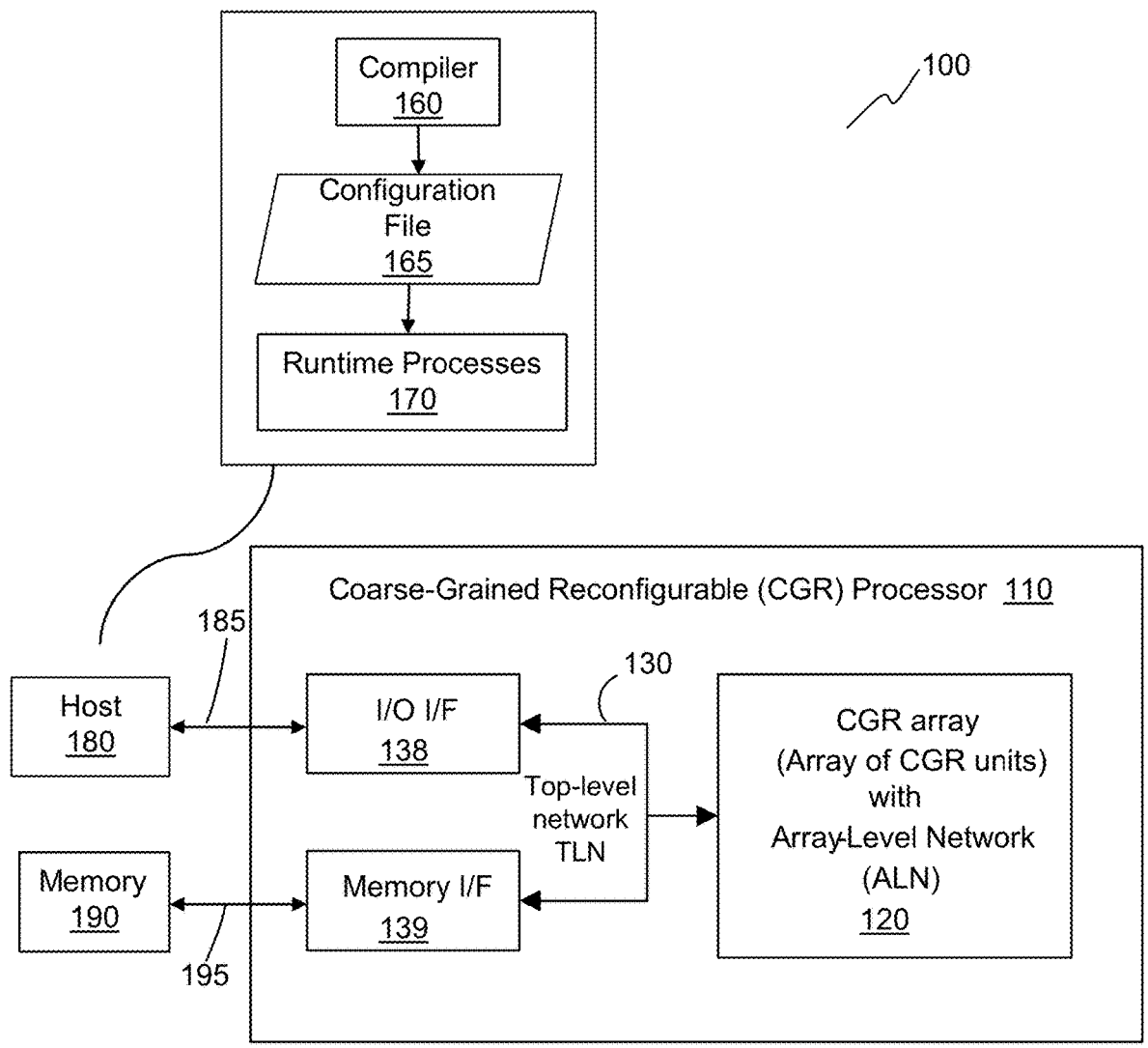
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The technology disclosed relates to minimization of data graph setup and execution overhead and maximization of computing resource utilization.

More specifically, embodiments of the present disclosure describe an intelligent & flexible graph orchestrator and executor engine for a coarse-grained reconfigurable (CGR) processor that executes data graphs. A CGR processor includes arrays of reconfigurable units arranged as "tiles." Each tile may also be referred to as a "minimum compute/computing unit." In order to execute a data graph, a CGR processor has to create a range of graph-defined actions (GDAs) (e.g., running a graph, tuning the hyper-parameters of a graph, updating input/output endpoints of a graph, etc.) and further manage multiple operation flow traces for these graph-defined actions.

Disclosed herein is an IGOEE that creates various operational flow traces by intelligently grouping and/or pipelining sequence of graph control operations (ops). Such a grouped/pipelined sequence of graph control ops may be referred to as an Intelligent Dynamic State Profile (iDSP.) The IGOEE includes a backend engine (referred to as an "Intelligent Finite State Machine (iFSM).") The iDSP and iFSM work together to minimize graph setup & execution overhead and maximize the computing resource utilization. The IGOEE has an objective function (OF) to solve, such as: (1) minimizing the graph setup time; (2) minimizing the graph execution time; (3) and/or maximizing the utilization of the computing resources. The objective function may also be known as an "optimization objective." In other words, the iFSM takes a sequence of GCOs and optimizes them in different ways to satisfy different types of OFs. The IGOEE is configured to solve for different types of OFs. The iFSM takes a sequence of the GCOs and optimize in different ways based on the OFs. progressing through different types of combination of grouping (looping) and pipelining of GCOs using the iDSP.

In one example, the iFSM is a state machine that constructs GCOs into a sequence of steps. The Operational Flow Traces mentioned earlier, are the sequences of the steps.

It also manages the sequence of steps for temporally and spatially partitioned graph.

It is also the engine that solves the optimization equations to figure out what sequence of steps will be required for a given type of graph, e.g., whether it would require 2 steps, 4 steps, etc., and whether to fuse those steps, whether to use different memories for those steps, whether to let the RDU manage all the sequence of steps.

All of the above decisions, which related to the OFs, are made by the iFSM.

There are ways to make the FSM to prefer one OF over other OFs based on user defined variables, e.g., if a user always knows a desirable optimization for a given user application to use, the user could state certain optimization over other types of optimizations.

The OFs are mostly solved for time, e.g., (1) minimizing graph execution overhead; (2) minimizing graph setup latency; (3) minimizing graph execution latency. The optimization decisions are made first, and done empirically (e.g., by pre-run the program to figure out how long it will take). It will measure the time it takes to perform an operation and then make decisions. The iFSM optimizes the above-mentioned steps.

In general, IGOEE comprises of all of the following SW components: a) iDSP (which takes the input of the ops and actions and generates profiles); b) iFSM Solver (which takes the OF and ops to solve for the optimal HW States); and c) iFSM Engine (takes the generated profiles and HW states as input) to orchestrate the timestep/sections in spatial/temporal dimension via the runtime processes on the CGR array of processors.

The following paragraph describes the purpose and some examples of graph-defined control operations.

As those skilled in the art may appreciate a data graph includes many mathematical operations to be performed. In order to perform the mathematical operations, the graph has to progress through many steps. Such a CGR processor-based system can include a high-level application interface, a compiler, and a runtime. To execute a data graph, initially, the compiler receives a user code written in a high-level language such as Pytorch/Tensorflow, and compiles that into an executable file (also known as "program" or "bit file" or "configuration file") compatible with the CGR processor. The program is then partitioned across multiple tiles. The number of partitions can be equal to the number of tiles. At runtime, based on the resource requirements, the compiler specifies the allocation of the tiles. Once tiles are allocated, the runtime can load the program or its partition onto each tile through a process referred to as "loading the program." This can be one example of a graph-defined control operation.

After loading the program, the CGR processor may check if the program has any arguments, such as constants, hyper-parameters, required for implementing the data graph that need to be updated. If so, then at runtime, the constants, hyperparameters need to be converted into argument files, which would also need to be loaded onto the CGR processor and further onto each tile, through a process referred to as "loading the arguments (file)." This can be another example of a graph-defined control operation.

Once the program and arguments are loaded onto the tiles, locations/physical addresses of the input and output locations may need to be updated. In a system with a CGR processor, the compiler may use virtual addresses whereas the runtime may use physical addresses for specifying the input and output locations for the calculations in the data graph to be performed. Therefore, the virtual addresses are translated to physical address at runtime using special registers known as "segment lookaside buffer (SLB)", to load the programs onto the right tiles. This encapsulates another graph-defined control operation, known as "loading HW registers with SLB,". Examples of virtual to physical address translations are described in a related U.S. patent application Ser. No. 18/107,613 entitled, "Head Of Line Blocking Mitigation In a Reconfigurable Data Processor," filed on Feb. 9, 2023, which is incorporated herein by reference in its entirety.

As such, "load the program," "load the arguments file," or "load HW registers with SLB" can be some examples of independent graph-defined control operations. There can also be fused control operations. A fused control op may be especially useful in performing a virtual to physical address translation. In such a fused control op, a physical address may be loaded to the CGR processor along with the control op itself rather than loading it as through an independent control op. Advantageously, such a fused operation can optimize the graph setup time. As explained earlier, as various control ops are completed, the graph progresses through various stages. Once the program file, argument file, the translation file, and are all loaded, the programs can be executed on different tiles. In one example, after execution, the results are generated in the output locations originally specified in the program on the tile. After this, the runtime processes (also known as "runtime") may provide the results back to the CPU or the host for application specific operations (if needed).

Partitioning the graph into different parts of the CGR-Generally speaking, there may be several sections in a graph and each section can include several graph-defined actions. The IGOEE can create a profile (iDSP) for each graph-defined action by grouping one or more control ops specific to that action. The iFSM 1315 can orchestrate (partition) iDSP (profile) in both temporal and spatial dimensions. One way of partitioning the graph is a forward partition, in which it uses the same resources (tiles) of the CGR but at different points in time. The iFSM can then orchestrate the iDSP (profiles) by using the temporal partitioning in different ways. In one example, the compiler may compile a graph having many temporal partitions. One way to perform temporal partitioning by the iFSM is by allowing the CGR to manage the partitions: meaning that the compiler may compile a graph having, for example, ten different temporal partitions, all of which can be unrolled at runtime. In such a case, the runtime unrolls one temporal partition and when it generates its results then it moves on to schedule the next temporal partition on the RDU. In another example, the temporal partitions can be loaded onto the CGR once, and the locations of those temporal partitions (such as t, t+1, t+2 etc.) are provided to the CGR. By this method, when CGR finishes any partition, it can automatically load the next partition, and so on. Advantageously, the setup time for each partition in software can be hidden, where all the setups are done/accelerated on the CGR itself.

The following paragraphs provide some mathematical details about the number of graph control operations, sections or timesteps in a graph, and number pipelined graph control operations.

Initially, it may be assumed that:
a. M refers to the number of sections or timesteps in a graph,
b. N refers to the number of Graph Control operations in a timestep.
c. P refers to the number of pipelined Graph Control operations in the graph, and
d. F refers to the "fusion factor", which is defined as the max number of graph control operations to be fused into a single fused graph control operation, With the above assumptions in place, in various embodiments, the iFSM also provides the flexibility to orchestrate an iDSP of N graph control ops as follows:
a. 1) iDSP is unrolled in runtime or CGR runs each of the N graph control ops in O(N) time,
b. iDSP is unrolled in runtime or CGR runs N/F graph control ops in O(N/F) time by merging F consecutive control ops,
c. iDSP is unrolled in runtime or CGR creates a pipeline of two consecutive ops & run N graph control ops in O(P) time (where P<N)

iDSP Orchestration Pass: This term refers to the two modes of orchestration-spatial orchestration and temporal orchestration. Depending on how the graph is compiled, iFSM can select one of the modes of orchestration. The iFSM orchestrates iDSP in both temporal and spatial dimensions. Along the temporal dimension, as mentioned earlier, an iDSP includes N graph control operations, each of which is processed by iFSM sequentially or in a pipelined fashion. Along the spatial dimension, an iDSP is created for each minimum computing unit (tile) on a CGR and is organized and processed in parallel. The iDSPs on different minimum computing units (tiles) could have dependencies between each other, either due to data dependencies or relative execution order. These dependencies can be either coded through the configuration files of a CGR or can be specified in iDSP by iFSM.

Furthermore, given the following:
$M \in \mathbb{N}$, $N \in \mathbb{N}$, $2 \leq N$, $P << (M*N)$ The different SW/HW operational parameters can be described as follows:

$G_{op}SW$—This refers to Graph Control Software (SW) Operation Setup Latency. This term encompasses the SW cost of iterating & updating through an array of minimum compute unit's device control registers on the HW to start a chosen HW o ation.

$G_{op}HW$—This refers to Graph Control Hardware (HW) Operation Execution Latency. This term encompasses the execution time of a device operation on the array of minimum compute units of the HW, including the time spent by the device to push or pull operation related data to/from a particular type of operative memory and time spent by the device to start and complete an operation on the device compute units.

$G_{op}^{mem}HW$—This refers to Memory Optimized Graph Control Hardware (HW) Operation Execution Latency. Similar to the above, this term encompasses execution time of a device operation on the array of minimum compute units of the HW, including the time spent by the device to start and complete an operation on the device compute units and the time spent by the device to push or pull operation related data to/from an optimized type of operative memory, such as host, device or remote memory locations.

$G_{op}^{prime}HW$—This refers to RDU Unrolled Graph Control Hardware (HW) Operation Latency. For a multi-section graph (M>1), this term encompasses the total setup time of a series of heterogeneous, unrolled device control operations for section>1 and total execution time of a series of heterogeneous, unrolled, device compute operations for all sections on the array of minimum compute units of the HW. More specifically, this includes, time spent by the device to push or pull operation related data to/from optimized memory locations for all sections, time spent by the device to start and complete a series of heterogeneous operation on the device compute units for all sections, time spent by the device to setup a series of heterogeneous device control registers for sections>1.

The following paragraphs provide examples of optimization equations based on various latencies described above. The IGOEE can solve these equations before deciding an optimization objective. In the following equations, "i" refers to a section of M sections of the graph and "j" refers to a control op of N control ops in the section "i."

iDSP Unrolling in O(N*M)—Linear Operations—In one example, the iDSP can be unrolled in the form of linear operations. In such operations, the iDSP is composed of multiple single, non-overlapping graph control ops chained together. The order of operations in each graph section depends on the requirements of the graph. This could involve inserting new ops into the list for the given section or skipping certain ops entirely. The following is an equation (equation 1) which can be used to calculate the minimum value of the SW set up latency and HW execution latency for linear operations.

$$\min\left(\sum_i^M \sum_j^N G_{op}SW(i,j) + G_{op}HW(i,j)\right) \quad \text{Equation 1}$$

iDSP Unrolling in O(N*M)—Linear Operations with Memory Optimization—In one example, the iDSP can be unrolled using linear operations with memory optimization. In such operations, the CGR has the ability to pull/push data from Host Memory, Device memory, and Remote Memory (accessed through the IO channels). The iDSP can decide where it is best to pull/push graph section data from during its hardware operations based on what would be optimal for performance and use case. The following is an equation (equation 2) which can be used to calculate the minimum value of the SW set up latency and memory optimized HW execution latency for a linear operation with memory optimization.

$$\min\left(\sum_i^M \sum_j^N G_{op}SW(i,j) + G_{op}^{mem}HW(i,j)\right) \quad \text{Equation 2}$$

iDSP Unrolling in O(N/F*M)—Fused Operations—In one example, there can be fused operations. The CGR supports enhanced graph control operations that are a combination of two, or more basic graph control ops (F). The iDSP can decide when to fuse F different ops into a single operation to be executed by the RDU, thereby combining the SW and HW overhead of the chosen ops into a single umbrella operation. Some examples of such fusion ops, not limited to the following, include: (1) Loading and executing a graph in a single operation, (2) Loading user arguments and kicking off graph execution in a single operation, and (3) Loading HW registers such as SLBs and user-passed arguments onto the RDU in a single operation. The following is an equation (equation 3) which can be used to calculate the minimum value of the SW set up latency and the HW execution latency for a fused operation.

$$\min\left(\sum_i^M \sum_j^{\frac{N}{F}} G_{op}SW(i,j) + G_{op}HW(i,j)\right) \quad \text{Equation 3}$$

iDSP Unrolling in O(P)—Double Buffer Operations—In some embodiments, there can be double buffered operations, in which the CGR supports the pipelining of two graph control ops, whereby the second issued operation is queued up in the HW and executed as soon as the first issued operation completes. When deemed appropriate to use by iDSP, this allows for overlapping the HW latency of the first operation with the SW latency of the second operation, reducing total execution time. The following is an equation (equation 4) which can be used to calculate the minimum value of the SW set up latency and the HW execution latency for a double buffer operation.

$$\min\left(\sum_i^P G_{op}SW(i) + G_{op}HW(i)\right) \quad \text{Equation 4}$$

iDSP Unrolling in O(N/F)—RDU Accelerated Operations—In one example, the CGR is also capable of driving operations completely in HW. The iDSP can leverage this capability such that SW setup latency is only incurred for the first section, and this SW latency can be cut down further with the aforementioned fused and pipelined operations. The remaining (M−1) sections in the graph are then set up to be executed entirely on the RDU itself, thereby fusing the SW and HW latency of the Q=((M−1)*N/F) operations into a single HW operation. This method minimizes SW setup latency in the iFSM in the case of M>1 due to inherent acceleration of offloading operations to RDU. In the case of M=1, the iFSM behaves the same way during the RDU accelerated operation pass as it would for a purely software orchestrated pass, allowing for flexibility in operating modes. The following is an equation (equation 5) which can be used to calculate the minimum value of the SW set up latency for the first section and the CGR unrolled HW execution latency for a CGR accelerated operation.

$$\min\left(G_{op}SW(1) + \sum_i^Q G_{op}^{prime}HW(i)\right) \quad \text{Equation 5}$$

Any of the above-mentioned equations can be used by the IGOEE for deciding an optimization objective to minimize graph execution overhead, minimizing graph setup latency, or minimizing graph execution latency. Afterwards the various profiles including control ops can be unrolled to the runtime.

Additionally, the technology disclosed further presents a general-purpose software debugging framework for dataflow processors (DDB). It allows a user to inspect, debug, and update a dataflow processor by interacting with the IGOEE. The DDB provides different interfaces to users, such as command line, graphical user interface (GUI), application programming interface (API), etc. In various embodiments, the DDB allows a user to inspect information related to any hardware (HW) state or software (SW) stage by creating HW or SW breakpoints respectively. Such breakpoints can be predefined in the configuration file via a high-level programming language. The HW breakpoints may correspond to the iFSM states as explained earlier. The SW breakpoints may correspond to profiles (DSPs) as explained earlier.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array—level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable. This term may be used alternatively with "RDU (reconfigurable dataflow unit.)"

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to perform one or more operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph and is sometimes referred to as a reconfigurable dataflow unit (RDU).

SIMD—single-instruction multiple-data—an arithmetic logic unit (ALU) that simultaneously performs a single programmable operation on multiple data elements delivering multiple output results.

TLIR—template library intermediate representation.

TLN—top-level network.

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler, see, for example, FIGS. 6-11. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

In dataflow processors with reconfigurable architectures, a pipeline of computational stages can be formed in the array of reconfigurable units to execute dataflow graphs. The computational stages Since various computational stages can have various latencies, efficiently manage the pipeline, especially when it comes to providing the final output of the pipeline, can be challenging.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. The array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include a computer such as further described with reference to FIG. 2. Host 180 runs runtime 170, as further referenced herein, and may also be used to run computer programs, such as the compiler 160, further described herein with reference to FIG. 6. In some implementations, the compiler may run on a computer that is similar to the computer described with reference to FIG. 2 but separate from host 180.

CGR processor 110 may accomplish computational tasks by executing a configuration file 165. For the purposes of this description, a configuration file corresponds to a dataflow graph, or a translation of a dataflow graph, and may further include initialization data. A compiler 160 compiles the high-level program to provide the configuration file 165. In some implementations described herein, a CGR array is configured by programming one or more configuration stores with all or parts of the configuration file 165. A single configuration store may be at the level of the CGR processor or the CGR array, or a CGR unit may include an individual configuration store. The configuration file may include configuration data for the CGR array and CGR units in the CGR array and link the computation graph to the CGR array. Execution of the configuration file 165 by CGR processor 110 causes the CGR array(s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
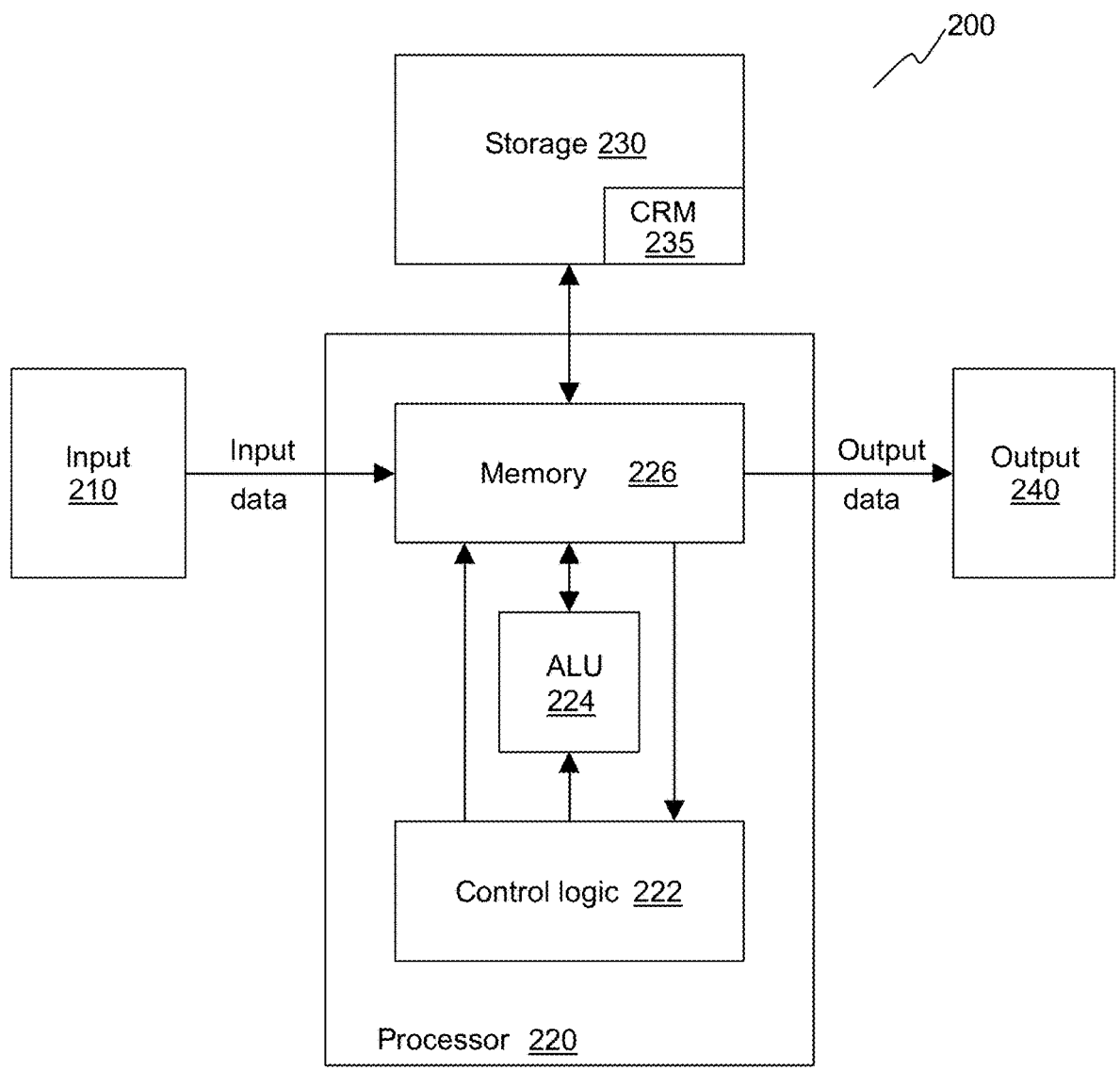
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which in an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
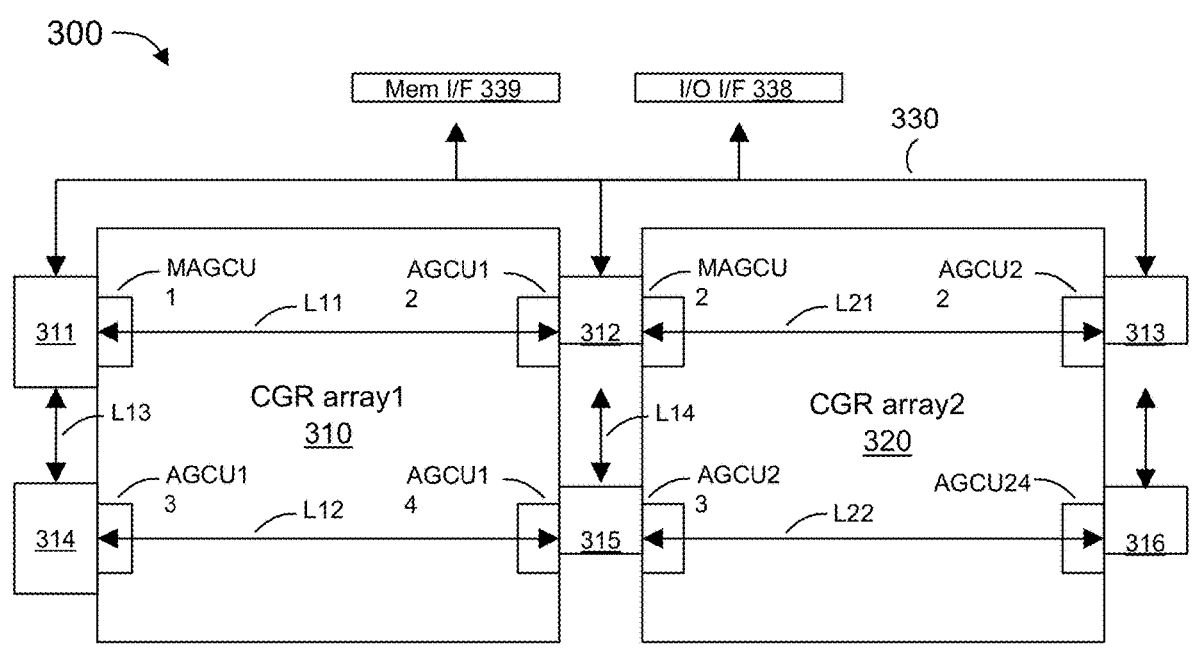
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array1 310 and CGR array2 320). The CGR arrays may also be referred to as "tiles." As such, the CGR array1 310 may be referred to as "tile1 310" and the CGR array2 320 may be referred to as "tile2 320."

A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
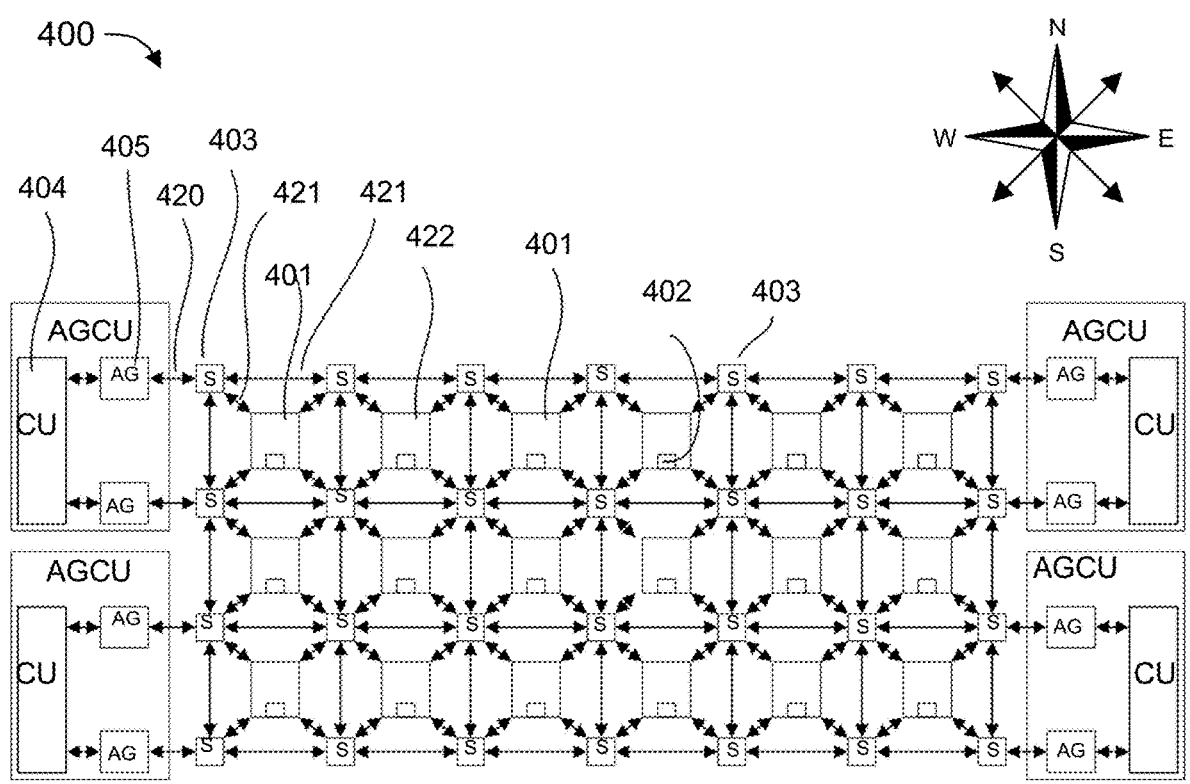
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
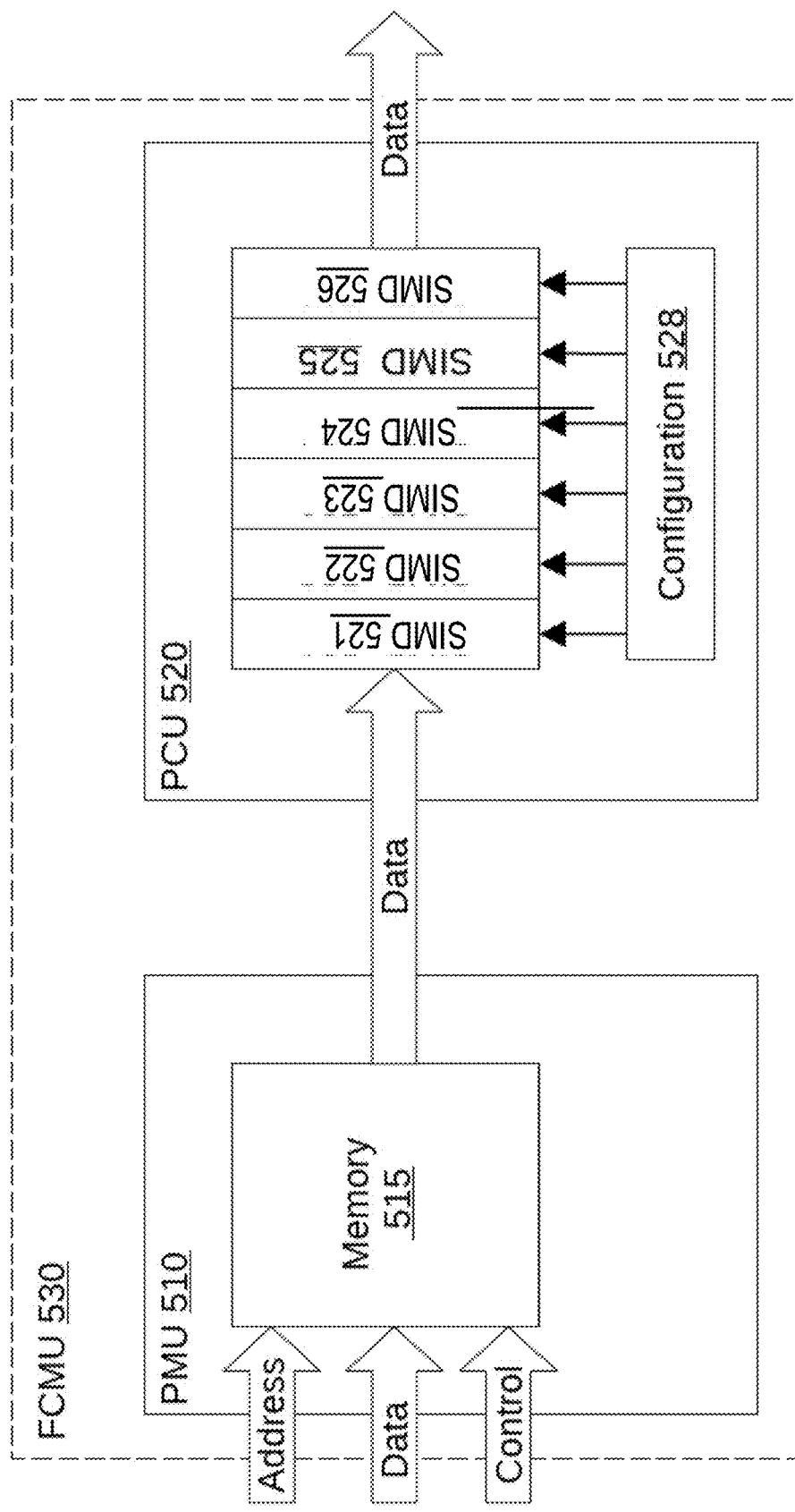
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
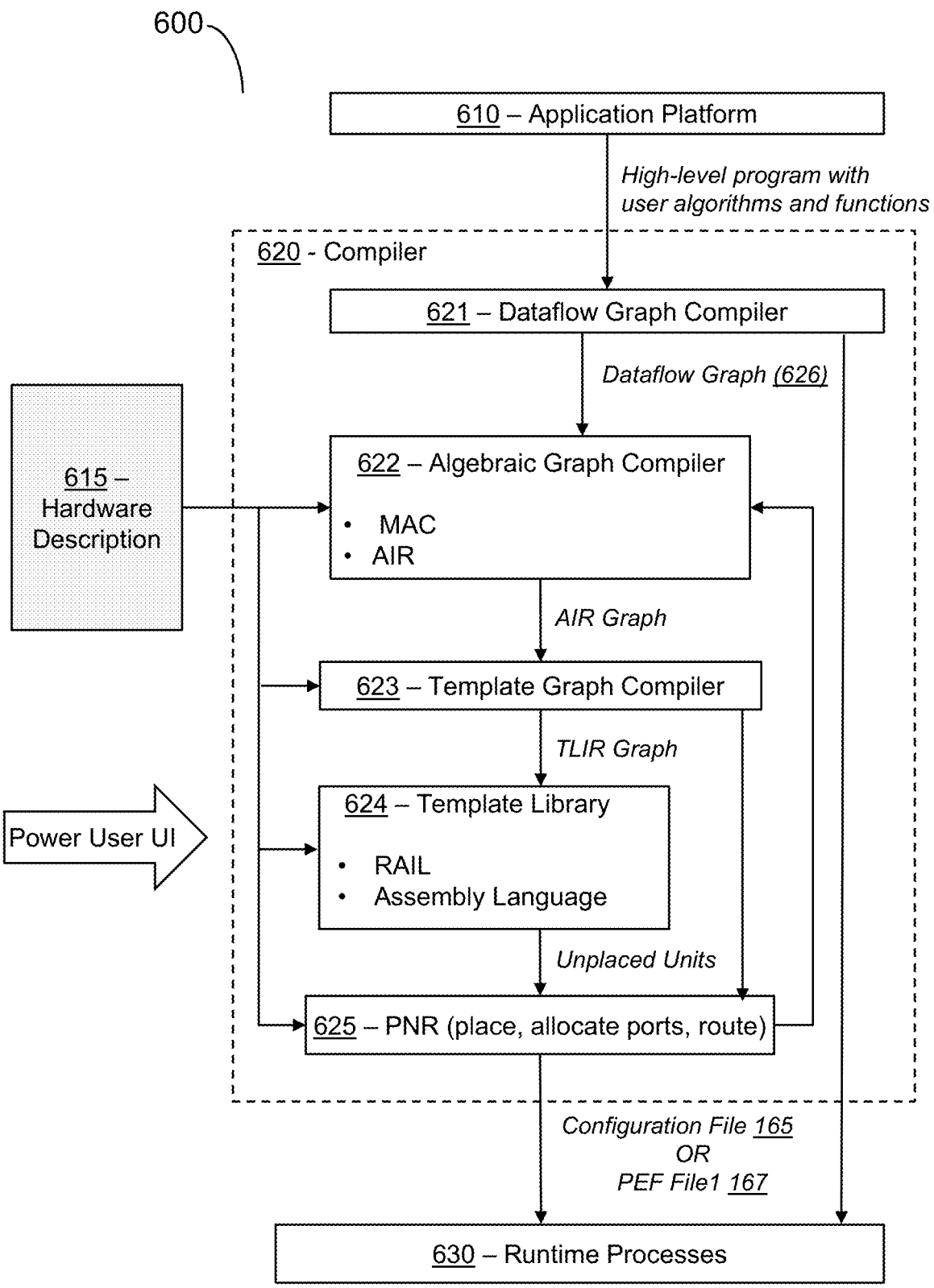
FIG. 6 is a block diagram of a compiler stack implementation suitable for generating a configuration file for a CGR processor.
Figure 9:
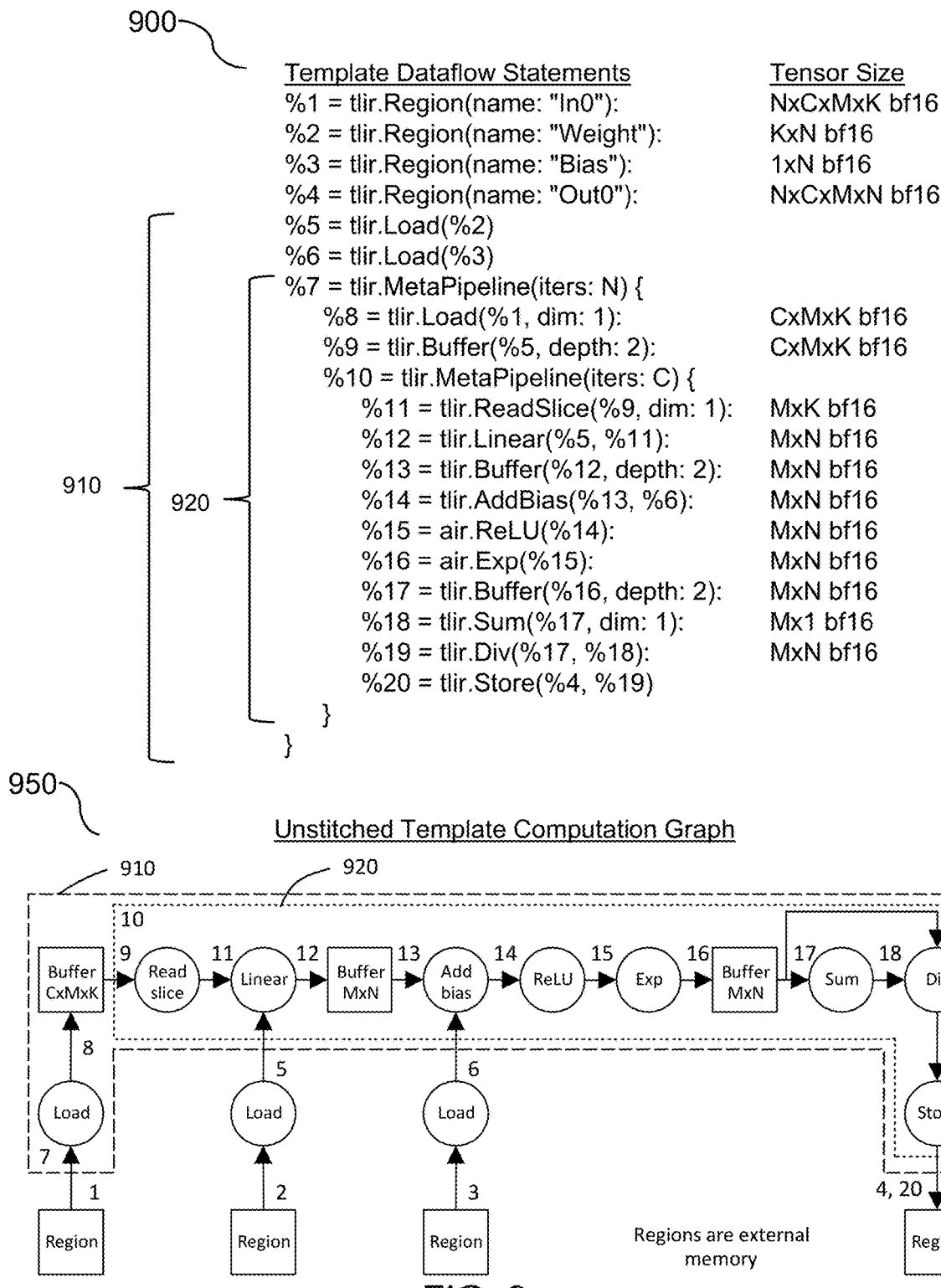
FIG. 9 shows an example implementation of the example user program in a third stage of a compiler stack.

FIG. 6 is a block diagram of a compiler stack 600 implementation suitable for generating a configuration file for a CGR processor. FIGS. 7-11 illustrate various representations of an example user program 700 corresponding to various stages of a compiler stack such as compiler stack 600. As depicted, compiler stack 600 includes several stages to convert a high-level program (e.g., user program 700) with statements 710 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 700 depicted in FIG. 7 comprises statements 710 that invoke various PyTorch functions.

FIG. 7 shows an example implementation of an example user program 700 in a first stage of a compiler stack. The example user program 700 generates a random tensor X1 with a normal distribution in the RandN node. It provides then tensor to a neural network cell that performs a weighing function (in the Linear node) followed by a rectified linear unit (ReLU) activation function, which is followed by a Softmax activation function, for example to normalize the output to a probability distribution over a predicted output class. FIG. 7 does not show the weights and bias used for the weighing function.

Application platform 610 outputs a high-level program to compiler 620 (which is an example of the compiler 160 shown in FIG. 1) which in turn outputs a configuration file to the reconfigurable data processor or CGRA processor where it is executed in runtime 630. The runtime 630 can be an example of the runtime 170 shown in FIG. 1. Compiler 620 may include dataflow graph compiler 621, which may handle a dataflow graph, algebraic graph compiler 622, template graph compiler 623, template library 624, and placer and router PNR 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program. Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) layer that makes high-level mapping decisions for (sub-graphs of the) dataflow graph based on hardware constraints. It may support various application frontends such as Samba, JAX, and TensorFlow/HLO. Algebraic graph compiler 622 may also transform the graphs by automatically generating gradient computing graphs, perform stitching between sub-graphs, for performance and latency estimation, convert dataflow graph operations to AIR operation, perform tiling, sharding (database partitioning) and other operations, and model the parallelism that can be achieved on the dataflow graphs.

Algebraic graph compiler 622 may further include an arithmetic or algebraic intermediate representation (AIR) level that translates high-level graph and mapping decisions provided by the MAC layer into explicit AIR graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput. The AIR layer constructs pipelines based on MAC mapping decisions by placing operations into a metapipe and inserting stage buffers between them. It may also insert AllReduce instructions for collecting results from parallelized operations. It may also further optimize by redundant operation and dead code elimination, pipeline collapsing, and operation fusion.

FIG. 8 shows an example implementation of user program 700 in the second stage of the compiler stack. At this stage, the algebraic graph compiler replaces the Softmax macro by its constituents. The Softmax function is given as $$\frac{e^{(z_i)}}{\sum_{j=1}^{K} e^{(z_j)}}.$$

This function includes an exponential component, a summation, and a division. Thus, algebraic graph compiler 622 replaces the user program statements 710, also shown as computation graph 750, by AIR/Tensor statements 800, also shown as Air/Tensor computation graph 850.

Template graph compiler 623 may translate AIR statements and/or graphs into TLIR statements 900 (see FIG. 9) and/or graphs (graph 950 is shown), optimizing for the target hardware architecture into unplaced variable-sized units (referred to as logical CGR units) suitable for PNR 625. Template graph compiler 623 may allocate meta-pipelines, such as meta-pipeline 910 and meta-pipeline 920, for sections of the template dataflow statements 900 and corresponding sections of unstitched template computation graph 950. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Template library 624 provides templates for commonly used operations, for example GEMM. Templates are implemented using assembly language. Templates are further compiled by an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 10:
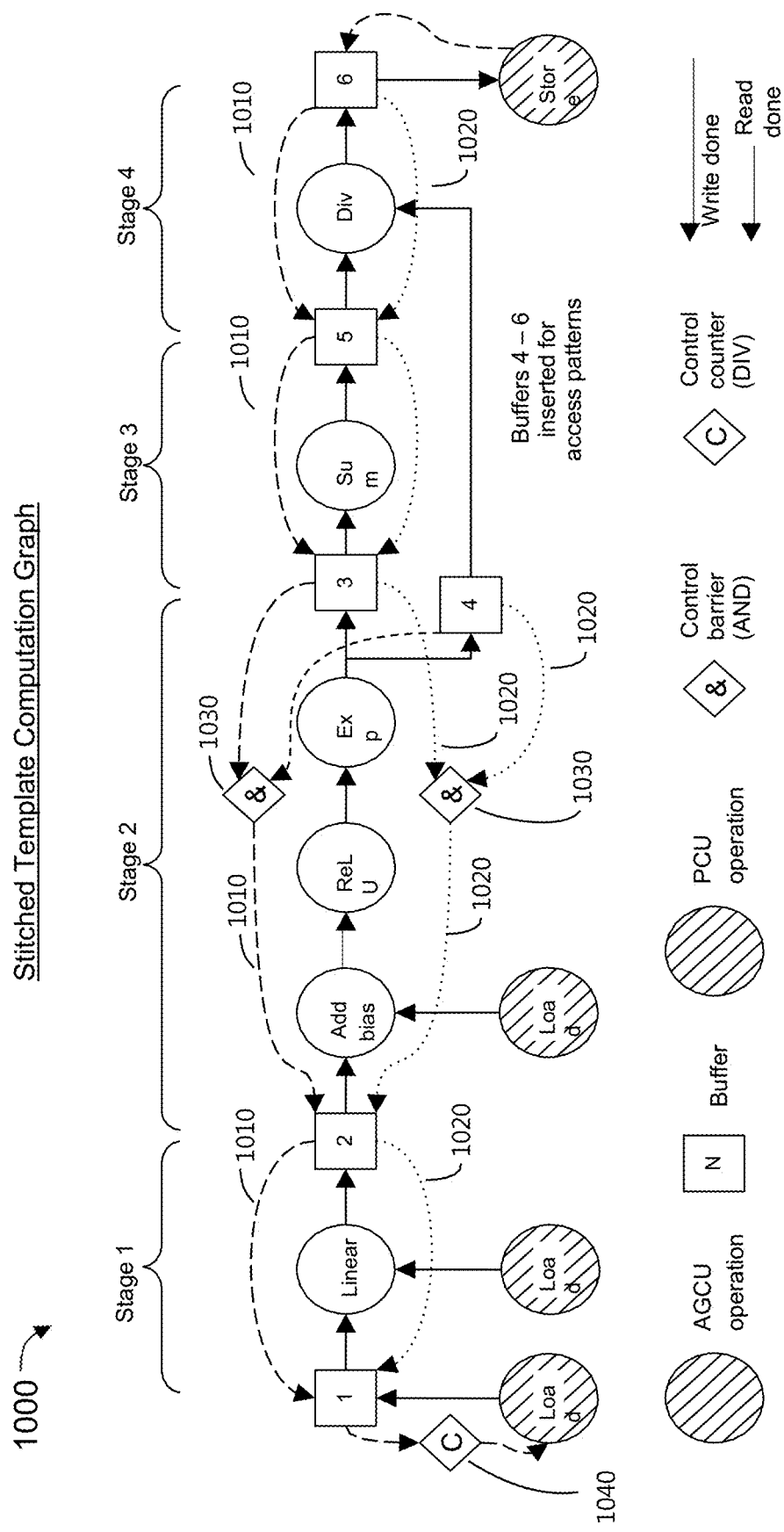
FIG. 10 shows an example implementation of the example user program in a fourth stage of a compiler stack.

FIG. 10 shows an example implementation of the example user program 700 in a fourth stage of the compiler stack. The template graph compiler 623 may also determine the control signals 1010 and 1020, as well as control gates 1030 and 1040 required to enable the CGR units (whether logical or physical) to coordinate dataflow between the CGR units in the CGR array of a CGR processor. This process, sometimes referred to as stitching, produces a stitched template compute graph 1000 with control signals 1010-1020 and control gates 1030-1040. In the example depicted in FIG. 10, the control signals include write done signals 1010 and read done signals 1020, and the control gates include 'AND' gates 1030 and a counting or 'DIV' gate 1040. The control signals and control gates enable coordinated dataflow between the configurable units of CGR processors such as compute units, memory units, and AGCUs.

PNR 625 translates and maps logical (i.e., unplaced physically realizable) CGR units (e.g., the nodes of the logical computation graph 1100 shown in FIG. 11) to a physical layout (e.g., the physical layout 1150 shown in FIG. 11) on the physical level, e.g., a physical array of CGR units in a semiconductor chip. PNR 625 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside an RDU. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into multiple subgraphs such as memory subgraphs or compute subgraphs and specifies these subgraphs in the PEF file1 167. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

After software-stack compilation of dataflow graphs, all compute nodes in the graph are assigned a dedicated pipeline stage with a stage buffer before and after that graphnode. A stage-buffer implementation can range from one to several PMUs and consumes variable on-chip SRAM resources. Compiler 620 may then estimate a latency for each stage in the pipeline and further determine the longest latency for each pipeline. As different nodes require varied compute complexity, some stages consume smaller latency compared to other nodes. In general, a data graph sample that has completed computation at the current stage will wait in a stage buffer before the next stage until the latter computation is complete for another sample. This will be explained in greater detail with regard to FIG. 12A.

Figure 12A:
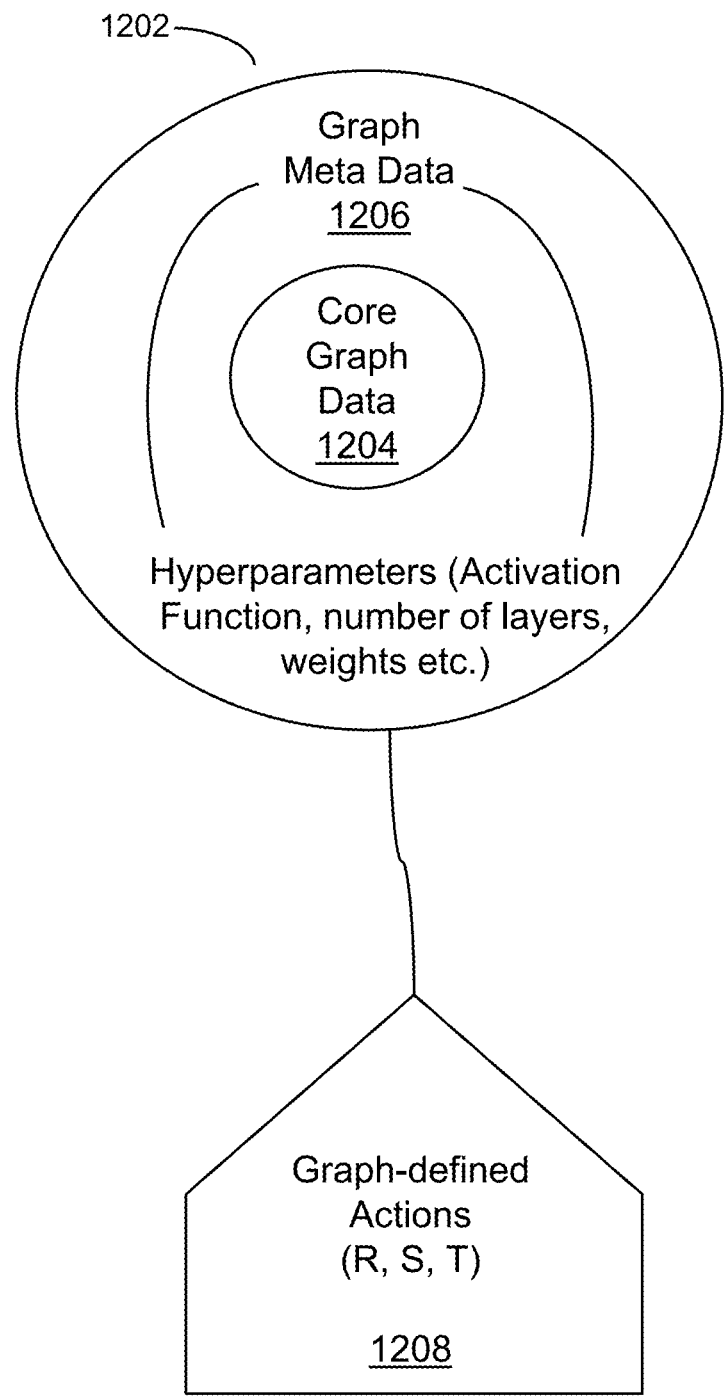
FIG. 12A is an example of data and metadata associated with a computational graph.

FIG. 12A illustrates an example computational graph 1202, also referred to as a dataflow graph 1202 or graph 1202, including associated data and metadata. The graph 1202 can be one example of the Air/Tensor computation graph 850. The graph 1202 may include among other things, core graph data 1204 and graph meta data 1206. The core graph data 1204 can be the nodes, graph's input data and the graph meta data can include activation functions, number of hidden layers, number of nodes, weights etc. as described in the FIGS. 7-11 earlier in the specification. According to an embodiment of the present disclosure, there are certain graph-defined actions shown as 1210 (R, S, T) which act upon the graph 1202 in order to execute the graph. Some actions may work on the core graph data 1204, whereas some actions may work on the graph meta data 1206. Furthermore, each graph-defined action may include one or more graph-defined control operations (Ops) 1208 grouped as flow traces which are processed during runtime based on the core graph data 1204 and the graph meta data 1206.

Figure 12B:
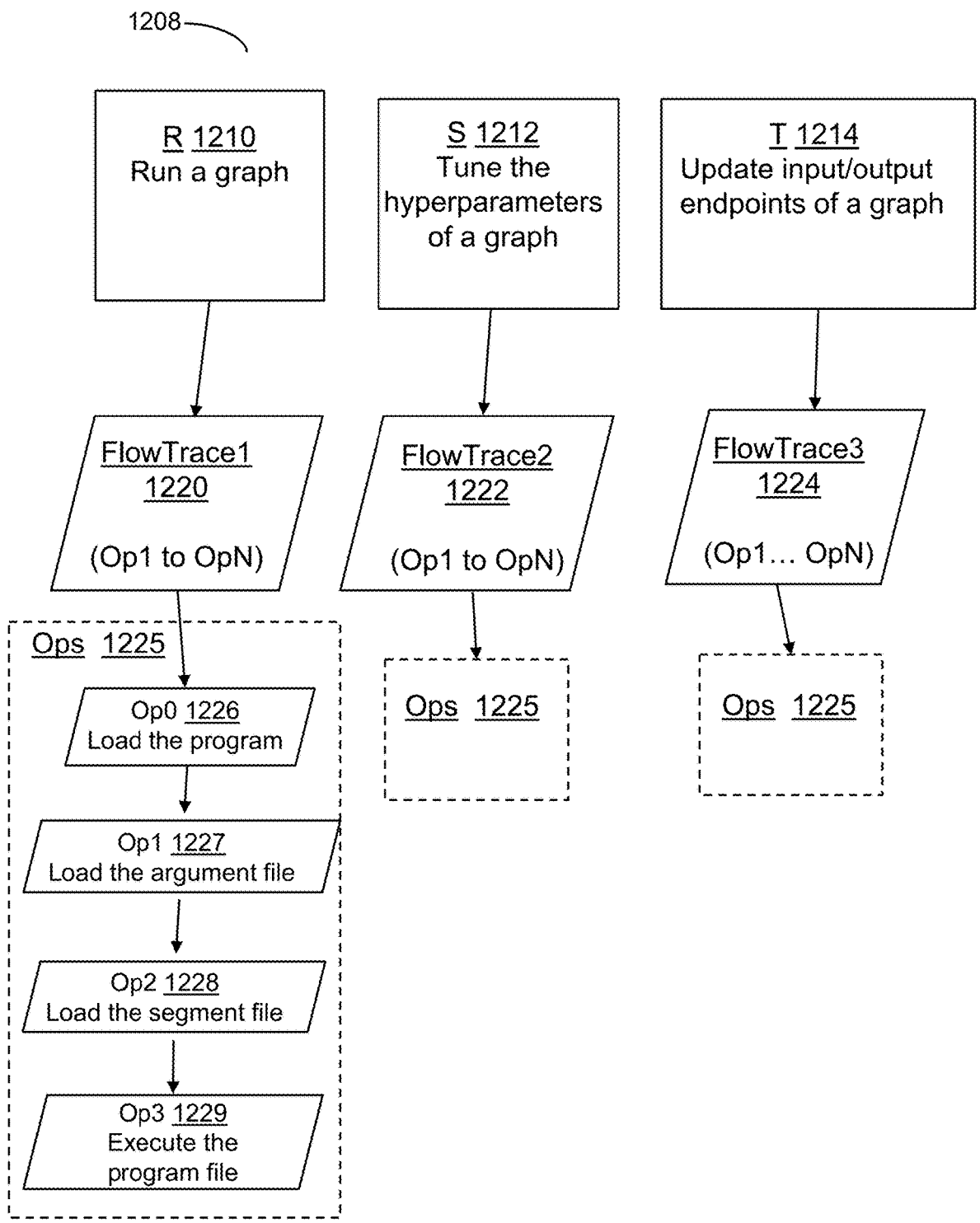
FIG. 12B is an example of graph-defined control operations (GCOs or control ops or ops) associated with a computational graph.

FIG. 12B illustrates some example graph-defined actions (R 1210, S 1212, T 1214) further including flow traces ft1 1220, ft2 1222, ft3 1224 respectively. Each of the flow traces can further include graph-defined control operations (ops) op1 to opN in any combination. For example, the action R 1210 "run a graph" includes the flow trace FT1 1220 which can include some of the Ops from op1 to opN. The action S 1212 "tune hyperparameters of a graph" includes the flow trace FT2 1222 which may further include some of the ops from op1 to opN. Similarly, the action T 1214 "update input/output endpoints of a graph" can include the flow trace FT3 1224 which may further include some of the ops from op1 to opN. Some of the ops may be common to some or all of the flow traces. In one example, both FT and a profile are a group of control ops. As will be explained later in the specification with regard to FIGS. 15A and 15B, a profile can also have fused ops or double buffered ops. For the purpose of this specification, the terms "flow traces" and "ops" may be used interchangeably.

Some examples of control ops are collectively illustrated as ops 1225 and include op0 1226 "load the program," op1 1227 "load the argument file," op2 1228 "load the segment file," and op3 1229 "execute the program file." As will be described in the paragraphs below, embodiments of the present disclosure, disclose a method to efficiently group ops for each action and further provide those to the runtime in a temporal or spatial orchestration, also referred to as "partition." Some examples of control ops can include:

1. Loading a program from host, device or remote memory.
2. Loading an argument file from host, device or remote memory
3. Loading a segment file of virtual to physical address translations
4. Loading program and executing program from host, device or remote memory
5. Loading a segment file and an argument file and executing program from host, device or remote memory.
6. Loading an argument file and executing program from host, device or remote memory.
7. Executing a program from host, device or remote memory.
8. Pausing a program from host, device or remote memory.
9. Resuming a program from host, device or remote memory.
10. Unloading a program from host, device or remote memory.
11. Loading program, arguments, and executing program from host, device, or remote memory. Any combination of the above-mentioned ops can be included in a single profile depending upon the action to be performed. Additionally, any combination of these operations can be fused together into a single operation.

Figure 12C:
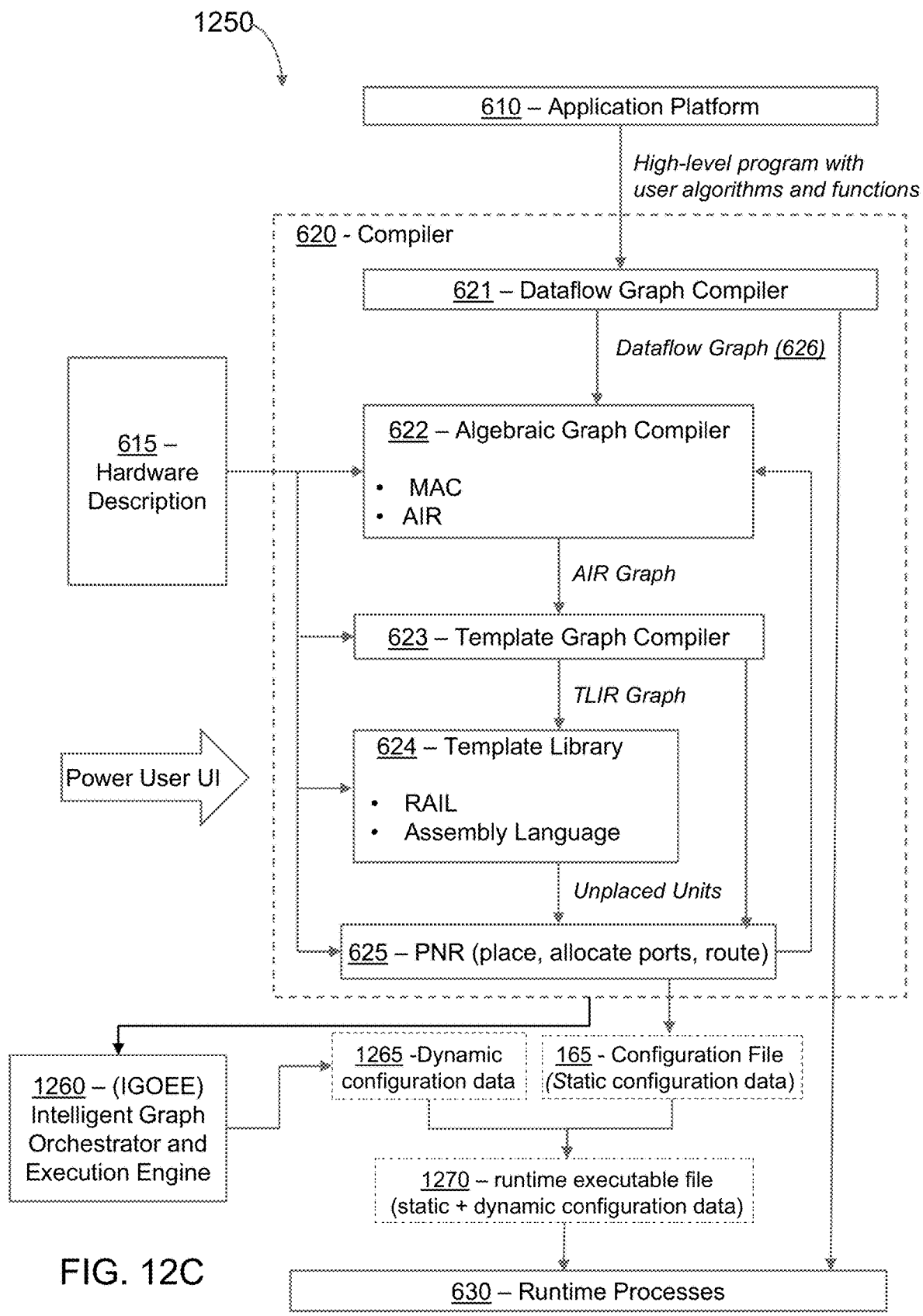
FIG. 12C is another example of a block diagram of a compiler stack implementation further including an intelligent graph orchestration and execution engine (IGOEE), according to an embodiment of the present disclosure.

FIG. 12C is an example of a block diagram of a compiler stack implementation further including an intelligent graph orchestration and execution engine (IGOEE), according to an embodiment of the present disclosure. As will be explained with regard to FIG. 13, IGOEE interacts with the compiler 620 and the runtime 630 for managing the operational flow traces to minimize the graph setup and execution overhead and maximize the computing resource utilization. FIG. 12C has many common blocks with FIG. 6. Additionally, shown in FIG. 12C are the IGOEE 1260, dynamic configuration data 1265. As explained earlier with regard to FIG. 6, the configuration file 165 includes static configuration data mainly from high level language such as Pytorch/Tensorflow. As will be explained in more detail later in one example, the IGOEE 1260 generates dynamic configuration data 1265. Both the static configuration data from the configuration file 165 and the dynamic configuration data 1265 from the IGOEE 1260 are combined into another file called "runtime executable file" 1270, which is provided to the runtime 630.

Figure 13:
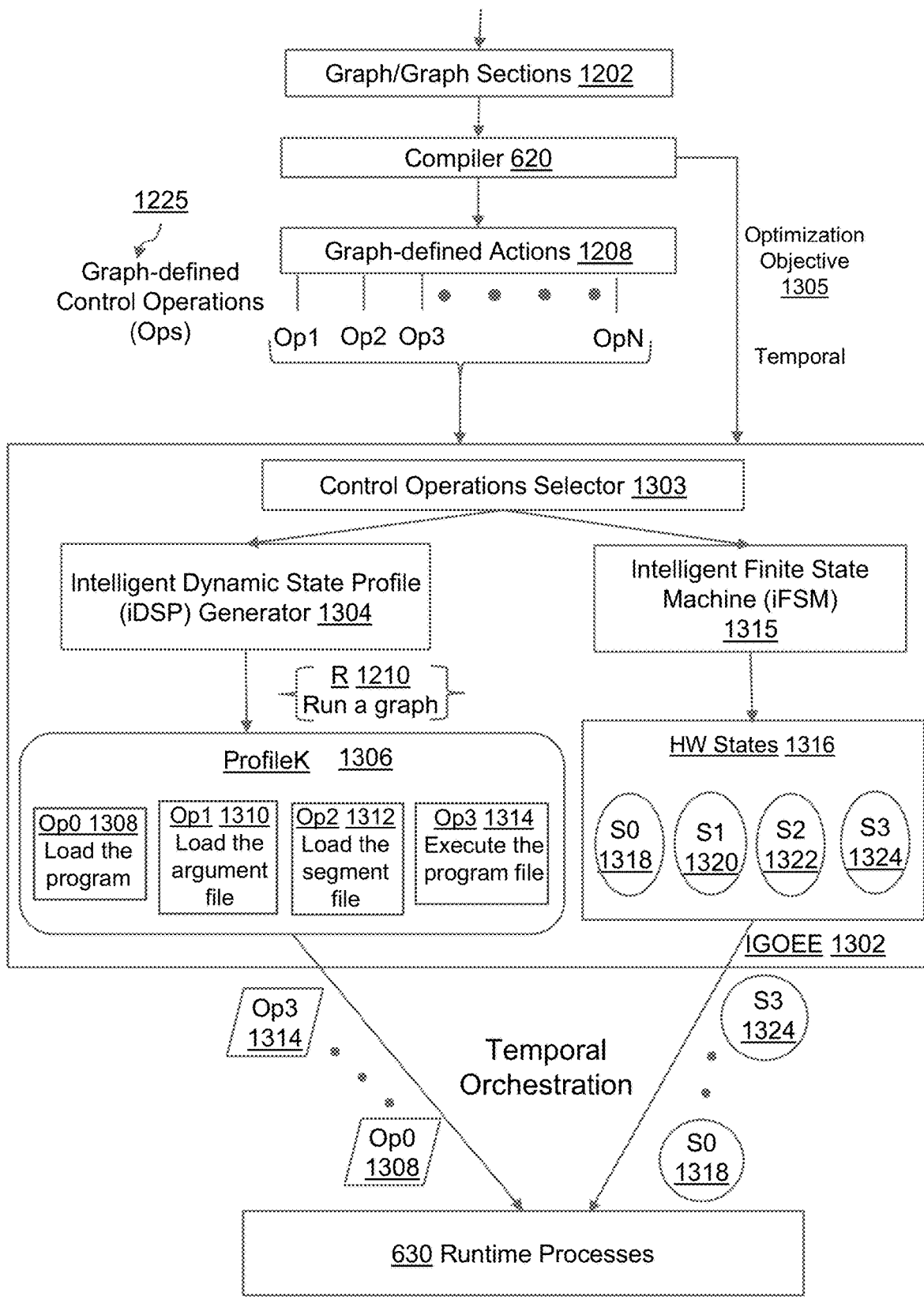
FIG. 13 is an example of an intelligent graph orchestration and execution engine (IGOEE) and an IGOEE generated profile, according to an embodiment of the present disclosure.
Figure 13:
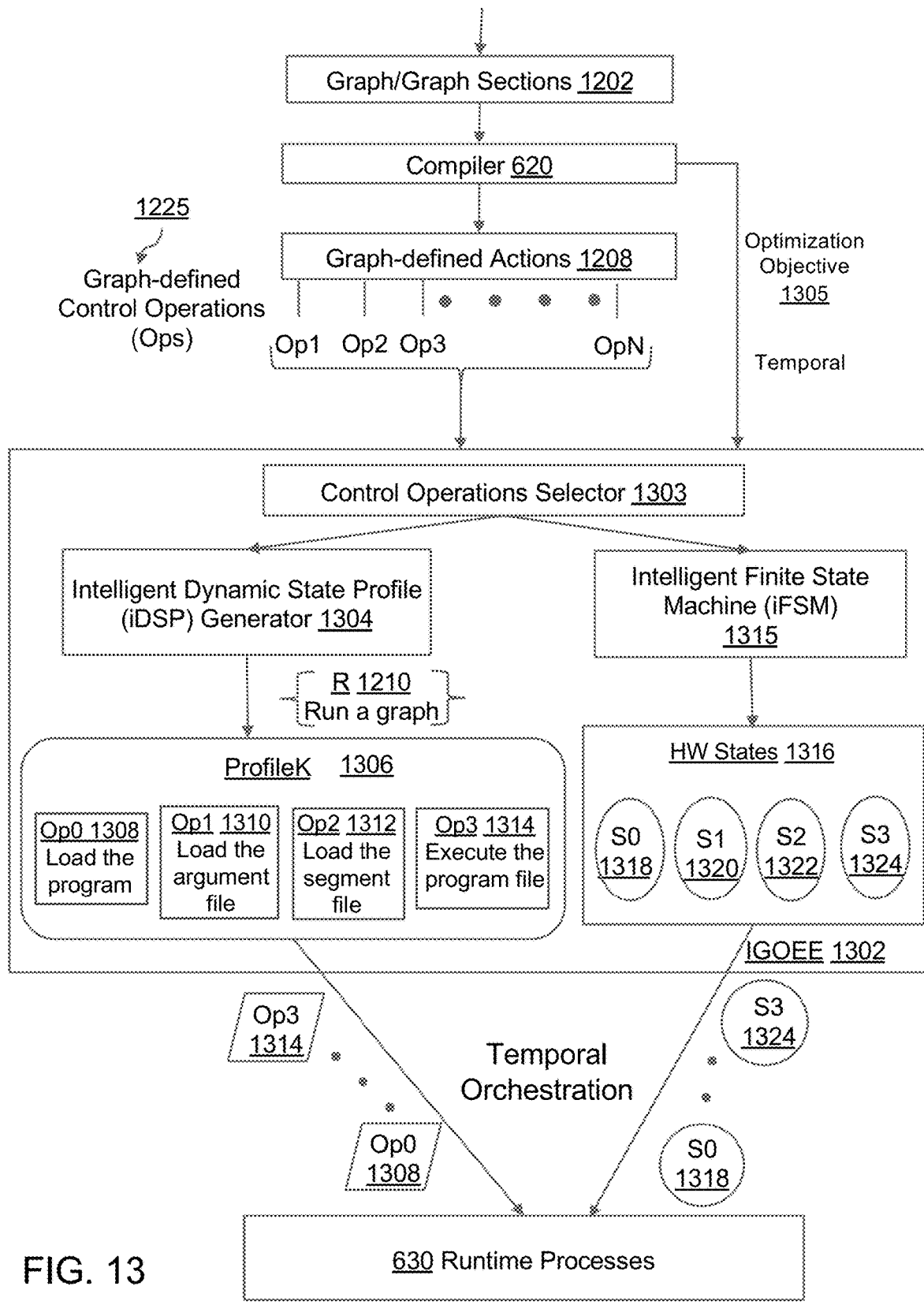

FIG. 13 illustrates an example implementation of an IGOEE 1302, according to an embodiment of the present disclosure. The IGOEE 1302 is coupled to interact with the compiler 620 and the runtime 630. Initially, the compiler 620 (shown previously in FIG. 6) is coupled to receive the graph 1202 from an application platform such as the application platform 610 shown in FIG. 6 Although shown as compiler 620, it represents any stage of the compiler 620 shown FIG. 6 can receive the dataflow graph 1202. The dataflow graph can be one example of the dataflow graph 626 shown in FIG. 6. The compiler 620 then generates graph-defined actions 1208 (R, S, T) and provides those to the IGOEE 1302.

The IGOEE 1302 receives the control ops (op1 to opN) and further selects ops specific to each graph-defined action using the control operations selector 1303 generates a profile for each graph-defined action. In this example, the graph-defined action shown is R 1210 "run graph." The IGOEE 1302 generates a profile K 1306 including the control ops op0 1308, op1 1310, op2 1312, and op3 1314, which can be examples of the ops op0 1226, op1 1227, op2 1228, and op3 1229 (shown in FIG. 12B) for the graph-defined action R 1210 "run a graph." In some examples, there may be different ops selected for the different graph-defined functions.

In one example, the IGOEE 1302 further includes a control operations selector 1303, an intelligent dynamic state profile (iDSP) generator 1304 and an intelligent finite state machine (iFSM) 1314. In one example, the control operations selector 1303 selects control ops specific to the graph-defined action and provides those to the iDSP generator 1304 and the iFSM 1315. The iDSP generator 1304 is configured to generate one or more profiles (also known as iDSP) including the control ops selected by the control ops selector 1303. Similarly, the iFSM 1315 is then configured to generate HW states 1316 corresponding to the control ops selected by the control ops selector 1303. In the example of FIG. 13, the control operations selector 1303 selects ops op0 1308, op1 1310, op2 1312, and op3 1314 (shown in FIG. 12B) for the action R1210. The iDSP generator 1304 then generates a profile K 1306 including the above-mentioned ops for the action R 1210. The HW states 1316 further include states S0 1318, S1 1320, S2 1322, and S3 1324 corresponding the ops. Also illustrated in FIG. 13 is an optimization objective 1305, which is communicated by the compiler 620 to the IGOEE 1302 to select between a temporal or spatial orchestration. In some examples, a user can also provide an optimization objective to the IGOEE 1302 to select between a temporal or spatial orchestration.

Figure 13A:
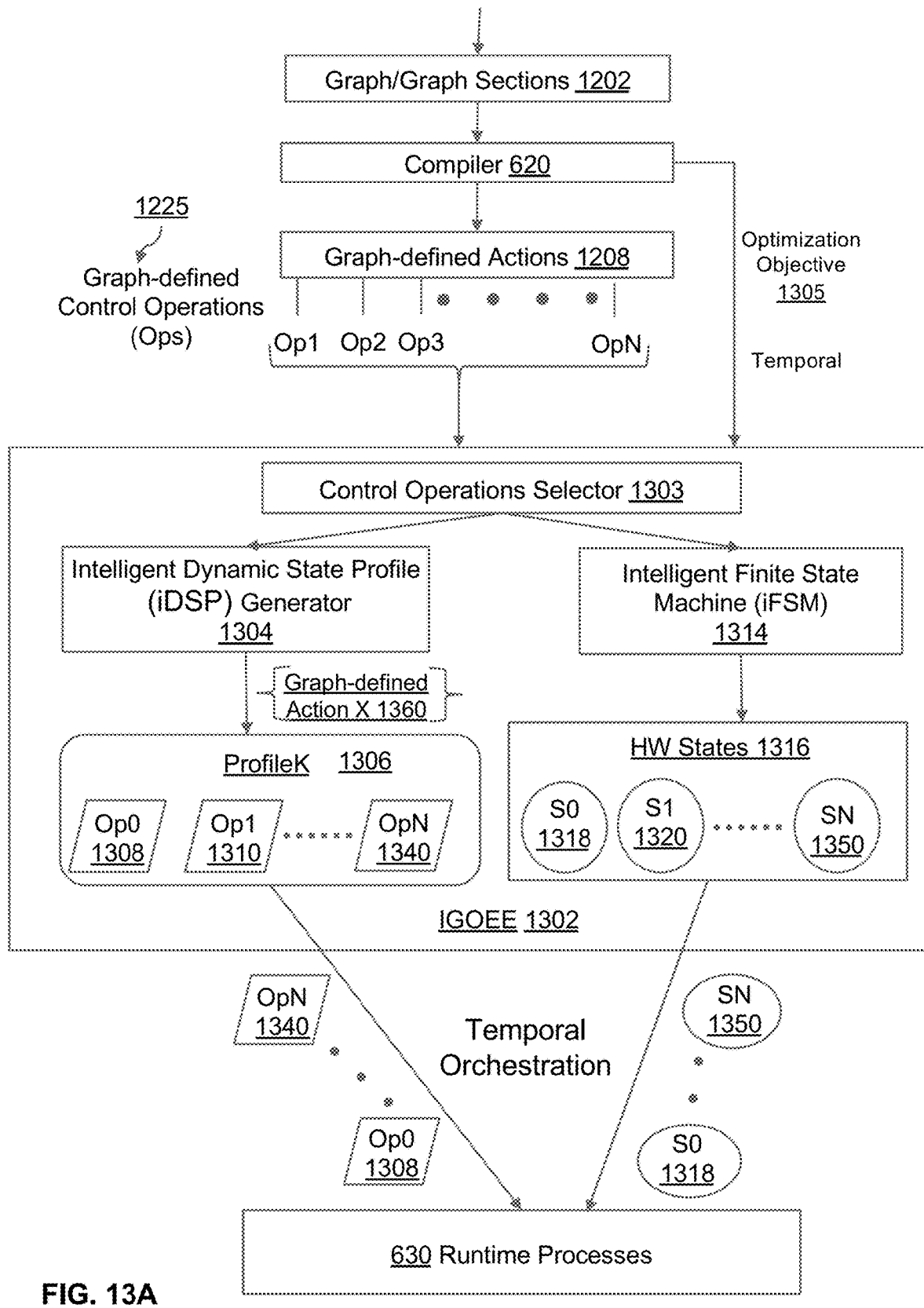
FIG. 13A is another example of an intelligent graph orchestration and execution engine (IGOEE) and an IGOEE generated profile, according to an embodiment of the present disclosure.

FIG. 13A illustrates a generic example implementation of the IGOEE 1302 configured to generate a profile including N ops (op0 1308 to opN 1340) for a graph-defined action X 1360, according to an embodiment of the present disclosure. The iFSM 1315 generates N hardware states s0 1318 to SN 1350 corresponding to the N ops (op0 1308 to opN 1340) respectively. Similar profiles can be created for as many graph-defined actions as included in a section of a graph.

Figure 14:
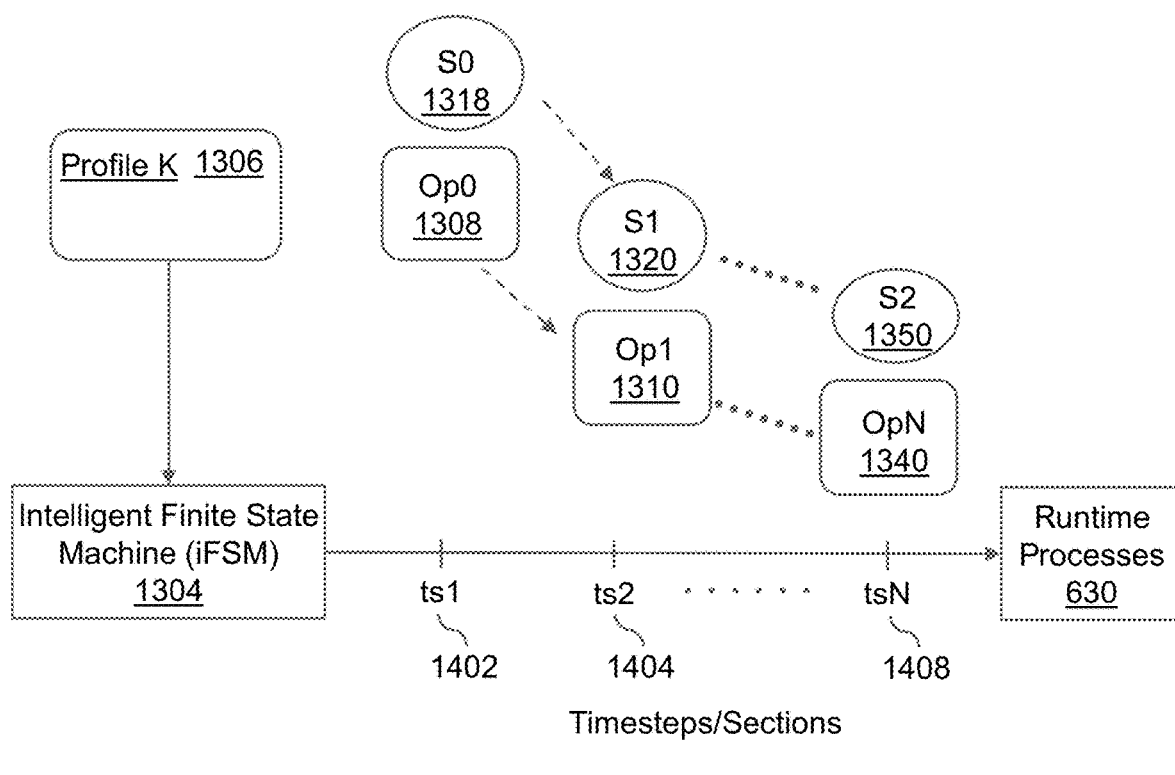
FIG. 14 is an example of a temporal orchestration for the IGOEE generated profile, according to an embodiment of the present disclosure.

As will be shown in FIG. 14, the ops op0 1308, op1 1310, up to opN 1340 are provided to the runtime 630 via HW states S0 1318 up to SN 1350 by temporal orchestration as selected by the optimization objective 1305. The iDSP generator 1304 may generate different profiles for different actions.

FIG. 14 illustrates an example implementation of a temporal orchestration of a profile generate by IGOEE 1302, according to an embodiment of the present disclosure. In one example, the iFSM 1315 unrolls the profile K 1306 to the runtime 630 over a plurality of timesteps. Shown in FIG. 14 are timesteps ts1 1402, ts2 1404, and ts3 1408 at which the iFSM 1315 progresses through the states S0 1318 to SN 1350 respectively. In one example, the iFSM 1315 also unrolls the profile K 1306 by providing ops op0 1308, op1 1310, up to opN 1340 to the runtime 630 at above timesteps in a sequential manner. This is also known as unrolling a profile in a temporal dimension.

Figure 15A:
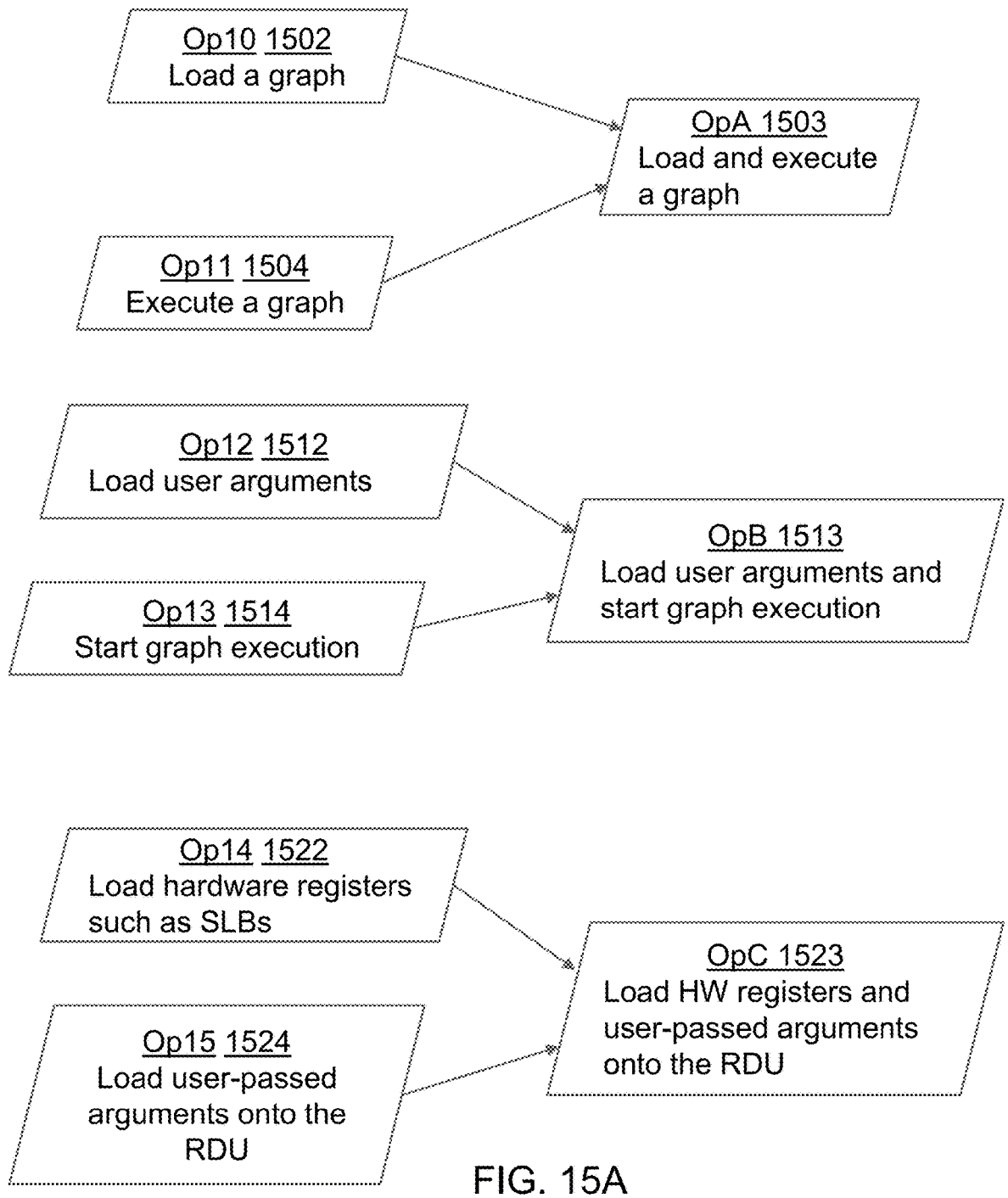
FIG. 15A illustrates some examples fused control operations, according to an embodiment of the present disclosure.

During the profile generation process, the iDSP generator 1304 may fuse certain ops. FIG. 15A illustrates some examples of fused ops. For example, op10 1502 (load a graph) and op11 (execute a graph) 1504 can be fused to generate a fused op opA 1503 (load and execute a graph) which can perform both the functions. Similarly, op12 1512 (load user arguments) and op13 1514 (start graph execution) can be fused to generate a single fused op opB 1513 (load user arguments and start graph execution) which can perform both the functions. Similarly, op14 1522 (load HW registers such as SLBs) and op15 1524 (load user-passed arguments onto the RDU) can be fused to generate a single fused op opC 1523 (load HW registers and load user-passed arguments onto the RDU) which can perform both the functions.

Some other examples of fused ops may include "load the program" and "load user arguments" as a single fused op, "argument load" and "execution" as a single fused op, or "argument load" and "segment load" as a single fused op. More specifically, in one example any of the ops mentioned earlier in the specification, can be fused to create a single op. The profile with fused ops can be unrolled to the runtime 630 in a temporal or spatial dimension.

Figure 15B:
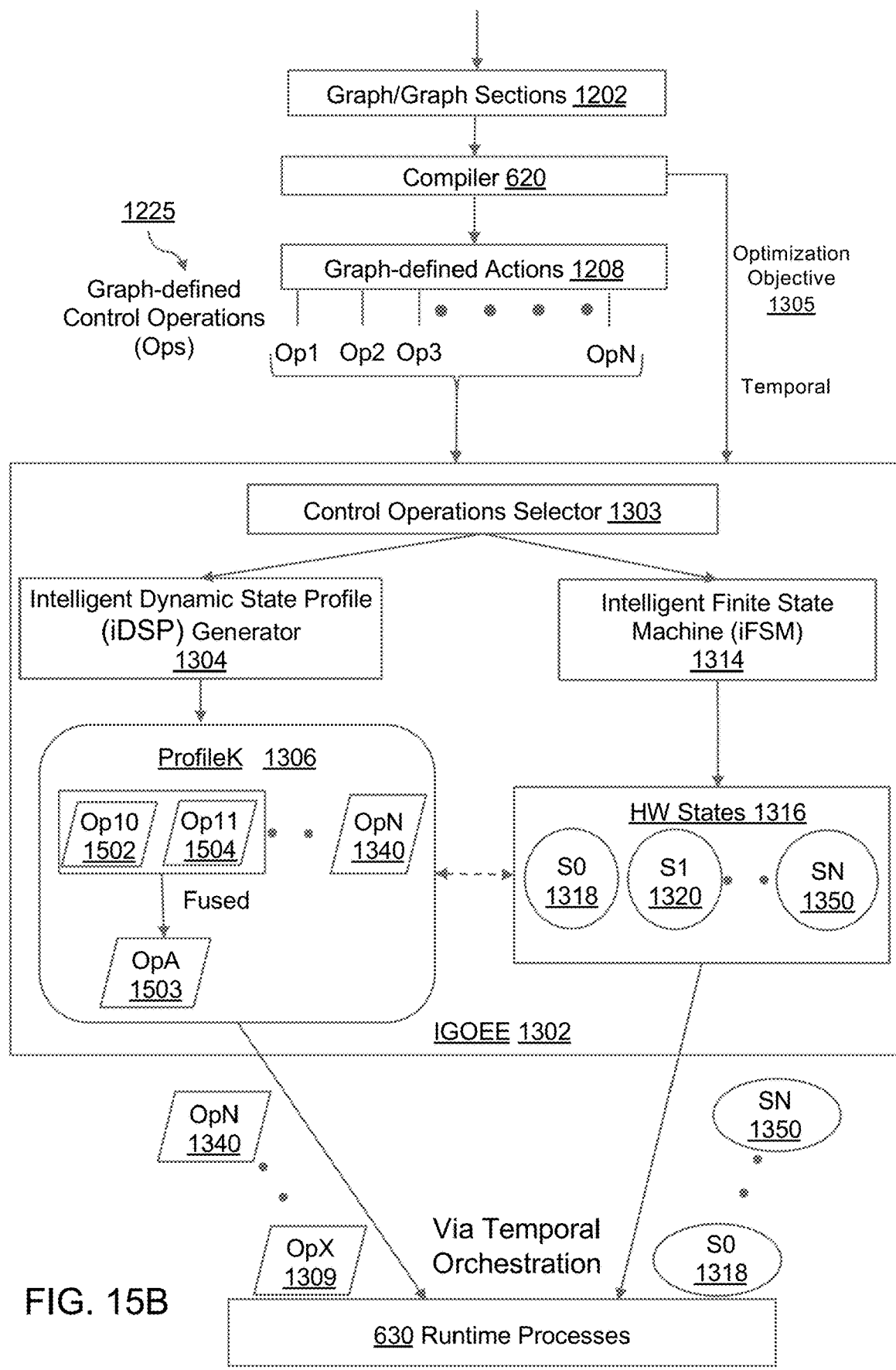
FIG. 15B is an example of an IGOEE generated profile including a fused control operation, according to an embodiment of the present disclosure.

FIG. 15B illustrates an example implementation of an IGOEE 1302 configured to generate a fused op. As shown, in the profile K 1306, op10 1502 and op11 1504 are fused to generate a fused op opA 1503 (load and execute a graph). The entire profile K 1306 can then be unrolled to the runtime 630 as HW States 1316 by the iFSM 1314 via a temporal dimension in a sequential manner.

Figure 15C:
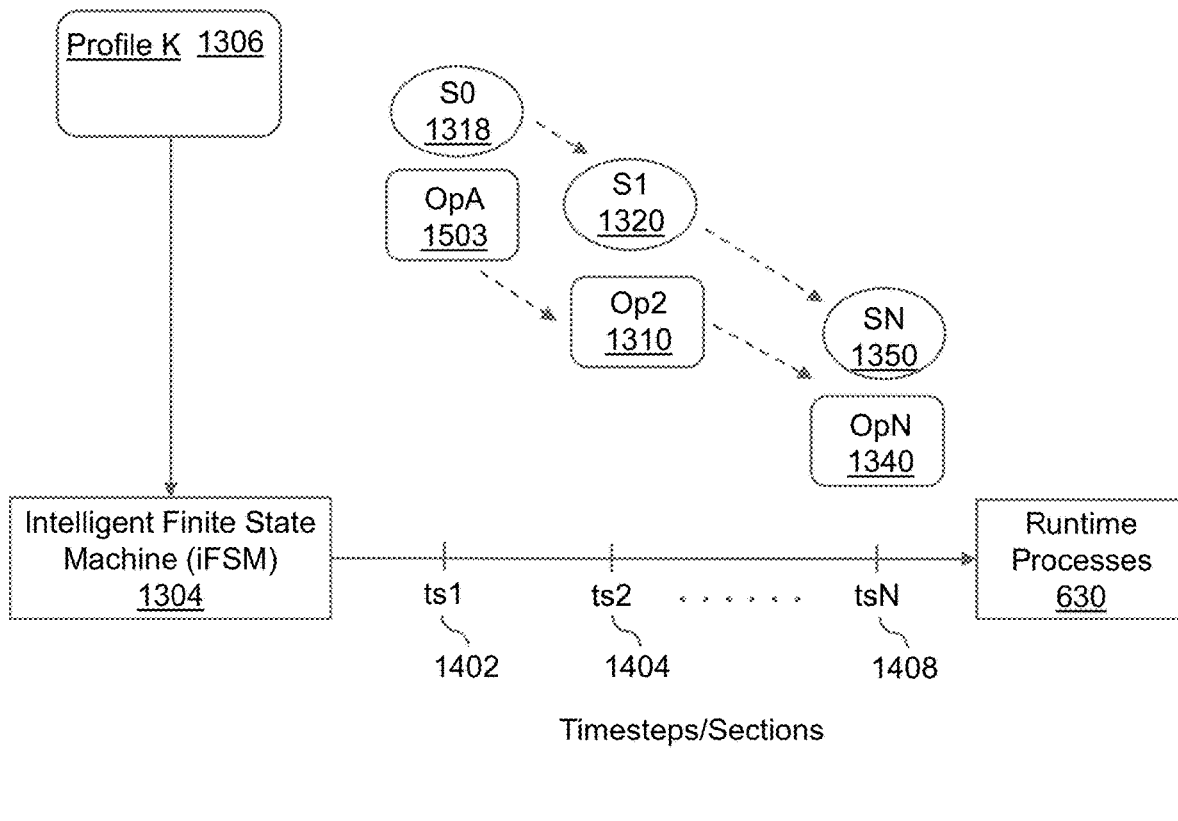
FIG. 15C is an example of a temporal orchestration for an IGOEE generated profile including a fused control operation, according to an embodiment of the present disclosure.

FIG. 15C illustrates an example implementation of a temporal unrolling of a profile including a fused op generated by the IGOEE 1302, according to an embodiment of the present disclosure. As shown, at timestep ts1 1402, the fused opA 1503 is provided to the runtime 630 at state S0 1318. At ts2 1404 and tsN 1408, the ops op2 1310 up to opN 1340 are provided to the runtime 630.

During the profile generation process, the iDSP generator 1304 may also generate some double-buffered ops by forming a short pipeline of two ops (a first op and a second op). In such a case the second op may stay in the pipeline while the first op is given to the runtime 630.

It may be understood that all the profiles including separate, fused, or double buffered ops are eventually unrolled onto the CGR and then onto tiles. The fused ops and double-buffered can increase the spatial and temporal bandwidth by minimizing the total number of hardware operations on a tile, thus increasing the overall efficiency of graph execution.

Figure 16A:
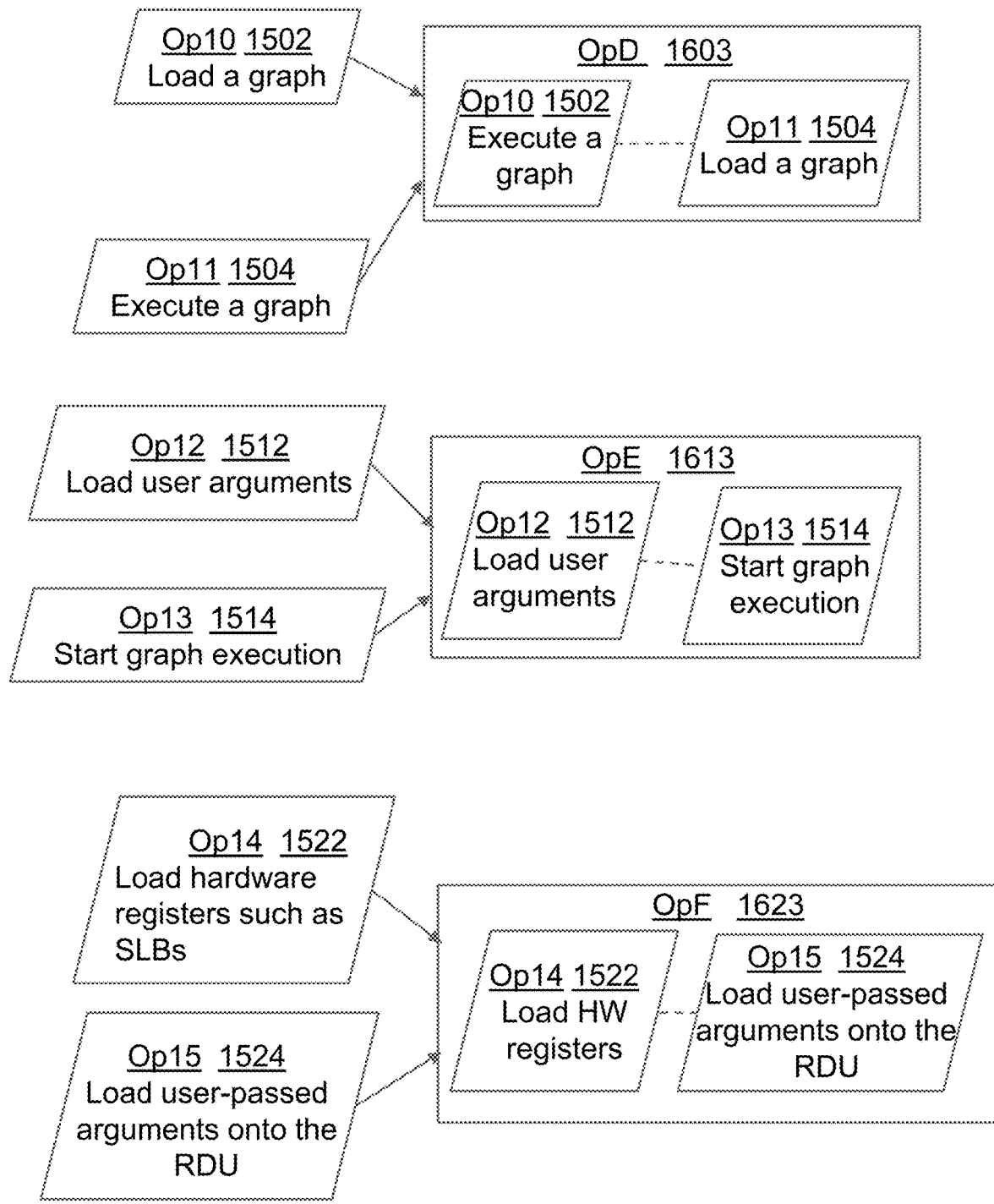
FIG. 16A illustrates some examples of double-buffered control operations, according to an embodiment of the present disclosure.

FIG. 16A illustrates some examples of double-buffered ops. For example, op10 1502 (load a graph) and op11 (execute a graph) 1504 can form a short pipeline to generate a double-buffered op opD 1603. Similarly, op12 1512 (load user arguments) and op13 1514 (start graph execution) can form a short pipeline to generate a double-buffered op opE 1613. Similarly, op14 1522 (load HW registers such as SLBs) and op15 1524 (load user-passed arguments onto the RDU) can form a short pipeline to generate a double-buffered opF 1623. The double-buffered ops opD 1603, opE 1613, and opF 1623 can be provided to the runtime 630 in a temporal dimension.

Figure 16B:
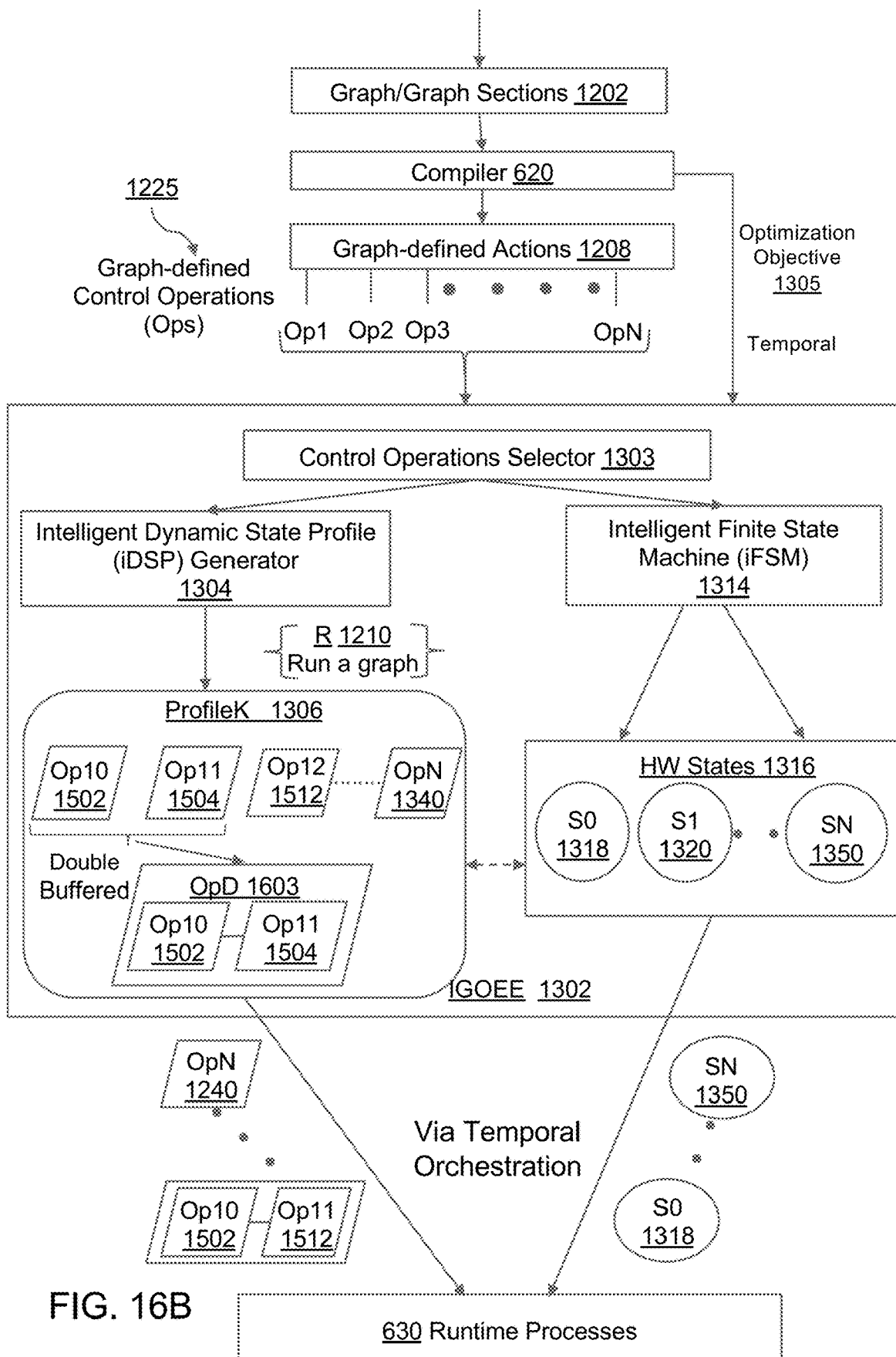
FIG. 16B is an example of an IGOEE generated profile including a double-buffered control operation, according to an embodiment of the present disclosure.

FIG. 16B illustrates an example implementation of an IGOEE 1302 configured to generate a double-buffered op. As shown, in the profile K 1306 related to the action R 1210 (run a graph), op10 1502 and op11 1504 are pipelined to generate a double-buffered op opD 1603, which can then be provided to the runtime 630 by the iFSM 1315 via a temporal dimension in a sequential manner. Similar to that of action R 1210, profiles including double buffered ops can be generated for other actions shown in FIG. 12B such as action S 1212 (tune hyperparameters of a graph) or action T 1214 (update input/output endpoints of graph).

FIG. 16C illustrates an example implementation of a temporal unrolling of a profile including a double-buffered op opD 1603 generated by the IGOEE 1302 in FIG. 16B, according to an embodiment of the present disclosure. As shown, at timestep ts1 1402, the double-buffered op opD 1603 is unrolled during the state S0 1318 of the iFSM. During unrolling of the op opD 1603, the first operation op 10 1502 may be unrolled first onto the RDU and the second op op11 1504 is unrolled after that. The second op op11 1504 is configured to stay in the pipeline until the unrolling of the first op op 10 1502 is complete. At timesteps ts2 1404 up to tsN 1408 op12 1512 and opN 1340 are unrolled.

Generally speaking, in the case of double-buffered ops, the two ops are pipelined. So, it entails scheduling operation 2 while executing operation 1. This method can hide the cost of the setup time of operation 2. Scheduling the next execution file for operation 2 not yet executed can include loading the configuration file for the operation 2. This means that the configuration file/commands of the operation 2 can be pre-fetched/pre-loaded into the registers or command buffers that hold the commands for the next operation of the RDU. This can be especially advantageous if the schedule at runtime is known ahead of time. As those skilled in the art may appreciate that time to load a configuration file may be of the order a few hundreds of nanoseconds for a high-performance memory; or a few hundreds of milliseconds for a low performance memory, and additionally be dependent on the location of the data being loaded from. Therefore, double-buffered ops can reduce the execution time of the graph especially on low performance memories. As can be understood by those skilled in the art, a fused op is the hardware's way of optimizing computing resources, whereas double buffered ops are software's way of optimizing computing resources via pipelining.

FIG. 17A illustrates an example implementation of an IGOEE 1302 configured to generate multiple profiles for various actions and unroll those to the runtime in a temporal dimension. In the example shown, the IGOEE 1302 generates profiles namely, profile0 1702 for the action R 1210, profile1 1704 for the action S 1212, and profile2 1706 for the action T 1214. In other examples there can be as many profiles as required by the graph. Also shown in FIG. 17A are HW states S0 1718, S1 172, and S2 1722 corresponding to the profiles. In other examples, there can be as many HW states as the number of profiles. In one example, there is a single HW state which can manage a single section/timestep of the graph and thereby manages multiple operations of a profile. Furthermore, all of the profiles can be sequentially unrolled to the runtime via a temporal dimension.

Figure 17B:
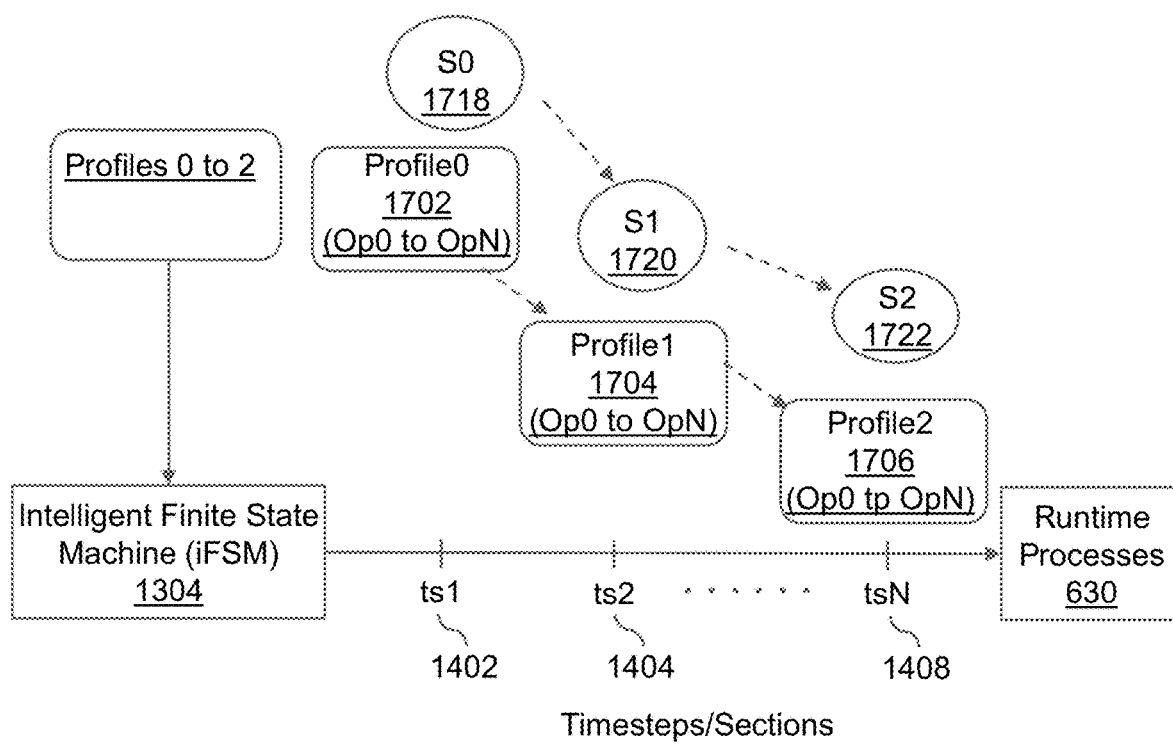
FIG. 17B is an example of a temporal orchestration for the IGOEE-generated multiple profiles shown in FIG. 17A, according to an embodiment of the present disclosure.

FIG. 17B illustrates an example implementation of a temporal unrolling of multiple profiles generated by the IGOEE 1302 in FIG. 17A, according to an embodiment of the present disclosure.

In case of multiple profiles, the IGOEE 1302 may fuse the ops in each profile either in SW or HW. If there is SW fusion of operations, that would result in pipelining of multiple HW states. If there is a HW fusion of operations, that would result in a single HW state.

In other words, the ops can be fused either in software (known as SW fusion) or hardware (HW fusion) before unrolling the profile. If there is SW fusion of ops, then that can further result in pipelining of multiple HW states in which the ops are provided to the runtime 630. In other words, all of the ops in a profile with SW fusion will be provided to the runtime 630 over multiple HW states.

If there is HW fusion of operations, then that can result in single HW state in which the ops are provided to the runtime 630. In other words, all of the ops in a profile with HW fusion will be provided to the runtime 630 in a single HW state.

As shown, at timestep ts1 1402, the profile0 1702 is unrolled and all of its ops (op0 to opN) are first unrolled during the state S0 1718 of the iFSM. Similarly, at timesteps ts2 1404 the profile1 1704 is unrolled and all of its ops (op0 to opN) are provided to the runtime 630 during the state S1 1720 of the iFSM; similarly at step ts3 1408 the profile2 1706 is unrolled and all of its ops (op0 to opN) are provided to the runtime 630 during the state S2 1722 of the iFSM.

Figure 18A:
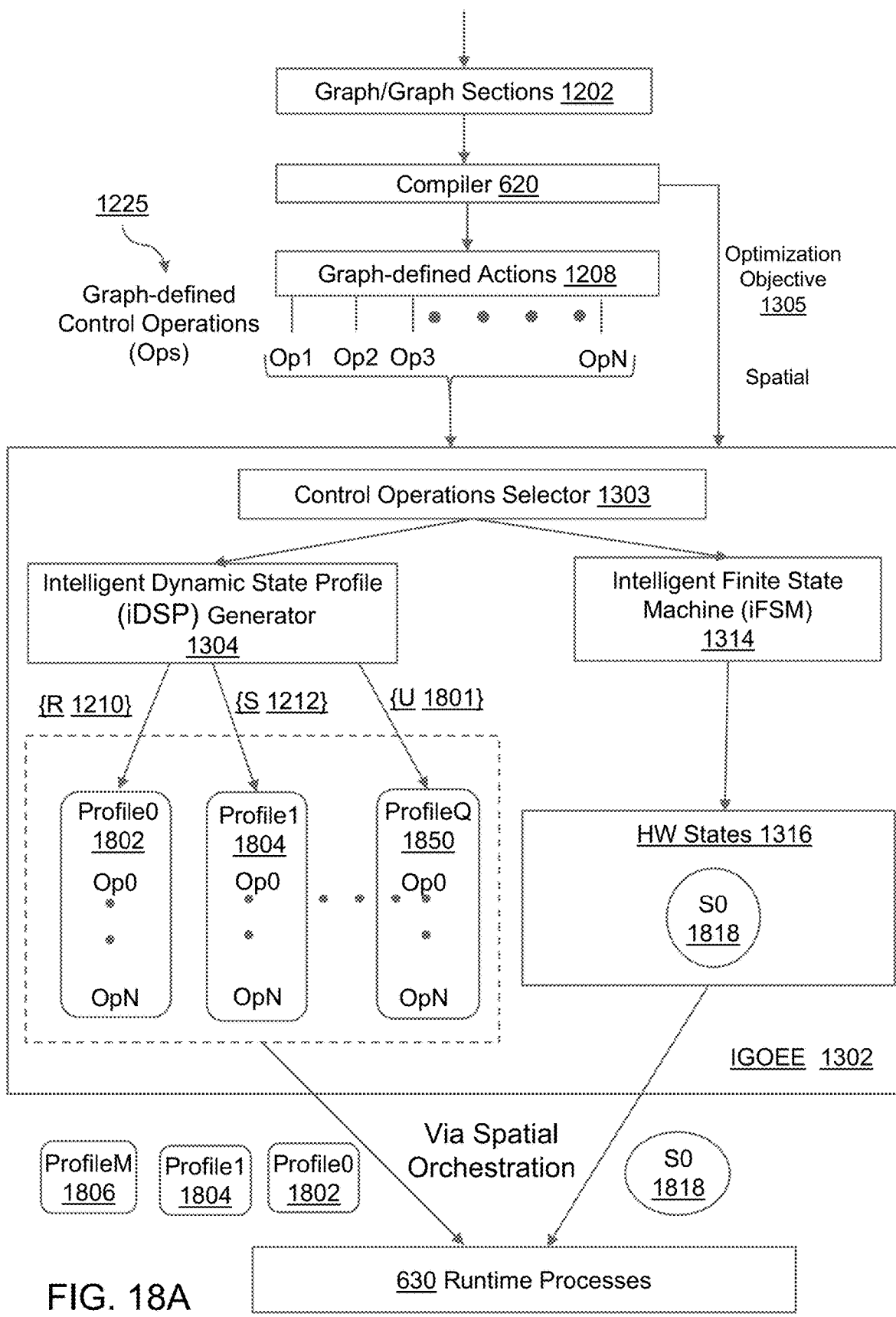
FIG. 18A is an example of IGOEE-generated multiple profiles for a spatial orchestration for multiple IGOEE-generated profiles, according to an embodiment of the present disclosure.

FIG. 18A illustrates an example implementation of an IGOEE 1302 configured to generate multiple profiles for various actions and unroll those to the runtime 630 in a spatial dimension, according to an embodiment of the present disclosure.

In one example, in spatial orchestration of profiles, the IGOEE is configured to unroll all the profiles onto the CGR processor 110 in parallel. In such a case, a profile is created for each CGR array of the CGR processor 110 to allow parallel unrolling of the profiles. In other words, the number of profiles generated may be equal to less than the number of the tiles.

In the example shown, it may be assumed that there are M tiles in the CGR processor 110. Therefore, the IGOEE 1302 generates Q profiles namely, profile0 1802 (for action R 1210) up to profileQ 1850 (for action U 1801). The iFSM 1315 can generate a single HW state S0 1818 during which all of these profiles can then be unrolled on to the CGR processor 110 in parallel.

Figure 18B:
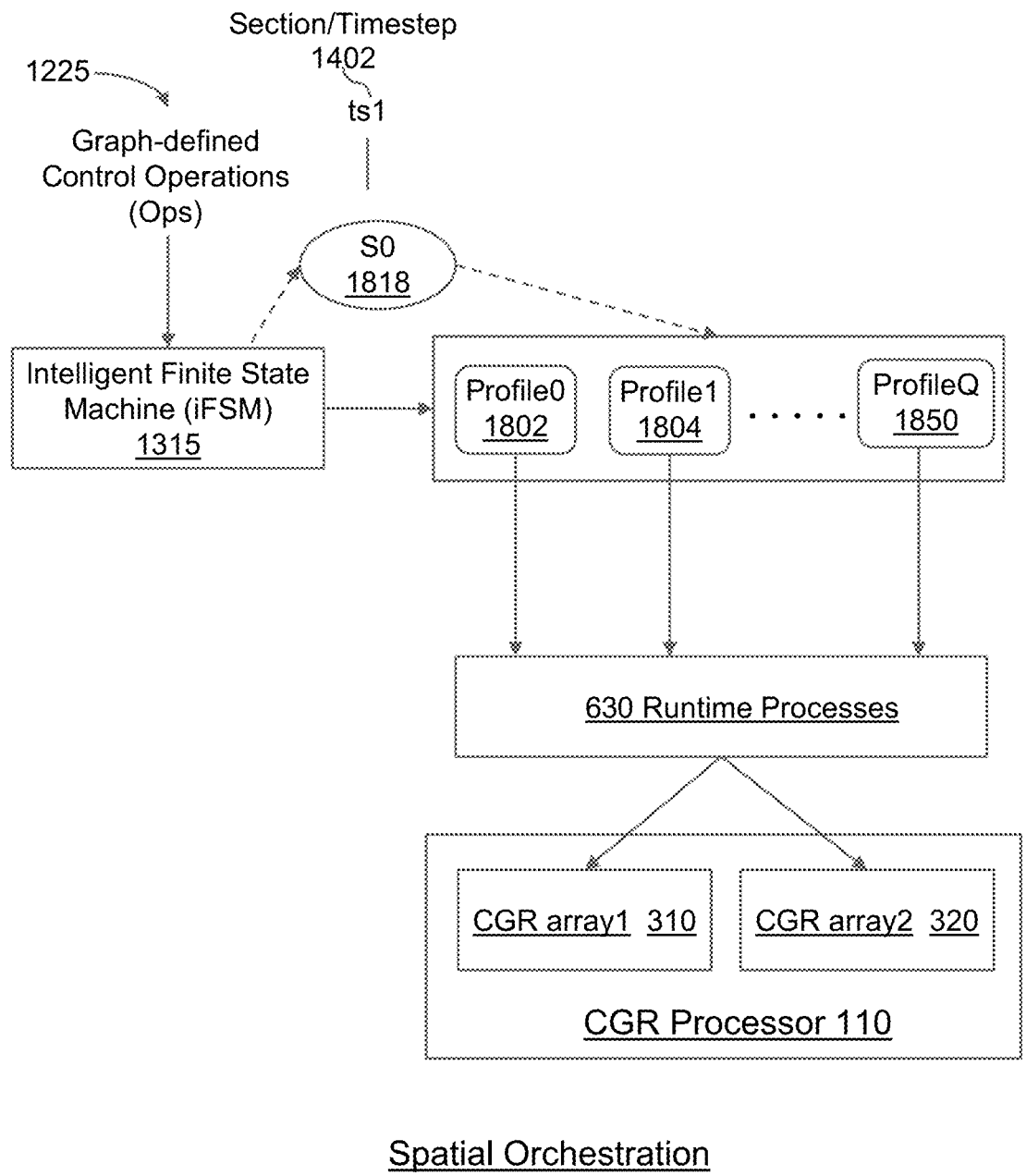
FIG. 18B is an example of a spatial orchestration for the IGOEE-generated multiple profiles shown in FIG. 18A, according to an embodiment of the present disclosure.

FIG. 18B illustrates an example implementation of a spatial unrolling of multiple profiles (spatial orchestration) generated by the IGOEE 1302 in FIG. 18A, according to an embodiment of the present disclosure. As shown, at timestep ts1 1402 and during the state S0 1818 of the iFSM, all the profiles profile0 1802 up to profileQ 1850 and all of their ops (op0 to opN) are unrolled in parallel onto the various arrays (tiles) of CGR processor 110 via the runtime 630.

Figure 19:
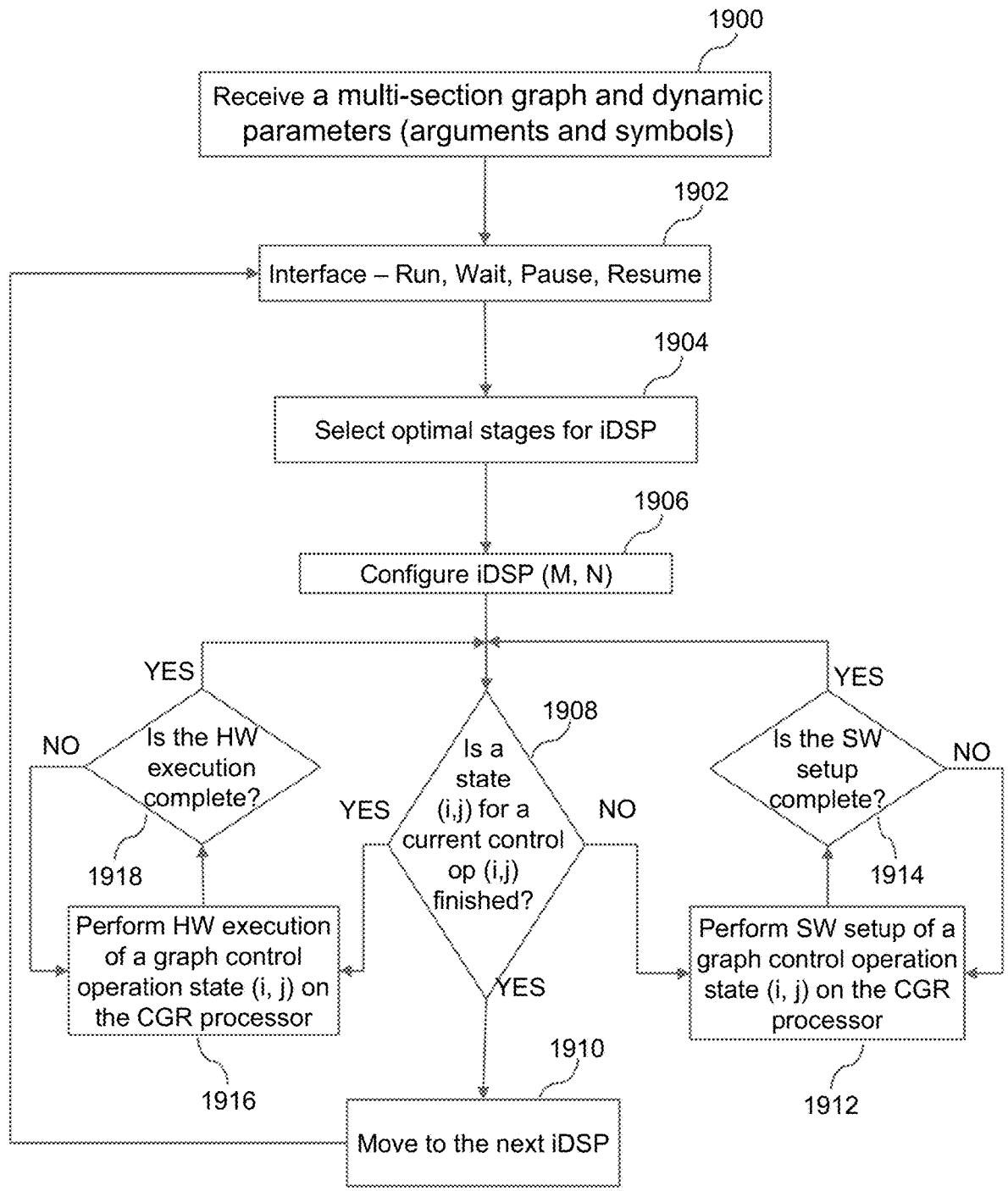
FIG. 19 illustrates an example flow diagram for an IGOEE, according to an embodiment of the present disclosure.

FIG. 19 illustrates an example flow diagram of a method for IGOEE 1302 shown in FIG. 13, according to an embodiment of the present disclosure.

As shown at step 1900, the method may receive a multi-section graph and related dynamic parameters such as arguments, symbols etc. required during the execution of the graph. For example, referring to FIG. 13, compiler 620 receives a dataflow graph 1202 or one or more sections of a dataflow graph 1202. The method may then proceed to step 1902.

At step 1902, the method may initially interact with the IGOEE via "run," "wait," "pause," "resume." Commands to allow the IGOEE to start, stop, or resume any action that is currently being performed. For example, if the IGOEE is in the profile generation process or in the profile unrolling process, then a user can start, the process by giving a "run" command, insert a delay in the process by giving a "wait"

command, pause the process by giving a "pause" command, and resume the process by giving a "resume" command. For example, the run command can allow the IGOEE to move to the next step. For example, referring to FIG. 13, when the iDSP generator 1304 is generating the profile K 1306 or when the profile is being unrolled onto the CGR, the user can enter commands to run, wait, pause, and resume any stage of the IGOEE 1302. The method may then proceed to step 1904.

At step 1904, optimal stages for the graph may be selected. In other words, the IGOEE may decide which control operations need to be included for a particular graph-defined control action. For example, in FIG. 13, the IGOEE 1302 includes a control operations selector 1303 that is coupled to receive the control ops 1225 and further select a few control ops (op0 1308 to op3 1314) from those related to the action R 1210 (run a graph). The method may then proceed to step 1906.

At step 1906, an iDSP (profile) may be generated using the selected control ops for the actions. M refers to the number of timesteps or sections in the graph and N refers to the number of control operations in a section. In one example, as many profiles as the sections are generated. Therefore, at this stage M profiles can be created each including N ops. For example, in FIG. 13, the iDSP generator 1304 may generate a profile K including the selected ops op0 1308, op1 1310, op2 1312, and op3 1314, for the action R 1210 (run a graph). The method may then proceed to step 1908.

At steps 1908, 1910, 1912, 1914, 1916, and 1918, the profiles can be unrolled and for each control op in the profile, SW set up and HW execution for the control op may be performed on the CGR processor. More particularly, at step 1908, it can be checked if a current state for a particular section and control op (i, j) is finished. If not, then the method can proceed to steps 1912, 1914 and 1916, 1918 in parallel. At steps 1912 and 1914, the SW set up for the particular control op (i, j) may be performed until complete. Similarly, at steps 1916 and 1918, the HW set up for the particular control op (i, j) may be performed until complete. After both the set ups are completed, the method may again proceed to step 1908, where the current state (i, j) may be identified as finished and the method may then proceed to step 1910.

At step 1910, the next profile may be serviced. At the end of step 1910, the method may go back step 1902, where user commands may be received during execution of the graph-defined actions.

Figure 20:
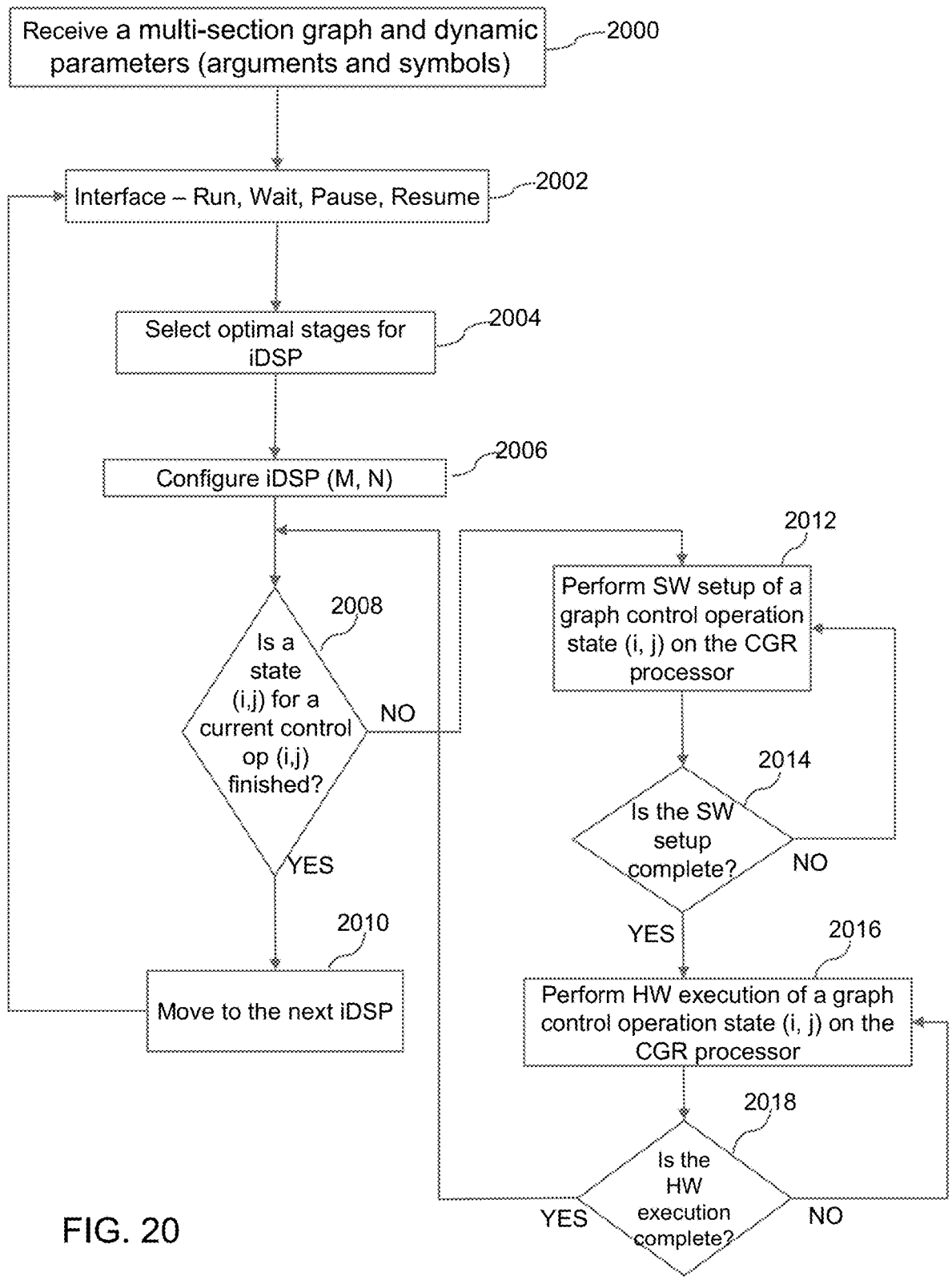
FIG. 20 illustrates another example flow diagram for an IGOEE, according to an embodiment of the present disclosure.

FIG. 20 illustrates another example flow diagram of a method for the IGOEE 1302 shown in FIG. 13, according to an embodiment of the present disclosure.

As shown at step 2000, the method may receive a multi-section graph and related dynamic parameters such as arguments, symbols etc. required during the execution of the graph. For example, referring to FIG. 13, compiler 620 receives a graph or one or more sections of a graph 1202. The method may then proceed to step 1902.

At step 2002, the method may initially interact with the IGOEE via "run," "wait," "pause," "resume." Commands to allow the IGOEE to start, stop, or resume any action that is currently being performed. For example, if the IGOEE is in the profile generation process or in the profile unrolling process, then a user can start, the process by giving a "run" command, insert a delay in the process by giving a "wait" command, pause the process by giving a "pause" command, and resume the process by giving a "resume" command. For example, the run command can allow the IGOEE to move to the next step. For example, referring to FIG. 13, when the iDSP generator 1304 is generating the profile K 1306 or when the profile is being unrolled onto the CGR, the user can enter commands to run, wait, pause, and resume any stage of the IGOEE 1302. The method may then proceed to step 2004.

At step 2004, optimal stages for the graph may be selected. In other words, the IGOEE may decide which control operations need to be included for a particular graph-defined control action. For example, in FIG. 13, the IGOEE 1302 includes a control operations selector 1303 that is coupled to receive the control ops 1225 and further select a few control ops (op0 1308 to op3 1314) from those related to the action R 1210 (run a graph). The method may then proceed to step 2006.

At step 2006, an iDSP (profile) may be generated using the selected control ops for the actions. M refers to the number of timesteps or sections in the graph and N refers to the number of control operations in a section. In one example, as many profiles as the sections are generated. Therefore, at this stage M profiles can be created each including N ops. For example, in FIG. 13, the iDSP generator 1304 may generate a profile K including the selected ops op0 1308, op1 1310, op2 1312, and op3 1314, for the action R 1210 (run a graph). The method may then proceed to step 2008.

At steps 2008, 2010, 2012, 2014, 2016, and 2018, the profiles can be unrolled and for each control op in the profile, SW set up and HW execution for the control op may be performed on the CGR processor. More particularly, at step 2008, it can be checked if a current state for a particular section and control op (i, j) is finished. If not, then the method can proceed to step 2012.

At steps 2012 and 2014, the SW set up for the particular control op (i, j) may be performed until complete. The method may then proceed to step 2016.

At steps 2016 and 2018, the HW set up for the particular control op (i, j) may be performed until complete. The method may again proceed to step 2008, where the current state (i, j) may be identified as finished and the method may then proceed to step 2010.

At step 2010, the next profile may be serviced. At the end of step 2010, the method may go back to step 2002, where user commands may be received during execution of the graph-defined actions.

At the end of step 2010, the method may go back to step 2002, where user commands may be received during execution of the graph-defined actions.

Partitioning the graph into different parts of the CGR—As explained earlier, the iFSM 1315 can orchestrate (partition) iDSP (profile) in both temporal and spatial dimensions. One way of partitioning the graph is a forward partition, in which it uses the same resources of the CGR but at different points in time. The iFSM can then orchestrate the iDSP (profiles) by using the temporal partitioning in different ways.

In one example, the compiler may compile a graph having many temporal partitions. One way to perform temporal partitioning by the iFSM is by allowing the CGR to manage the partitions: meaning that the compiler may compile a graph having, for example, ten different temporal partitions, all of which can be unrolled at runtime. In such a case, the runtime unrolls one temporal partition and when it generates its results then it moves on to schedule the next temporal partition on the RDU.

In another example, the temporal partitions can be loaded onto the RDU once, and RDU is also told where those subsequent temporal partition t+1, t+2, etc., are located. As such, the RDU once finishes the first partition, can automatically load the second partition, and so on. Advantageously, the setup time for each partition in software can be hidden, where all the setups are done/accelerated on the RDU itself.

To summarize, as explained with regard to FIGS. 12A to 20, the IGOEE 1302 as disclosed provides optimization for executing various graph-defined actions using temporal or spatial orchestration. The graph-defined functions require a configuration file (shown as 165 in FIG. 6), an argument file (not shown) a segment file (not shown) and a runtime executable file (shown as 1270 in FIG. 12C.) Different optimizations include-memory optimization, hardware fusion, and software pipelining. These optimizations can apply to both spatial and temporal orchestrations. One difference is that in the spatial orchestration, if optimizations have different states, then those apply to different states, whereas in the temporal case, the optimizations apply to different sections.

In one example, additional optimization steps can be implemented which can include: placement of the file configuration file (shown as 165 in FIG. 12C) the argument file (not shown) segment file (not shown) or the runtime executable file (shown as 1270 in FIG. 12C) in the host memory or the CGR memory. For example, the software can optimize runtime (for time and space), by managing the placement of configuration file (shown as 165 in FIG. 6) argument file (not shown) or the runtime executable file (shown as 1270) in the CGR memory (shown as 226 in FIG. 2) or the host memory (on-chip memory of host 180 in FIG. 1). This can be implemented for any type of orchestration temporal or spatial; and further for any type of ops such as fused ops, double buffered ops, SW pipelined ops, resultant ops after HW fusion, or during CGR unrolling the ops in any fashion. More specifically, As shown in FIG. 12B, in one example, the control ops for a graph-defined action such as "run a graph" 1210 can include the ops op0 1226 "load the program," op1 1227 "load the argument file," op2 1228 "load the segment file," and op3 1229 "execute the program file." All of these ops can be part of the configuration file 165 shown in FIG. 6. Furthermore, the argument file required for op1 1310, can be different from the configuration file 165. Each of these files (configuration file 165 or the argument file) can be placed in either the CGR memory or the host memory. In one example, the placement of configuration file and argument file can be different. In other examples both files can be placed in the same memory. Software can optimize the runtime and the placement of different files is orthogonal of the optimization and it can be applied to any orchestration. In other words, the CGR has the ability to push or pull data from host memory device or remote memory through IO channels. The iDSP can decide where it is best to push or pull the graph section data during its hardware operations based on what would be optimal for the performance and the use cases.

Additionally, as will be explained in the following paragraphs, embodiments of the present disclosure describe a debugging framework for the CGR processor 110.

Figure 21:
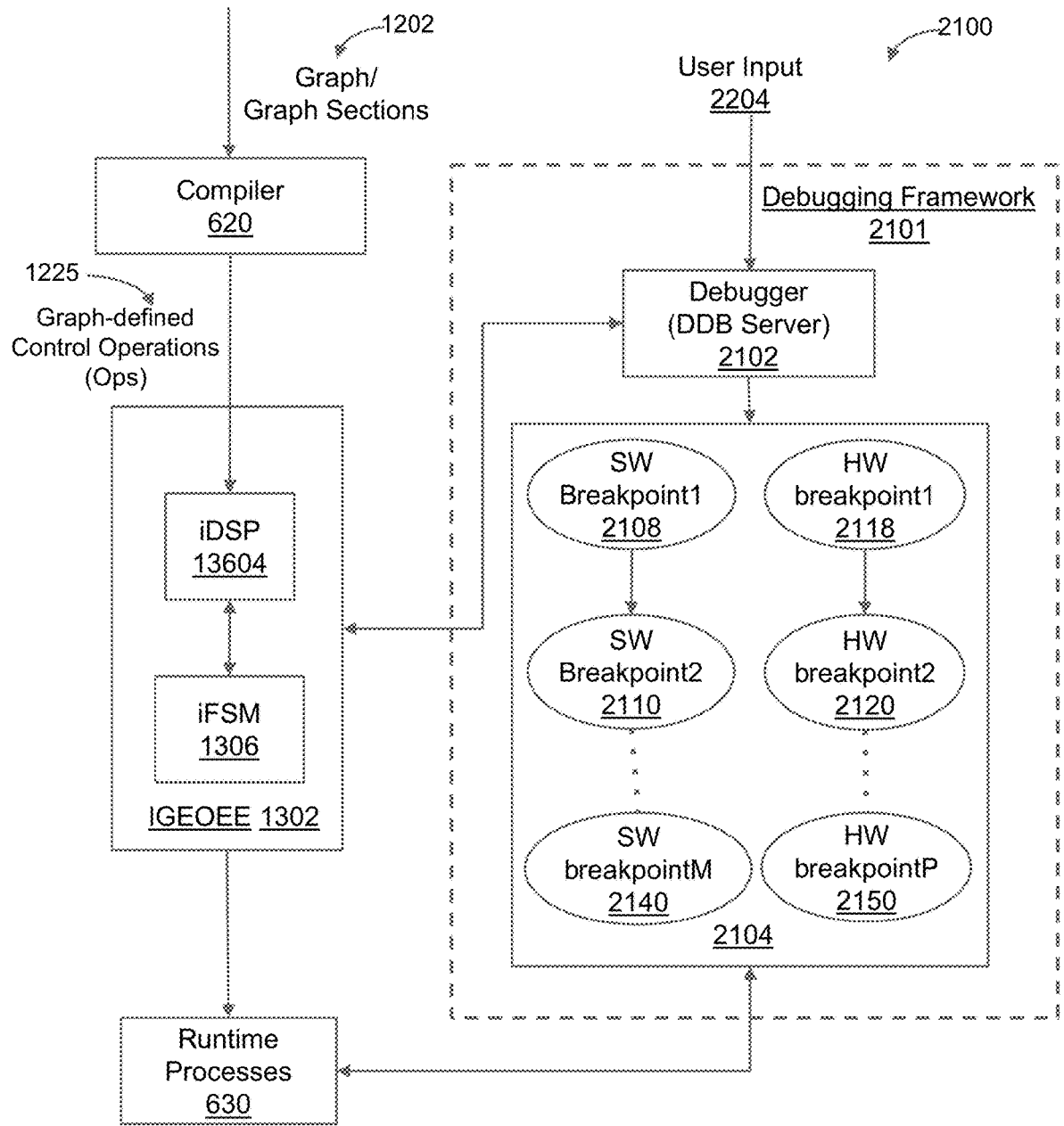
FIG. 21 illustrates an example implementation of a debugger for the CGR processor 110, according to an embodiment of the present disclosure.

FIG. 21 illustrates an example implementation 2100 of a portion of the system shown in FIG. 1, further including a debugging framework 2101, according to an embodiment of the present disclosure. The implementation 2100 illustrates the compiler 620, the IGOEE 1302, the runtime 630, and the debugging framework 2101. The debugging framework 2101 further includes a debugger 2102 (also referred to as DDB server) and various SW and HW breakpoints shown collectively as 2104. The debugging framework 2101 is coupled to receive a user_input1 2103, which can also be considered as a server-level user_input. Debugger 2102 can allow a user to inject breakpoints 2104 at various stages of the IGOEE 1302 to inspect, modify, or manage the execution flow. More particularly, the debugger 2102 is configured to interact with the IGOEE 1302 to create various SW and HW breakpoints 2104 which can be injected into the execution flow of a dataflow graph running on the CGR processor. Additionally, the debugger may allow the user to check the program state of a running application.

As shown, the debugger 2102 is configured to generate SW breakpoints sw breakpoint0 2108, sw breakpoint2 up to sw breakpointM 2140 as well as HW breakpoints hw breakpoint1 2118, hw breakpoint2 up to hw breakpointP 2150 all of which are collectively shown as 2104. In one example, the breakpoints 2104 are injected at various stages of the IGOEE 1302 as it is progressing through various graph-defined control ops such as ops 1301 (shown in FIG. 13) corresponding to specific graph-defined actions such as R 1210, S 1212, T 1214 (shown in FIG. 12B). For example, it may be assumed that the IGOEE 1302 is executing the action "run a graph" R 1210, and that the related control ops are op0 1308 (load the program), op1 1310 (load the argument file), op2 1310 (load the segment file) and op3 1312 (execute the program file.) It may be further assumed that the IGOEE 1302 is progressing through various stages stage0, stage1, stage2, and stage3 while unrolling and executing the ops op0, op1, op2, and op3 respectively. In such a case, in one example, the debugger 2102 can set up SW and HW breakpoints at any of the above stages and inspect the status of the ops and related information. Additionally, the SW breakpoints can be defined by configuration file 165 and the HW breakpoints are defined by the PEF file1 167, both shown in FIG. 6. In one example, the PEF file1 167 which is provided to the runtime includes a static configuration generated by the compiler and dynamic configuration generated by IGOEE.

In other words, using the breakpoints, a user can modify or inspect the graph meta data 1206. At a system level what this means is that if a user is trying to run an application written with a high-level framework such as TensorFlow or PyTorch, then the user can also set up breakpoints in the high-level program. The user can then compile the high-level program with desired breakpoints. After compilation, the PEF file1 167 is generated which includes both the static configuration data generated by the compiler and the dynamic configuration data generated by the IGOEE. The PEF file1 167 is provided to the runtime. During execution of the PEF file1 167, the program will stop at each of the pre-defined breakpoints allowing the user to inspect the state of the program and start the execution again from the same point.

In other words, in the system shown in FIG. 21, the execution of the configuration file or the runtime executable file on the CGR processor is dependent upon one or more breakpoint conditions; and the breakpoint conditions can be defined as metadata that supplements the configuration file or runtime executable file and is loaded onto the CGR processor in conjunction with the configuration file or the runtime executable file. Additionally, the breakpoint conditions can be defined at various levels of application granularity which include loop-level granularity, layer-level granularity, section-level granularity, and graph-level granularity.

Figure 22:
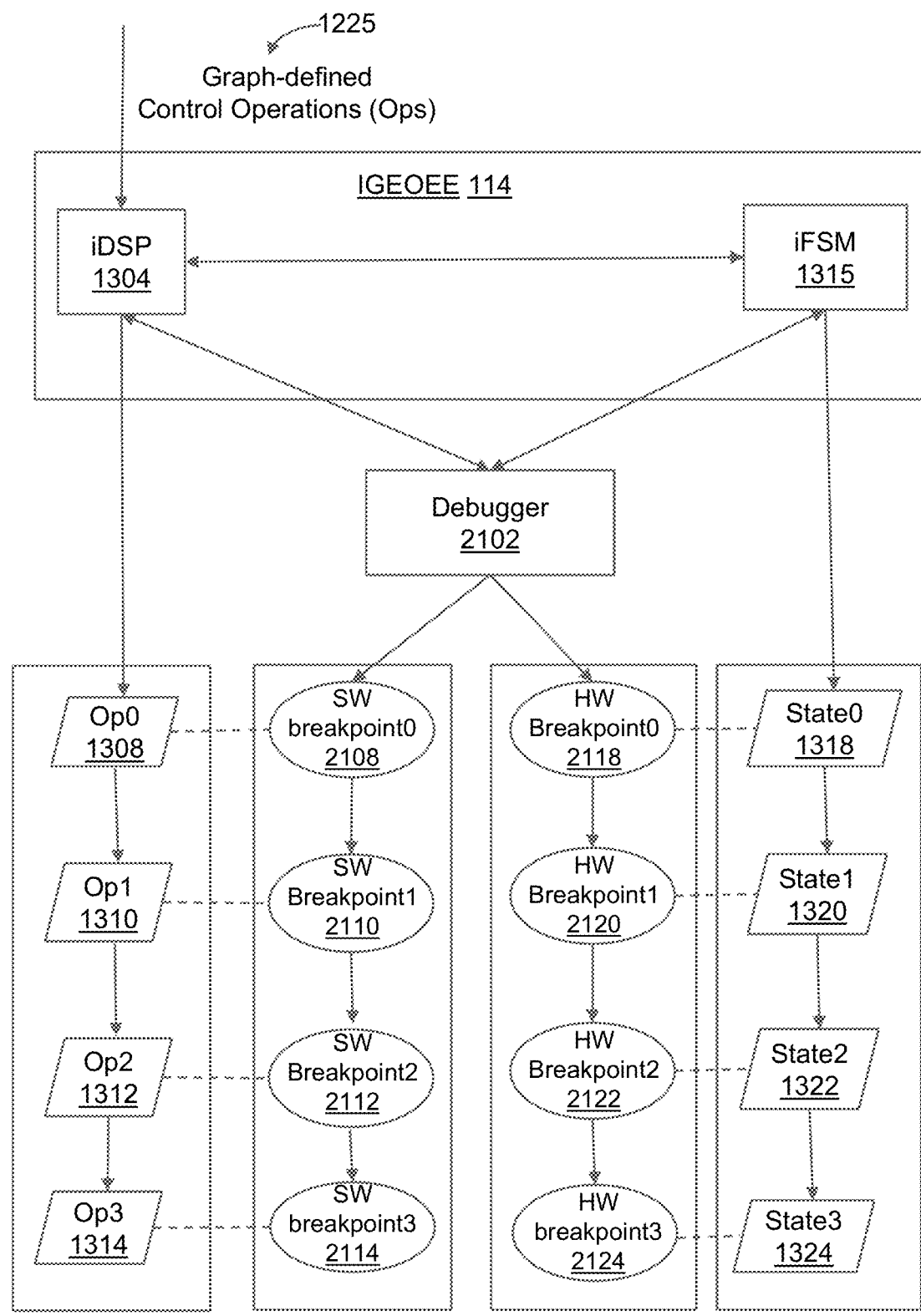
FIG. 22 illustrates further example details of a debugger configured to interact with IGOEE, according to an embodiment of the present disclosure.

FIG. 22 illustrates further example details of the debugger shown in FIG. 21 through interactions with IGOEE for a single iDSP (profile) including multiple software (SW) and hardware (HW) breakpoints, according to an embodiment of the present disclosure. As shown the debugger 2102 is coupled to interact with the iDSP generator 1304 to generate SW breakpoints sw breakpoint0 2108, sw breakpoint1 2110, sw breakpoint2 2112, and sw breakpoint3 2114 corresponding to the control ops op0 1308, op1 1310, op2 1312, and op3 1314 respectively.

Similarly, the debugger 2102 is coupled to interact with the iFSM 1315 to generate HW breakpoints hw breakpoint0 2118, hw breakpoint1 2120, hw breakpoint2 2122, and hw breakpoint3 2124 corresponding to the states state0 1318, state1 1320, state3 1322, and state4 1324, which are corresponding to the control ops op0 1308, op1 1310, op2 1312, and op3 1314 respectively. As explained earlier, in one example, control ops op0 1308, op1 1310, op2 1312, and op3 1314 can be examples of op0 1226 (load the program), op1 1227 (load the argument file), op2 1228 (load the segment file) and op3 1230 (execute the program file) respectively. As can be understood, the program can stop at any SW breakpoint and its corresponding HW breakpoint allowing the user to inspect the state of the program. As will be explained with regard to the next figure, each SW breakpoint can allow users to perform a number of tasks including checking details of the CGR configuration bits, checking intermediate values of data, modifying existing ops, modifying HW states, or more.

Figure 23:
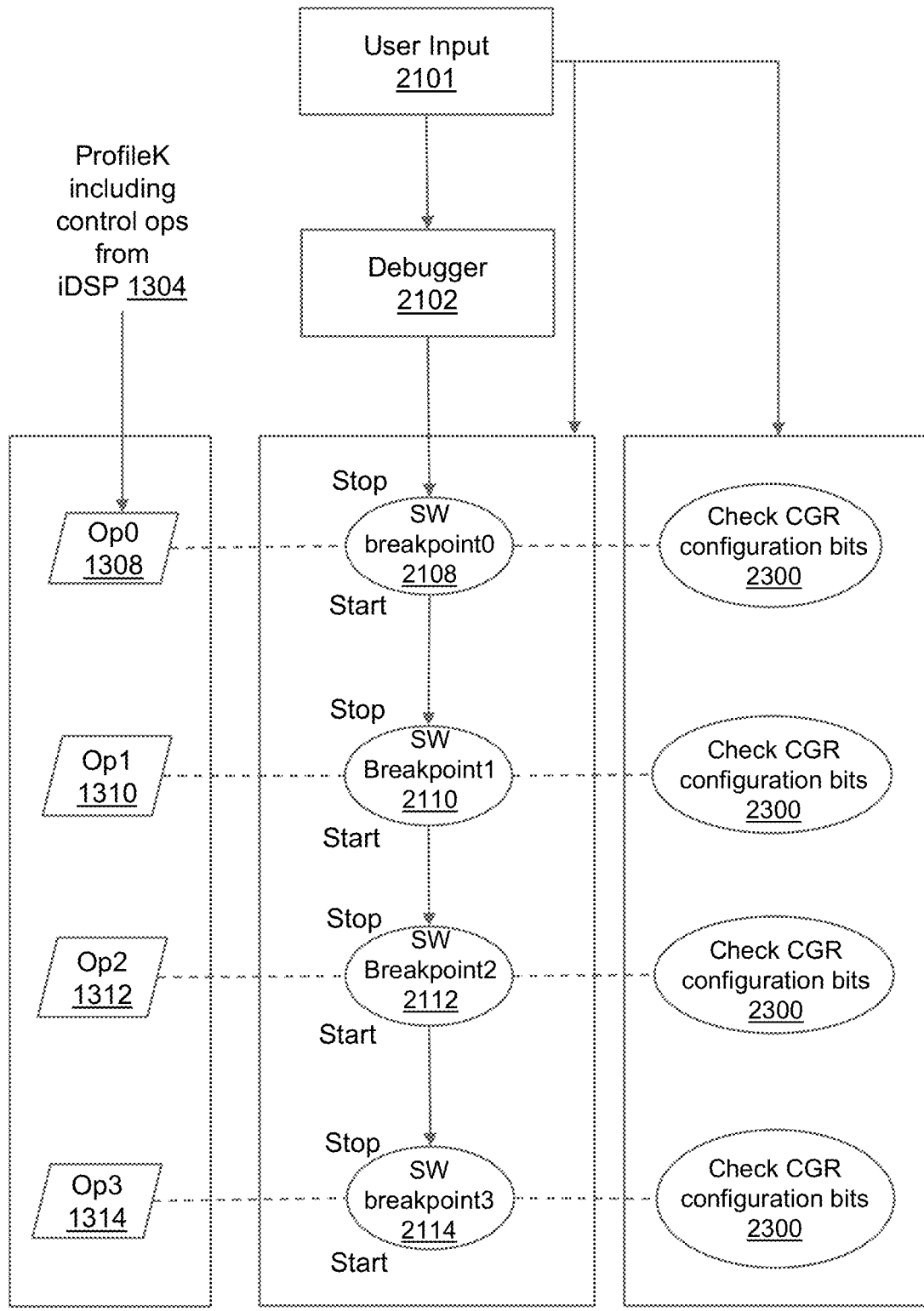
FIG. 23 illustrates further example details of a debugger configured to interact with IGOEE for a single profile including multiple graph-generated control operations (Ops) and software (SW) breakpoints and example user commands, according to an embodiment of the present disclosure.

FIG. 23 illustrates further details of the example of the debugger shown in FIG. 21, configured to interact with the user_input1 2103 and example user interactions (commands) at various SW breakpoints, according to an embodiment of the present disclosure. As can be seen, the debugger 2102 generates SW breakpoints 2108, 2110, 2112, and 2114, corresponding to the control ops op10 1502, op11 1504, op12 1512, and op13 1514 respectively which are included in the profile generated by the IGOEE 1302 shown in FIG. 13. In one example, after the user starts running the program (data graph), at any of these breakpoints the program stops; the user can then enter a command 2300 "check the CGR configuration bits", to check the current program state corresponding to the specific op and run the program again until the next SW breakpoint.

In one example, the CGR configuration bits can include bits for controlling the execution of the hardware, bits for monitoring the status of the hardware execution, and bits for capturing the hardware events during the execution.

As explained earlier, any number of the SW breakpoints can be defined by the user in the high-level program. The part of the program which includes such breakpoints may be referred to as a "debugger" and the breakpoints can be considered as the debugger's internal data. The user can create, replace, update, or delete any breakpoints and as such the execution flow of the program.

Figure 24:
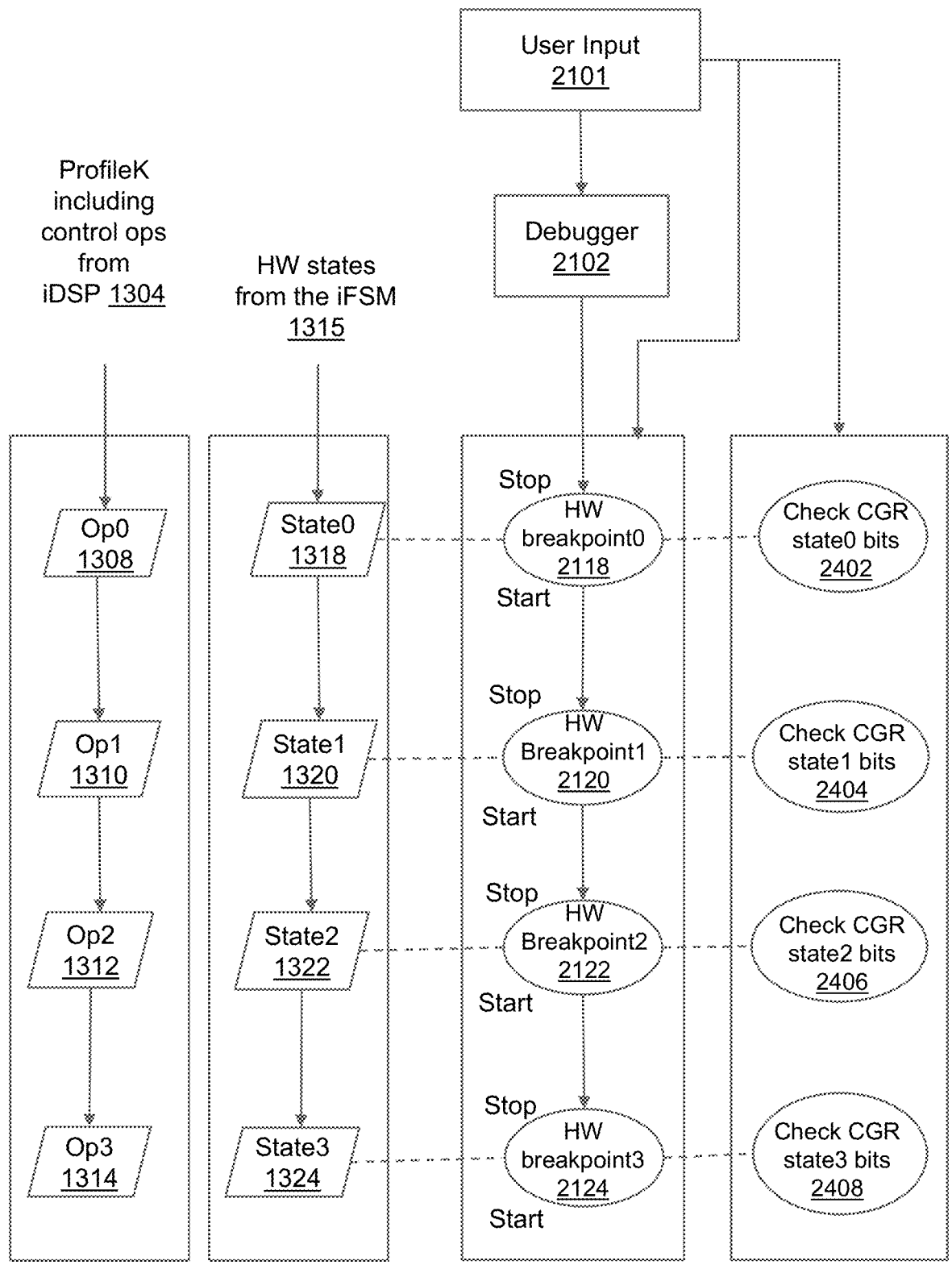
FIG. 24 illustrates further details of the example of a debugger configured to interact with IGOEE for a single profile including multiple graph-generated control operations (Ops) and hardware (HW) breakpoints and example user commands, according to an embodiment of the present disclosure.

FIG. 24 illustrates further details of the example of the debugger shown in FIG. 21, configured to interact with the user_input1 2103 and example user interactions (commands) at various HW breakpoints according to an embodiment of the present disclosure. As can be seen, the debugger 2102 generates HW breakpoints 2118, 2120, 2122, and 2124, corresponding to the iFSM-generated HW states state0 1318, state1 1320, state2 1322, and state3 1324 respectively, which in turn correspond to the control ops op10 1502, op11 1504, op12 1512, and op13 1514 respectively. At any of these breakpoints the program can initially stop; the user can then enter commands 2402-"check the CGR state0 bits," 2404—check CGR state1 bits," 2406 "check CGR state2 bits," or 2408 "check CGR state3 bits," to check the current program state, corresponding to a specific state and run the program until the next HW breakpoint.

In one example, CGR state bits can include bits for checking completion status of its corresponding op. For example, referring briefly to FIG. 12B, if the graph-defined action R 1210 "run a graph" is being executed, then at the HW breakpoint 2118, checking CGR state0 bits 2402 can include bits for checking if the op0 1308 "load the program" is completed. At the HW breakpoint 2120, checking CGR state1 bits 2404 can include bits for checking if the op1 1310 "load the argument file" is completed. At the HW breakpoint 2122, checking CGR state2 bits 2406 can include bits for checking if the op2 1310 "load the segment file" is completed. At the HW breakpoint 2124, checking CGR state3 bits 2408 can include bits for checking if the op3 1230 "execute the program file" shown in FIG. 12B is completed. Similarly, if the graph-defined action being executed is S 1212 "tune the hyperparameters of a graph," then at the hardware breakpoints, the CGR states bits mentioned above related to the corresponding ops can be checked. Additionally, the CGR state bits can include bits for checking completion status of configuration file loading, bits for checking completion status of hyperparameter loading, or bits for checking if any data transfer is completed. It may be noted that the data here refers to the data that may be provided to the CGR while running the graph. Additionally, the CGR state bits corresponding to different states may be different and can be inspected via different command registers.

As explained earlier, any number of the HW breakpoints can be defined by the user in the high-level program. The user can create, replace, update, or delete any breakpoints and as such the execution flow of the program.

Figure 25:
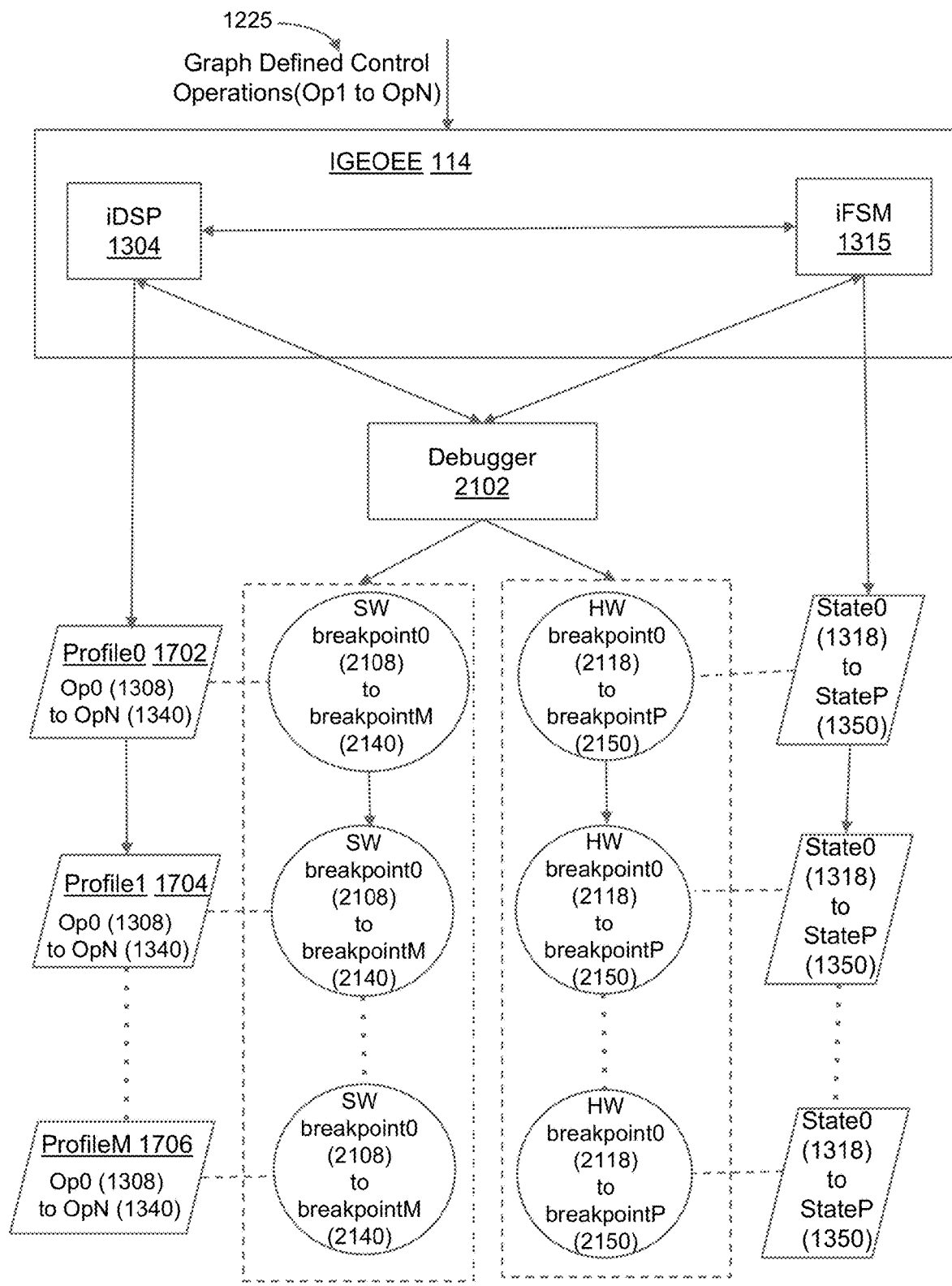
FIG. 25 illustrates further details of an example debugger configured to interact with IGOEE for multiple profiles, each including multiple graph-generated control operations (Ops), their corresponding HW states, multiple SW and HW breakpoints, and example user commands, according to an embodiment of the present disclosure.

FIG. 25 illustrates further example details of the debugger 2102 shown in FIG. 21 through interactions with IGOEE for multiple profiles including multiple SW and HW breakpoints, according to an embodiment of the present disclosure. In this example, the IGOEE 1302 generates multiple profiles profile0 1702 to profileM 1706. The debugger 2102 then generates SW breakpoints (breakpoint1 2108 to breakpointM 2140) for each control op in each profile. The debugger 2102 also generates HW breakpoints (breakpoint1 2118 to breakpointP 2150) for each iFSM state corresponding to each control op in each profile. At each of the SW breakpoints above the user can check the program state by checking the CGR configuration bits. Similarly, at each of the HW breakpoints the user can check the program state by checking the CGR state bits.

For all the above examples, the CGR configuration bits and CGR state bits can be part of an CGR screenshot file. In one example, the debugger 2102 may check the CGR configuration bits and the CGR state bits concurrently, sequentially, alternately, or in any suitable manner as chosen by the user. In some examples, some breakpoints can also be skipped without checking any configuration bits or state bits.

Figure 26:
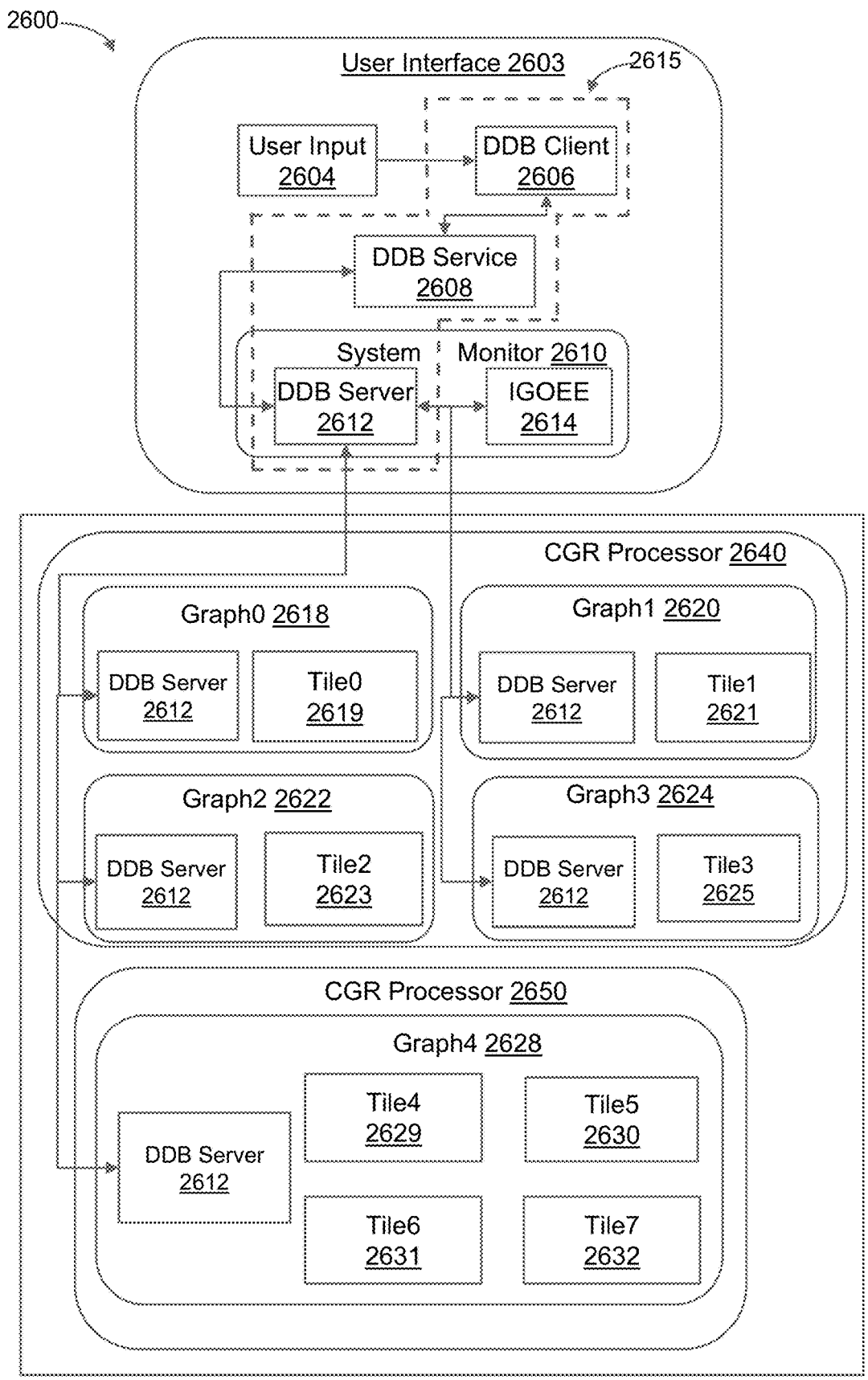
FIG. 26 illustrates an example implementation of a debugging framework in a system including one or more CGR processors, according to an embodiment of the present disclosure.

FIG. 26 illustrates an example of a system 2600 including the debugger or debugging framework and CGR processors 2640 and 2650 similar to the CGR processor 110. More specifically, the system 2600 illustrates a node 2602 which includes a user interface 2603 further including a user_input2 2604, a DDB client 2606, a DDB service 2608, a system monitor 2610 further including a DDB server 2612, and an IGOEE 2614. The user_input2 2604 can be considered as a system-level user_input. The IGOEE 2614 may be one example of the IGOEE 1302 shown in FIG. 13. The DDB client 2606 and the DDB service 2608, and the DDB server 2612 may be collectively referred to as "a debugging framework." The DDB client 2606 and the DDB service 2608 and the DDB server 2612 are all bidirectionally coupled to interact with each other and may form a communication link between the user_input2 2604 and the CGR processors 2640 and 2650. The DDB server 2612 can be thought of as an instance of the debugger 2102 shown in FIG. 21, coupled to interact with the IGOEE 2614 and furthermore with one or more tiles in the CGR processors.

The system 2600 can be configured to receive and execute a single or multiple data graphs by each processor. For example, as shown the CGR processor 2640 is configured to execute multiple data graphs each by a separate tile; graph0 2618 by tile0 2619, graph1 2620 by tile1 2621, graph2 2622 by tile2 2623, and graph3 2624 by tile3 2625. The CGR processors 2650 is configured to execute a single data graph 2628 by all four tiles tile4 2629, tile5 2630, tile6 2631, and tile7 2632. In other examples, there can be other combinations of number for graphs and tiles.

In one example, a user can manage the execution flow of graphs by providing commands via the user_input2 2604. The DDB client 2606 can receive commands in the form of the user_input2 2604, which are passed to the DDB server 2612 via the DDB service 2608 and the DDB server 2612 is coupled to interact with the IGOEE 2614 to execute the received commands. As explained earlier in the specification, the commands can be related to managing or inspecting the execution flow the graphs on the CGR processors 2640 and 2650.

More specifically, the debugger can allow the user to inject breakpoints at various stages of the IGOEE 1302 to inspect the status and details of the configuration file 165 shown in FIG. 6. As will be explained in the following paragraphs the breakpoints can be SW breakpoints or HW breakpoints.

When a user debugs a running application on the CGR processors 2640 or 2650, a dedicated communication channel is opened for the DDB server 2612 to allow the user to communicate with the IGOEE 1302. This configuration allows the user to inject and manage breakpoints at the section boundaries of IGOEE, and to create/replace/update/delete (CRUD) the application execution flow decided by IGOEE 1302. As explained earlier, a breakpoint can be either a HW breakpoint or a SW breakpoint. The HW breakpoint can be defined by the configuration file and the IGOEE. The software breakpoint can be defined by the executable file and the IGOEE. Once the breakpoints are defined, the user can inspect the intermediate program states of a running application by IGOEE such as a CGR state screenshot file, and the intermediate program values associated with the running application. The CGR state screenshot file (not shown) includes both the CGR configuration bits that define what an application will do, and the CGR state bits that include the current states of the hardware. In one example, a CGR state bit indicates a completion status of a previously issued instruction and another CGR state bit can signal a particular hardware malfunction.

In one example, the configuration bits provide the instructions to the hardware to execute matrix addition and multiplication. The values of these bits can vary depending on the dimensions of the matrix inputs. In other examples, configuration bits can also be used for other functions and operations.

Generally speaking, there can be as many instances of the DDB server 2612 as the number of tiles. In one example, multiple graphs from one user can be encapsulated into one application launch command. This translates to the CGR processor executing multiple graphs by multiple tiles. An example of this is shown by CGR processor 2640, configured to execute multiple graphs, specifically a separate graph by each tile (graph0 2618, graph1 2620, graph2 2622, and graph3 2624) as explained earlier. In such a case, system 2600 may generate a separate instance of the DDB server 2612 for each tile thereby allowing the user to debug each graph selectively and cooperatively.

When an application runs across more than one minimum compute unit (such as a tile), the DDB server may interact with the portion of application on each minimum compute unit independently. An example of this is shown by the CGR processor 2650, which is configured to interact with a single graph (graph4 2628) by all the tiles (tile4 2629, tile5 2630, tile6 2631, tile7 2632) In such a case, the system 2600 generate single instance of the DDB server 2612 common for all the tiles. The DDB framework 2615, in addition, provides support to inspect and update the CGR hardware state directly, without the context of an application. The DDB server 2612 can start a special communication channel in software to connect to the CGR hardware, and directly read and write the CGR hardware states, per a user's requests.

To prevent unauthorized access to the software and hardware states, the DDB requires authentication before a user initiates a debugging session. The administrator can further configure a regular user's privileges. The DDB supports multiple sources of credentials to verify a user's identity, for example, passwords, certificates, Kerberos tickets, etc. An example implementation of the communication channel is a client/server model where the DDB is a client instance and servers operate on the system monitor and graph program processes. The server and client can be connected through a dedicated communication channel, such as gRPC channels. User inputs can be provided from the command line, GUI or API. For distributed applications using more than a single node, DDB service would be configured on each node for users to debug programs on respective nodes, communication would be via sideband channels, such as TCP/IP interfaces available between nodes.

Figure 27:
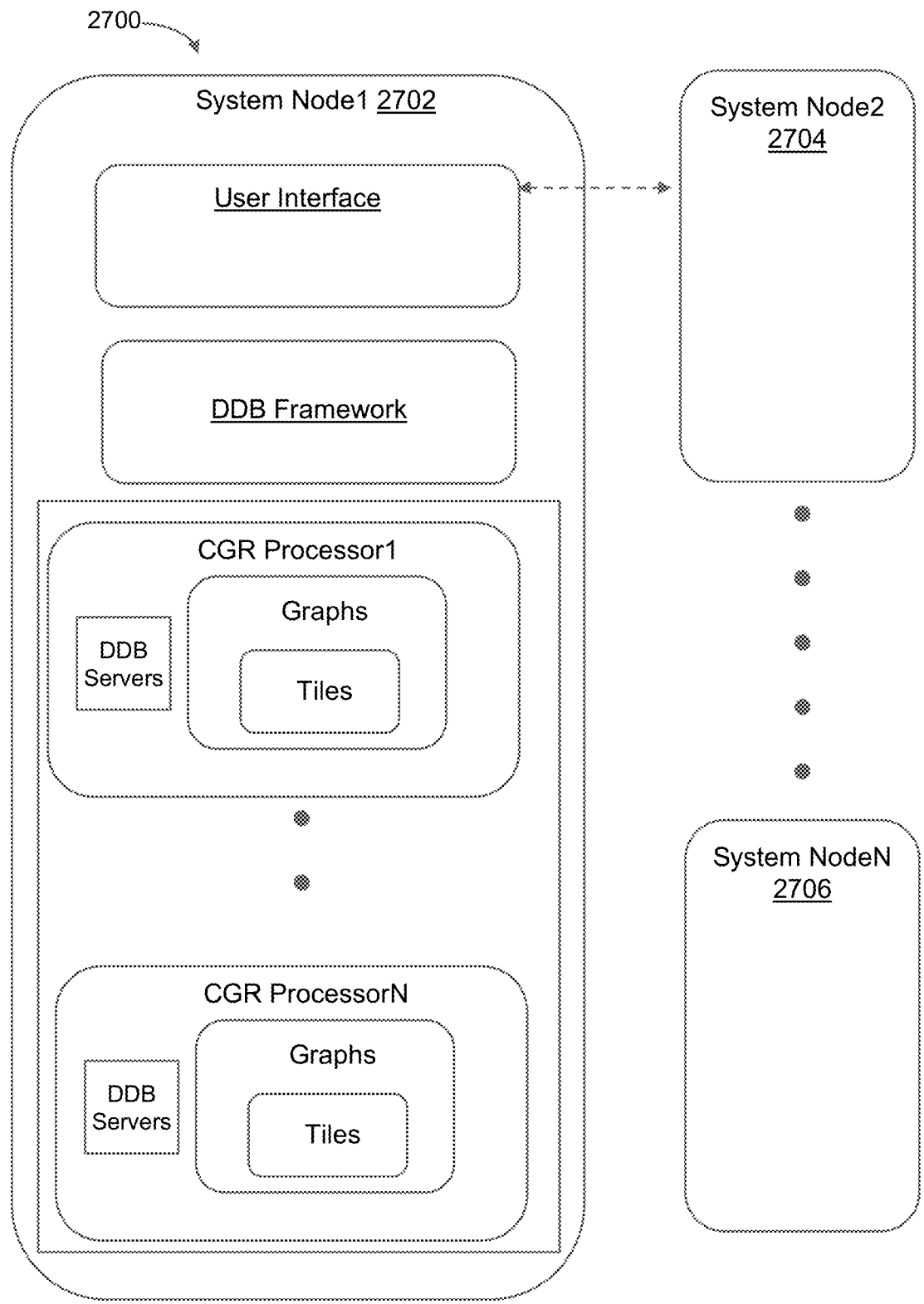
FIG. 27 illustrates an example system including system nodes, each system node further including a user input and a debugging client, and a debugging server, according to an embodiment of the present disclosure.

FIG. 27 illustrates an example implementation of a network 2700 including multiple system nodes (hereinafter, "nodes") node1 2702, node2 2704 up to nodeN 2704, which may also be referred to as "workers.". Each node may be similar to the system 2600 shown in FIG. 26 including a debugging framework similar to 2615. In one example, a node may be a workstation PC such as Lenovo, Dell, or any other. Such nodes may be connected in a daisy chain fashion as shown. In other examples, the system nodes may be interconnected such that each node is connected to every other node. In some other examples, the nodes may be connected in a topology as demanded by the network design.

When a user application runs in a distributed fashion encapsulating multiple related but loosely coupled workers possibly on multiple nodes, the DDB supports a user to debug each worker (software running on a pool of CGR processors) independently and cooperatively. The user has the capability to interact with any worker running on each minimum compute unit with the option to maintain worker dependency, allowing the user to coordinate between all related workers during the debug. The DDB also supports a user to inspect the intermediate cross-worker transport state of the running application, and the intermediate cross-worker transport values associated with the running application.

Figure 28:
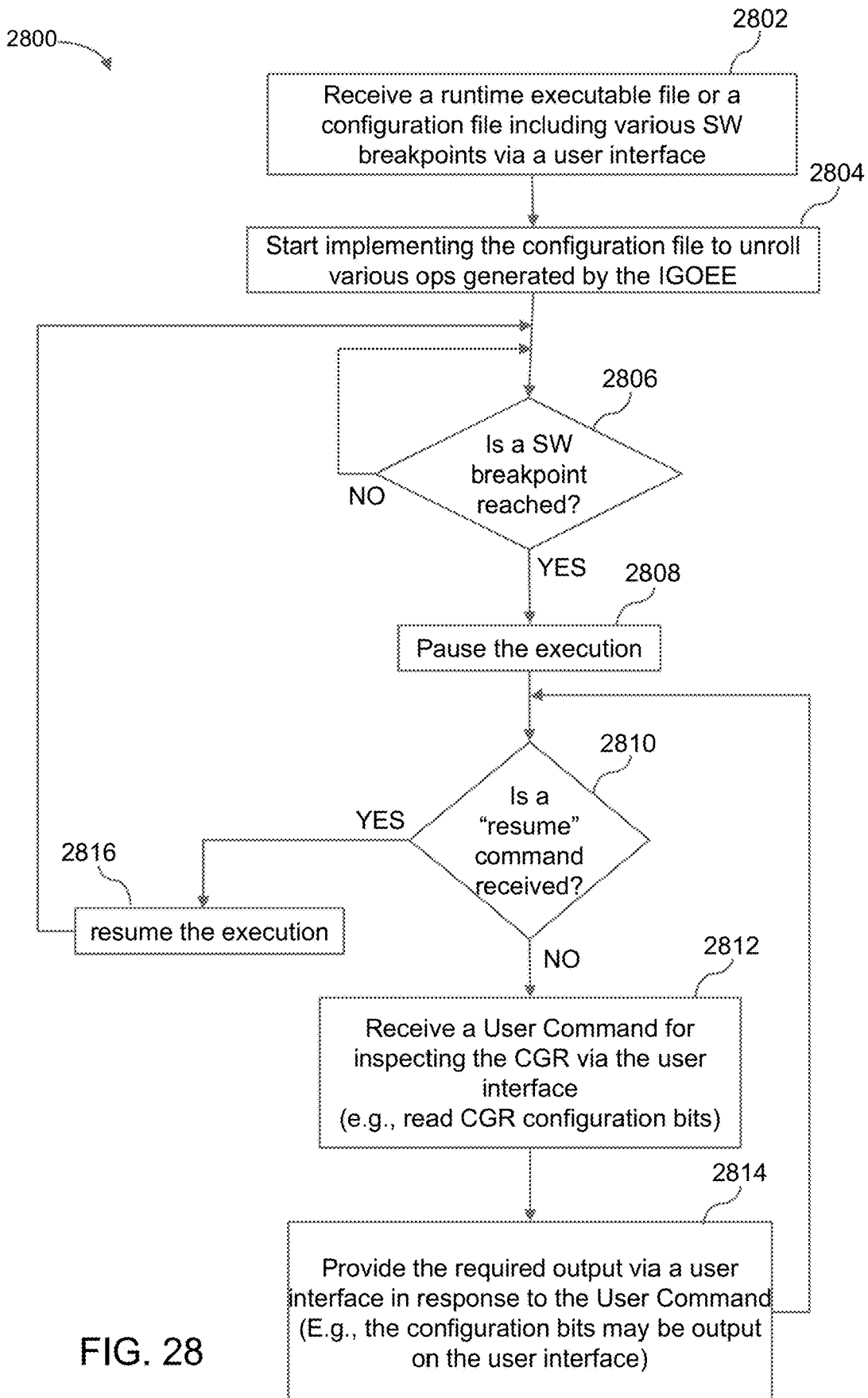
FIG. 28 illustrates an example flow diagram of a debugger for a CGR processor, according to an embodiment of the present disclosure.

FIG. 28 illustrates an example flow diagram 2800 of a method for a debugger 2102 (shown in FIG. 21) which can be included in the CGR processor 110 of system 100 shown in FIG. 1, according to an embodiment of the present disclosure. The flow diagram 2800 illustrates the method for the debugger 2102 while it is progressing through multiple SW breakpoints, according to an embodiment of the present disclosure. As shown at 2802, the CGR processor 110 can receive a runtime executable file 1270 (shown in FIG. 12C) including various SW breakpoints related to various control ops generated by the IGOEE. A user can load the configuration file via an application platform by giving a load graph command via a user interface. The configuration file is generated using an application platform such as PyTorch, TensorFlow etc., compiled by a compiler, further modified by IGOEE to include various control ops, and may be provided to runtime for the CGR processor. For example, as shown in FIG. 26, a user can use the user input2 2604 to load a configuration file 165 shown in FIG. 6. The configuration file 165 can be generated by the application platform 610, the compiler 620, modified to include various control ops such as "load a program", "load the argument file", "load the segment file", or "execute the program file," generated by the IGOEE as shown in FIG. 13; and may be further provided to the runtime 630 to be executed by the CGR processor 2640. There can be another configuration file for each processor or separate configuration files for all the processors. The method can then proceed to 2804.

At 2804, the CGR processor can start processing the received configuration file including the static and dynamic configuration, to unroll various IGOEE-generated ops. For example, as shown in FIG. 12C, the runtime executable file 1270, which includes the static and dynamic configuration data, is provided to the runtime 630. Furthermore, referring to FIG. 13, the iFSM 1315 can start unrolling the ops (op0 1308 "Load the program", Op1 1310 "Load the argument file", Op2 1312 "Load the segment file", and Op3 1314 "Execute the program file.") generated by the iDSP generator 1304 for the respective graphs using the runtime 630. The method can then proceed to 2806 during execution of the graph.

At 2806 during unrolling of the ops, the method can check if a breakpoint is received. If a breakpoint is received, then execution may be paused at 2808. If not, then the execution may continue. For example, in FIG. 22, while op0 1308 is being executed, a SW breakpoint0 2108 may be received as defined in the configuration file. From 2808, the method may proceed to 2810.

At 2810, the method may check if a "resume" command is received. If so, then the method may proceed to 2816 and resume the execution and further keep checking for a breakpoint at 2806. For example, in FIG. 22, after being paused at the SW breakpoint0 2108, the user can choose to inspect the CGR information (for example, CGR configuration bits) specific to op0 and state0 respectively or can give a resume command to start the execution again. If the user chooses to inspect the CGR information, then the method may proceed to 2812. If the user chooses to resume the execution, then the method may proceed to 2816.

At 2812, the method can receive a user command via the user interface to inspect the configuration file or the CGR. For example, a user may provide a command 2300 at this stage to read the configuration bits, as shown in FIG. 23. The method may then proceed to 2814.

At 2814, an output may be provided to the user in response to the user command. For example, in FIG. 23, at SW breakpoint0 2108, the user can read the configuration bits related to the op01308 via the user interface. At the end of 2814, the method can go back to the beginning of 2810 and wait to receive the "resume" command following which it can resume execution. For example, in FIG. 23, at the SW breakpoint0 2108, the user can give a resume command and resume the execution until the next SW breakpoint1 2110.

Figure 29:
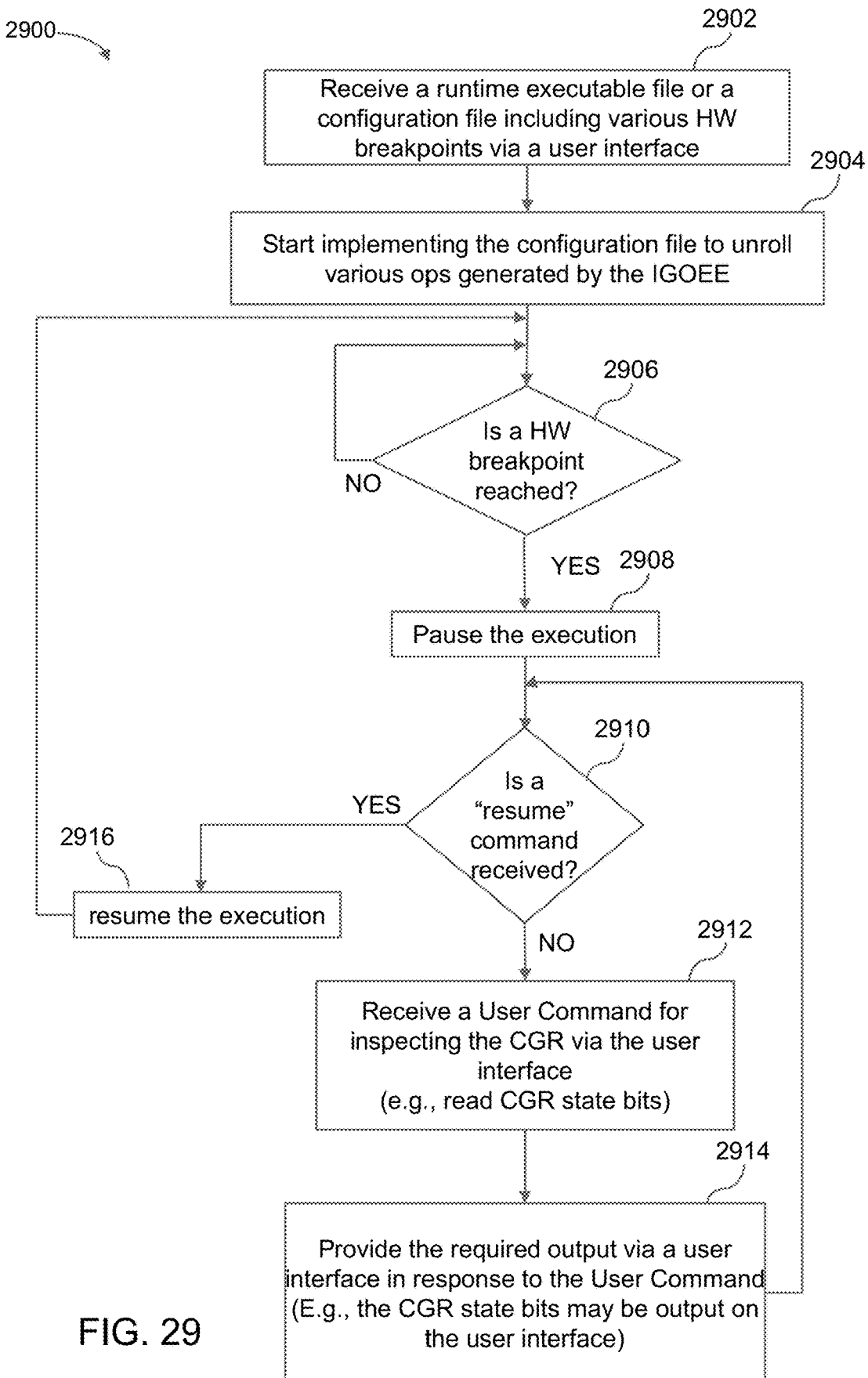
FIG. 29 illustrates another example flow diagram of a debugging framework for a CGR processor, according to an embodiment of the present disclosure.

FIG. 29 illustrates an example flow diagram 2900 of a method for a debugger 2102 (shown in FIG. 21) which can be included in the CGR processor 110 of system 100 shown in FIG. 1, according to an embodiment of the present disclosure. The flow diagram 2900 illustrates the method for the debugger 2102 while it is progressing through multiple HW breakpoints, according to an embodiment of the present disclosure. As shown at 2902, a CGR processor can receive a configuration file including various HW breakpoints from a user via an application platform. The user may do that by giving a load graph command via a user interface.

The configuration file may be generated using an application platform such as PyTorch, TensorFlow etc., compiled by a compiler, further modified by IGOEE to include various control ops, and may be provided to runtime 630 for the CGR processor. For example, as shown in FIG. 26, a user can use the user input2 2604 to load a PEF file 16 shown in FIG. 6. More specifically, the configuration file 165 which is generated by the compiler 620, includes static configuration data. The configuration file 165 is then modified to include dynamic configuration data (such as various control ops such as "load a program", "load the argument file", "load the segment file", or "execute the program file," generated by the IGOEE as shown in FIG. 13.) The static configuration data and the dynamic configuration data may be further provided to the runtime 630 to be executed by the CGR processor 2640. There can be another configuration file for each processor or separate configuration files for all the processors. The method can then proceed to 2904.

At 2904, the CGR processor can start processing the received runtime executable file to unroll various IGOEE-generated ops. For example, as shown in FIG. 12C, the runtime executable file 1270, which includes the static and dynamic configuration data, is provided to the runtime 630. Furthermore, referring to FIG. 13, the iFSM 1315 can start unrolling the ops (Op0 1308 "Load the program", op1 1308 "Load the argument file", op2 1310 "Load the segment file", and op3 1312 "Execute the program file.") generated by the iDSP generator 1304 for the respective graphs to the runtime 630. The method can then proceed to 2906 during execution of the graph.

At 2906, during unrolling of the ops, the method can check if a breakpoint is received. If a breakpoint is received, then execution may be paused at 2908. If not, then the execution may continue. For example, in FIG. 24, while op0 1308 is being executed and when the CGR can receive a HW breakpoint0 2118 while being in the state0 1318, it as defined in the configuration file. From 2908, the method may proceed to 2910.

At 2910, the method may check if a "resume" command is received. If so, then the method may proceed to 2816 and resume the execution and further keep checking for a breakpoint at 2906. For example, in FIG. 24, after being paused at the HW breakpoint0 2118, the user can choose to inspect the CGR information (for example, CGR state bits) specific to op0 and state0 respectively or can give a resume command to start the execution again. If the user chooses to inspect the CGR information, then the method may proceed to 2912. If the user chooses to resume the execution, then the method may proceed to 2916.

At 2912, the method can receive a user command via the user interface to inspect the configuration file or the CGR. For example, a user may provide a command at this stage to read the CGR state bits 2400 as shown in FIG. 24. The method may then proceed to 2914.

At 2914, an output may be provided to the user in response to the user command. For example, in FIG. 24, at HW breakpoint0 2118, the user can read the CGR state bits related to the op0 1308 via the user interface.

At the end of 2914, the method can go back to the beginning of 2910 and wait to receive the "resume" command following which it can resume execution. For example, in FIG. 24, at HW breakpoint0 2118, the user can give a resume command and resume the execution until the next HW breakpoint1 2120.

Examples of various embodiments are described in the following paragraphs:

Example 1: A system comprising: a processor comprising an array of reconfigurable units, configured to execute a dataflow graph of a user application from a compiler, wherein the dataflow graph includes a sequence of temporal partitions, and wherein each temporal partition includes a sequence of graph control operations; an intelligent graph orchestration and execution engine (IGOEE) configured to receive at least one optimization objective from the compiler, wherein the at least one optimization objective specifies at least one of: minimizing an execution time of the reconfigurable processor and maximizing a computing resource utilization of the reconfigurable processor; reorganize the sequence of temporal partitions and the sequence of graph control operations within each temporal partition to satisfy the at least one optimization objective; and execute the reorganized dataflow graph on the reconfigurable processor.

Example 2: The system of example 1, wherein the sequence of graph control operations includes two or more of the following: loading a configuration file; loading an argument file; loading an address translation file; and executing the configuration file.

Example 3: The system of example 1, wherein the IGOEE is configured to reorganize the sequence of graph control operations by combining a subset of graph control operations in the sequence of graph control operations into a single operation.

Example 4: The system of example 1, wherein the IGOEE is configured to reorganize the sequence of temporal partitions by pipelining consecutive temporal partitions.

Example 5: The system of example 1, wherein the IGOEE is configured to execute the reorganized dataflow graph on the reconfigurable processor by allocating a subset of reconfigurable processing units within the reconfigurable processor to the reorganized dataflow graph; and loading the reorganized dataflow graph into the allocated subset of reconfigurable processing units.

Example 6: The system of example 1, wherein each graph control operation includes a software (SW) operation having a SW setup latency equal to a time required for iterating & updating through the array of reconfigurable units to start a HW operation.

Example 7: The system of example 6, wherein minimizing for execution time of the reconfigurable processor includes reorganizing the sequence of graph control operations to have a minimum possible SW setup latency.

Example 8: The system of example 1, wherein each graph control operation includes a HW operation having a HW execution latency equal to an execution time including a time required to push operation-related data to or pull operation-related data from a memory and a total time required by the processor to start and complete the HW operation.

Example 9: The system of example 8, wherein minimizing for execution time of the reconfigurable processor includes reorganizing the sequence of graph control operations to have a minimum possible HW execution latency.

Example 10: A method of managing executing a dataflow graph of a user application on a reconfigurable processor comprising an array of reconfigurable units, the method comprising:

receiving a dataflow graph of a user application from a complier, wherein the dataflow graph includes a sequence of temporal partitions, and wherein each temporal partition includes a sequence of graph control operations; receiving at least one optimization objective from the complier, wherein the at least one optimization objective specifies at least one of: minimizing an execution time of the reconfigurable processor and maximizing a computing resource utilization of the reconfigurable processor; reorganizing the sequence of temporal partitions and the sequence of graph control operations within each temporal partition to satisfy the at least one optimization objective; and executing the reorganized dataflow graph on the reconfigurable processor.

Example 11: The method of example 10, wherein the sequence of graph control operations includes two or more of the following: loading a configuration file; loading an argument file; loading an address translation file; and executing the configuration file.

Example 12: The method of example 10, wherein reorganizing the sequence of graph control operations includes combining a subset of graph control operations in the sequence of graph control operations into a single operation.

Example 13: The method of example 10, wherein reorganizing the sequence of temporal partitions includes pipelining consecutive temporal partitions.

Example 14: The method of example 10, wherein executing the reorganized dataflow graph on the reconfigurable processor further comprises: allocating a subset of reconfigurable processing units within the reconfigurable processor to the reorganized dataflow graph; and loading the reorganized dataflow graph into the allocated subset of reconfigurable processing units.

Example 15: The method of example 10, wherein each graph control operation includes a software (SW) operation having a SW setup latency equal to a time required for iterating & updating through the array of reconfigurable units to start a HW operation.

Example 16: The method of example 15, wherein minimizing for execution time of the reconfigurable processor includes reorganizing the sequence of graph control operations to have a minimum possible SW setup latency.

Example 17: The method of example 10, wherein each graph control operation includes a HW operation having a HW execution latency equal to an execution time including a time required to push operation-related data to or pull operation-related data from a memory and a total time required by the processor to start and complete the HW operation.

Example 18: The method of example 17, wherein minimizing for execution time of the reconfigurable processor includes reorganizing the sequence of graph control operations to have a minimum possible HW execution latency.

Example 19: A non-transitory computer readable medium having instructions encoded thereon for a data processing system comprising a coarse-grained reconfigurable (CGR) processor including an array of CGR unit reconfigurable units, the instructions configured to cause the processor to conduct a method comprising: receiving a dataflow graph of a user application from a complier, wherein the dataflow graph includes a sequence of temporal partitions, and wherein each temporal partition includes a sequence of graph control operations; receiving at least one optimization objective from the complier, wherein the at least one optimization objective specifies at least one of: minimizing an execution time of the reconfigurable processor and maximizing a computing resource utilization of the reconfigurable processor; reorganizing the sequence of temporal partitions and the sequence of graph control operations within each temporal partition to satisfy the at least one optimization objective; and executing the reorganized dataflow graph on the reconfigurable processor.

Example 20: The non-transitory computer readable medium of example 19, wherein the sequence of graph control operations includes two or more of the following: loading a configuration file; loading an argument file; loading an address translation file; and executing the configuration file.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, auto-encoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, which may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

In one embodiment, each of the AGCUs may be allocated a specific bandwidth to access TLN. This is similar to VAGs participating and winning arbitration to get access to the TLN. For example, the CGR processor 110 may include one or more AGCU arbiters to arbitrate among the AGCUs 202 to 232 to gain access to the TLN agents 244 to 266. The arbiter may be implemented in hardware or software or both.

In one example, a software implemented arbiter may keep a table of AGCUs and their need to access the external memory devices or host. Those AGCUs which have a higher bandwidth demand to access the external memory devices or host, may be assigned a higher priority than those which have a lower need. The higher priority AGCUs may be selected to access TLN. In other words, the higher priority AGCUs may get more bandwidth on the TLN than the lower priority ones.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations in the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

The invention claimed is:

1. A system comprising:
  a processor comprising an array of reconfigurable units, configured to execute a dataflow graph of a user application from a compiler, wherein the dataflow graph includes a sequence of temporal partitions, and wherein each temporal partition includes a sequence of graph control operations;
  an intelligent graph orchestration and execution engine (IGOEE) configured to
    receive at least one optimization objective from the complier, wherein the at least one optimization objective specifies at least one of: minimizing an execution time of the reconfigurable processor and maximizing a computing resource utilization of the reconfigurable processor;
    reorganize the sequence of temporal partitions and the sequence of graph control operations within each temporal partition to satisfy the at least one optimization objective;
    generate by a finite state machine (FSM), a plurality of hardware states, wherein each hardware state is coupled to unroll a single graph control operation or a plurality of graph control operations to a runtime; and
    execute the reorganized dataflow graph on the reconfigurable processor.

2. The system of claim 1, wherein the sequence of graph control operations includes two or more of the following:
  loading a configuration file;
  loading an argument file;
  loading an address translation file; and
  executing the configuration file.

3. The system of claim 1, wherein the IGOEE is configured to reorganize the sequence of graph control operations by combining a subset of graph control operations in the sequence of graph control operations into a single operation.

4. The system of claim 1, wherein the IGOEE is configured to reorganize the sequence of temporal partitions by pipelining consecutive temporal partitions.

5. The system of claim 1, wherein the IGOEE is configured to execute the reorganized dataflow graph on the reconfigurable processor by allocating a subset of reconfigurable processing units within the reconfigurable processor to the reorganized dataflow graph; and loading the reorganized dataflow graph into the allocated subset of reconfigurable processing units.

6. The system of claim 1, wherein each graph control operation includes a software (SW) operation having a SW setup latency equal to a time required for iterating & updating through the array of reconfigurable units to start a HW operation.

7. The system of claim 6, wherein minimizing for execution time of the reconfigurable processor includes reorganizing the sequence of graph control operations to have a minimum possible SW setup latency.

8. The system of claim 1, wherein each graph control operation includes a HW operation having a HW execution latency equal to an execution time including a time required to push operation-related data to or pull operation-related data from a memory and a total time required by the processor to start and complete the HW operation.

9. The system of claim 8, wherein minimizing for execution time of the reconfigurable processor includes reorganizing the sequence of graph control operations to have a minimum possible HW execution latency.

10. A method of managing executing a dataflow graph of a user application on a reconfigurable processor comprising an array of reconfigurable units, the method comprising:
  receiving a dataflow graph of a user application from a complier, wherein the dataflow graph includes a sequence of temporal partitions, and wherein each temporal partition includes a sequence of graph control operations;
  receiving at least one optimization objective from the complier, wherein the at least one optimization objective specifies at least one of: minimizing an execution time of the reconfigurable processor and maximizing a computing resource utilization of the reconfigurable processor;
  reorganizing the sequence of temporal partitions and the sequence of graph control operations within each temporal partition to satisfy the at least one optimization objective;
  generating by a finite state machine (FSM), a plurality of hardware states and unrolling by each hardware state, a single graph control operation or a plurality of graph control operations to a runtime; and executing the reorganized dataflow graph on the reconfigurable processor.

11. The method of claim 10, wherein the sequence of graph control operations includes two or more of the following:
  loading a configuration file;
  loading an argument file;
  loading an address translation file; and
  executing the configuration file.

12. The method of claim 10, wherein reorganizing the sequence of graph control operations includes combining a subset of graph control operations in the sequence of graph control operations into a single operation.

13. The method of claim 10, wherein reorganizing the sequence of temporal partitions includes pipelining consecutive temporal partitions.

14. The method of claim 10, wherein executing the reorganized dataflow graph on the reconfigurable processor further comprises:
   allocating a subset of reconfigurable processing units within the reconfigurable processor to the reorganized dataflow graph; and
   loading the reorganized dataflow graph into the allocated subset of reconfigurable processing units.

15. The method of claim 10, wherein each graph control operation includes a software (SW) operation having a SW setup latency equal to a time required for iterating & updating through the array of reconfigurable units to start a HW operation.

16. The method of claim 15, wherein minimizing for execution time of the reconfigurable processor includes reorganizing the sequence of graph control operations to have a minimum possible SW setup latency.

17. The method of claim 10, wherein each graph control operation includes a HW operation having a HW execution latency equal to an execution time including a time required to push operation-related data to or pull operation-related data from a memory and a total time required by the processor to start and complete the HW operation.

18. The method of claim 17, wherein minimizing for execution time of the reconfigurable processor includes reorganizing the sequence of graph control operations to have a minimum possible HW execution latency.

19. A non-transitory computer readable medium having instructions encoded thereon for a data processing system comprising a coarse-grained reconfigurable (CGR) processor including an array of CGR unit reconfigurable units, the instructions configured to cause the processor to conduct a method comprising:
   receiving a dataflow graph of a user application from a complier, wherein the dataflow graph includes a sequence of temporal partitions, and wherein each temporal partition includes a sequence of graph control operations;
   receiving at least one optimization objective from the complier, wherein the at least one optimization objective specifies at least one of: minimizing an execution time of the reconfigurable processor and maximizing a computing resource utilization of the reconfigurable processor;
   reorganizing the sequence of temporal partitions and the sequence of graph control operations within each temporal partition to satisfy the at least one optimization objective;
   generating by a finite state machine (FSM), a plurality of hardware states and unrolling by each hardware state, a single graph control operation or a plurality of graph control operations to a runtime; and executing the reorganized dataflow graph on the reconfigurable processor.

20. The non-transitory computer readable medium of claim 19, wherein the sequence of graph control operations includes two or more of the following:
   loading a configuration file;
   loading an argument file;
   loading an address translation file; and
   executing the configuration file.

* * * * *